US008286298B2

(12) United States Patent
Kim

(10) Patent No.: US 8,286,298 B2
(45) Date of Patent: Oct. 16, 2012

(54) DEVICE FOR CONNECTING A FLAT WIPER BLADE TO WIPER ARMS

(75) Inventor: In-Kyu Kim, Ansan-si (KR)

(73) Assignees: ADM21 Co., Ltd., Gyeonggi-do (KR); In-Kyu Kim, Gyeonggi-do (KR); ADM Technology, Co. Ltd., Gyeonggi-do (KR)

( * ) Notice: Subject to any disclaimer, the term of this patent is extended or adjusted under 35 U.S.C. 154(b) by 677 days.

(21) Appl. No.: 12/500,153

(22) Filed: Jul. 9, 2009

(65) Prior Publication Data

US 2010/0005609 A1  Jan. 14, 2010

(30) Foreign Application Priority Data

Jul. 11, 2008 (KR) .................. 10-2008-0067735
Jun. 29, 2009 (KR) .................. 10-2009-0058155

(51) Int. Cl.
*B60S 1/40* (2006.01)
(52) U.S. Cl. .................. 15/250.32; 15/250.351
(58) Field of Classification Search ............. 15/250.32, 15/250.351, 250.361, 250.43, 250.44, 250.201
See application file for complete search history.

(56) References Cited

U.S. PATENT DOCUMENTS

| | | | | |
|---|---|---|---|---|
| 6,481,044 B1 * | 11/2002 | Journee | ............... | 15/250.32 |
| 2004/0244137 A1 | 12/2004 | Poton | | |
| 2005/0177970 A1 | 8/2005 | Scholl et al. | | |
| 2006/0117515 A1 | 6/2006 | Fink et al. | | |
| 2007/0220698 A1 | 9/2007 | Huang | | |
| 2007/0226940 A1 | 10/2007 | Thienard | | |
| 2009/0113653 A1 | 5/2009 | Thienard | | |
| 2009/0199357 A1 | 8/2009 | Thienard | | |
| 2009/0307862 A1 | 12/2009 | Boland | | |
| 2010/0000041 A1 * | 1/2010 | Boland | ............... | 15/250.32 |
| 2011/0047742 A1 | 3/2011 | Kim et al. | | |
| 2011/0247166 A1 * | 10/2011 | Depondt et al. | ............... | 15/250.32 |

FOREIGN PATENT DOCUMENTS

| | | |
|---|---|---|
| CN | 1717350 | 11/2003 |
| DE | 103 49 637 A1 | 6/2005 |
| DE | 10 2004 039 527 A1 | 2/2006 |

(Continued)

OTHER PUBLICATIONS

European Search Report dated Aug. 3, 2011 from European Patent Application No. EP09165244, corresponding to U.S. Appl. No. 12/500,153—4 pages.

*Primary Examiner* — Gary Graham
(74) *Attorney, Agent, or Firm* — Maier & Maier PLLC

(57) ABSTRACT

Various embodiments of a device for connecting a flat wiper blade to various wiper arms are provided. In one embodiment, the connecting device includes: a joint fixed to a frame of a flat wiper blade; a bracket snap-mounted on the joint; and an adaptor mounted to the bracket. The bracket has a pivot shaft extending perpendicular to a length direction of the frame and having a pivot bore therethrough. The adaptor has a pair of side wall portions. Fitting apertures are perforated in the side wall portions. The adaptor is mounted to the bracket in such a manner that both ends of the pivot shaft are fitted to the fitting apertures. The adaptor is configured to be suitable for differently-configured distal ends of the wiper arms. The connecting device connects a single flat wiper blade to various wiper arms.

20 Claims, 58 Drawing Sheets

FOREIGN PATENT DOCUMENTS

| | | |
|---|---|---|
| DE | 20 2005 021307 U1 | 10/2007 |
| DE | 10 2006 031514 A1 | 1/2008 |
| JP | 2005 505465 A | 2/2005 |
| JP | 2006015841 A | 1/2006 |
| JP | 3131905 U | 5/2007 |
| JP | 2008 525257 A | 7/2008 |
| JP | 2008 285140 A | 11/2008 |
| JP | 2009 542512 A | 12/2009 |
| KR | 10-2005-0007446 | 1/2005 |
| KR | 10-2005-0033046 | 4/2005 |
| KR | 10-2005-0085129 | 8/2005 |
| KR | 10-2007-0011299 A | 1/2007 |
| KR | 10 0692371 B1 | 3/2007 |
| KR | 10-0725988 | 5/2007 |
| KR | 10-2008-0059225 | 6/2008 |
| KR | 10-0891195 B1 | 3/2009 |
| KR | 10-2009-0099997 A | 9/2009 |
| KR | 10-0903374 B1 | 10/2009 |
| SU | 1595715 A1 | 9/1990 |
| WO | 2006/069648 A1 | 7/2006 |
| WO | 2006069647 A1 | 7/2006 |
| WO | WO 2007/045549 A1 | 4/2007 |
| WO | 2007128677 A1 | 11/2007 |
| WO | 2008003675 A | 1/2008 |

\* cited by examiner

DEVICE FOR CONNECTING A FLAT WIPER BLADE TO WIPER ARMS

The present application claims priority from Korean Patent Application No. 10-2008-0067735 (filed on Jul. 11, 2008) and Korean Patent Application No. 10-2009-0058155 (filed on Jun. 29, 2009), the entire subject matters of which are incorporated herein by reference.

TECHNICAL FIELD

The present disclosure relates to a device configured to be mounted on a wiper blade for detachably connecting the wiper blade to a wiper arm. In particular, the present disclosure relates to a device for detachably connecting a flat wiper blade to various types of wiper arms.

BACKGROUND

Cars are equipped with a wiper device for wiping a surface of a windshield. Typically, the wiper device includes a driving motor, a wiper arm and a wiper blade positioned on the surface of the windshield.

The driving motor functions to produce a reciprocal movement. The wiper arm is coupled to a rotating shaft of the driving motor at its base end. The wiper blade is detachably joined to a distal end of the wiper arm. A component for biasing the distal end of the wiper arm toward the windshield is provided at the distal end of the wiper arm. Thus, the wiper blade becomes closed to the surface of the windshield under the biasing force of the wiper arm and wipes out the windshield surface while sliding thereon by reciprocating pivoting motions caused by the driving motor.

The wiper blade typically has an elongated wiping strip brought into contact with the windshield surface and a frame component for attaching the wiping strip therealong and supporting the same thereon. The frame component may include an assembly having a plurality of levers.

A wiper blade, which uses a single frame having a flat and elongated bar shape as the frame component, has been recently used. Such a wiper blade is known in the art as "a flat wiper blade" or "a flat bar wiper blade." The flat wiper blade not only lowers an entire height of a wiper device, but also has its wiping strip contact the windshield surface under a uniform or consistent load.

The flat wiper blade may be connected to the wiper arms via a connecting device, which is installed to a middle section of the frame. The connecting device is designed to be suitable for a distal end of a wiper arm. Manufacturers of wiper arms have put their own inherent wiper arms for flat wiper blades in the market. Also, the manufacturers of wiper arms or the manufacturers of wiper devices have put various connecting devices, which are configured to be suitable for the flat wiper arms, in the market. Accordingly, there have been known in the art various wiper arms for flat wiper blades and various connecting devices adapted for wiper arms.

FIGS. 1 to 6 illustrate examples of various conventional wiper arms for flat wiper blades.

Wiper arms 1, 1' shown in FIGS. 1 and 2 are configured such that their distal ends have a receiving section, concave portions provided at a rear side of the receiving section and a tongue protruding from a front side of the receiving section. These wiper arms are known in the art as "a top lock wiper arm" or "a pinch tab wiper arm." Korean Patent Application Laid-Open Publication No. 10-2005-0085129 and Korean Patent Application Laid-Open Publication No. 10-2005-0007446 disclose a connection example between a flat wiper blade and a top lock wiper arm, wherein a connecting device supports the tongue and is snap-engaged to the concave portions.

A wiper arm 2 shown in FIG. 3 is configured such that its distal end has a shape of a hook. This wiper arm is known in the art as "a hook wiper arm." A hook wiper arm is also used for a wiper blade including a frame component comprising a lever assembly. Korean Patent Application Laid-Open No. 10-2005-0033046 discloses a connection example between a flat wiper blade and a hook wiper arm, wherein the hook part provided at the distal end of the wiper arm 2 and a connecting device are joined by an elastic engagement therebetween.

A wiper arm 3 shown in FIG. 4 is configured such that its distal end defines an insertion space. This wiper arm is known in the art as "a bayonet wiper arm." Korean Patent No. 10-725988 discloses a connection example between a flat wiper blade and a bayonet wiper arm, wherein a connecting device is fitted to the insertion space to be jointed to the wiper arm.

A wiper arm 4 shown in FIG. 5 is configured such that its distal end portion has a side pin and a clip arm protruding to the wiper arm 4. This wiper arm is known in the art as "a side pin wiper arm," "a side lock wiper arm" or "a slide pin wiper arm." Korean Patent Application Laid-Open Publication No. 10-2008-0059225 discloses a connection example between a flat wiper blade and a side lock wiper arm, wherein the side pin 41 passes through a tubular component of a connecting device and the clip arm 42 is snap-engaged to the connecting device.

A wiper arm 5 shown in FIG. 6 is configured such that its distal end has a pin 51 perpendicularly protruding therefrom and a circumferential groove 52 formed in the pin 51. This wiper arm is known in the art as "a pin wiper arm." A pin wiper arm is also used for a wiper blade including a frame component comprising a lever assembly. The pin wiper arm may be joined to a connecting device by an engagement between the pin 51, the circumferential groove 52 and the connecting device.

As discussed above, wiper arms 1, 1', 2, 3, 4, 5 illustrated in FIGS. 1 to 6 may be connected to a flat wiper blade when only using a connecting device configured to be suitable for the shape of the distal end of each wiper arm. That is, various types of connecting devices must be prepared according to the shapes of distal ends of wiper arms. As a result, there must be different connecting devices, each of which is only suitable for a specific shape of one wiper arm.

Further, the manufacturers of such connecting devices must design and develop various different connecting devices, each of which is suitable for only one wiper arm. This is clearly disadvantageous in that the number of parts constituting connecting devices is large, thereby causing difficulties in development and maintenance while increasing manufacturing and distribution costs. On the other hand, users or consumers must choose a specific connecting device, which is configured to be suitable for a distal end of a wiper arm equipped to their own cars. This is also disadvantageous since they would have difficulty and inconvenience in choosing the right connecting device. Accordingly, there is a need to provide a connecting device for a flat wiper blade and wiper arms, which can be applied to various types of wiper arms.

Further, in case of conventional connecting devices disclosed in Korean Patent Application Laid-Open Publications Nos. 10-2005-0085129 and 10-2005-0007446, a pair of elongated bar-shaped parts of the connecting devices are snap-engaged to the concave portions 14a, 14b, 14a', 14b' of the wiper arm 1, 1'. However, the engagement between those bar-shaped parts and the concave portions can become loose due to the configuration of the bar-shaped parts. That is, when a flat wiper blade is reciprocally driven by a wiper arm, the bar-shaped parts can be curved inwardly of the flat wiper blade, thereby causing a problem between the bar-shaped parts and the concave portions while failing to provide a tight engagement therebetween. In addition, since the bar-shaped parts protrude backwardly of the connecting device, the bar-shaped parts can be bent and broken during transportation or assembly.

Further, in case of the conventional connecting device disclosed in Korean Patent Application Laid-Open Publication No. 10-2008-0059225, a side pin 51 fails to smoothly pivot relative to the connecting device. Thus, a flat wiper blade cannot be placed in close contact with the surface of the windshield while conforming to the curvature of the windshield surface.

As discussed above, there is a problem with conventional connecting devices in that a firm coupling is not accomplished between a flat wiper blade and a wiper arm. Further, a smooth pivoting motion of a flat wiper blade cannot be provided. Accordingly, there is a clear need to provide a connecting device, which provides smooth pivoting of a flat wiper blade while firmly coupling the flat wiper blade to the wiper arm.

SUMMARY

Various embodiments of a device for connecting a flat wiper blade to wiper arms are provided. In one exemplary embodiment, by way of non-limiting example, a device for connecting a flat wiper blade to various wiper arms is provided. The device detachably connects a flat wiper blade 9, 9' to a wiper arm 1, 1', 2, 3, 4 having one of the following: a first coupling component 10, 10' including a top plate 11, 11' and a pair of concave portions 14a, 14b, 14a', 14b'; a second coupling component 20 including a hooked portion 21; a third coupling component 30 including a top plate 31 and a pair of side plates 32a, 32b; and a fourth coupling component 40 including a side pin 41 and a clip arm 42. The device includes a joint 110, 210, a bracket 120, 220 and an adaptor 130, 230. The joint is coupled to a frame 9b, 9b' of the flat wiper blade. The bracket is mounted on the joint. The bracket includes the following: a pair of spaced-apart vertical wall portions 122a, 122b, 222a, 222b; and a pivot shaft 123, 223 disposed on a top of the vertical wall portions and having a pivot bore 123a, 223a defined therethrough. The adaptor 130, 230 includes the following: a pair of side wall portions 131, 132, 231, 232 having fitting apertures 134a, 134b, 234a, 234b defined therethrough, respectively; and a first cross-connecting portion 133a, 233a connecting the side wall portions to each other and being located in front of the fitting apertures. The adaptor is pivotally mounted on the bracket as both ends of the pivot shaft are fitted to the fitting apertures. The adaptor further includes: a first locking device 131d, 132d, 140, 142a, 142b, 231e, 232e, 240, 242a for positioning the concave portion of the first coupling component to the side wall portion and securing the top plate of the first coupling component on the side wall portions; a second locking device 131a, 132a, 136a, 136b, 231a, 232a, 236a, 236b for locking the hooked portion of the second coupling component between the side wall portions against the first cross-connecting portion; and slide rails 137a, 137b, 237a, 237b formed on outer surfaces of the side wall portions and being configured to be fitted between the side plates of the third coupling component. The side pin of the fourth coupling component is insertable into and pivotable about the pivot bore.

In another exemplary embodiment, by way of non-limiting example, a device for connecting a flat wiper blade to wiper arms is provided. The device detachably connects a flat wiper blade 9, 9' to a wiper arm 1, 1', 2, 3, 4, 5 having one of the following: a first coupling component 10, 10' including a tongue 13, 13' and a pair of concave portions 14a, 14b, 14a', 14b'; a second coupling component 20 including a hooked portion 21; a third coupling component 30 including a top plate 31 and a pair of side plates 32a, 32b; a fourth coupling component 40 including a side pin 41 and a clip arm 42; and a fifth coupling component 50 including a pin 51 and an circumferential groove 52 defined in the pin. The device includes a joint 210, a bracket 220 and an adaptor 230. The joint is coupled to a frame 9b, 9b' of the flat wiper blade. The bracket is mounted on the joint. The bracket includes the following: a pair of spaced-apart vertical wall portions 222a, 222b; and a pivot shaft 223 disposed on top of the vertical wall portions and having a pivot bore 223a defined therethrough. The adaptor includes: a pair of side wall portions 231, 232 having fitting apertures 234a, 234b defined therethrough, respectively; a first cross-connecting portion 233a connecting the side wall portions to each other and being located in front of the fitting apertures; and a second cross-connecting portion 233b connecting the side wall portions to each other and being located in the rear of the fitting apertures. The adaptor may be pivotally mounted on the bracket as both ends of the pivot shaft are fitted to the fitting apertures. The adaptor further includes the following: a first locking device 235a, 235b, 235c for positioning the concave portion of the first coupling component to the side wall portion and locking the tongue of the first coupling component to the side wall portions; a second locking device 231a, 232a, 236a, 236b for locking the hooked portion of the second coupling component between the side wall portions against the first cross-connecting portion; slide rails 237a, 237b formed on outer surfaces of the side wall portions and being configured to be fitted between the side plates of the third coupling component; a latching lever 237e extending from a backward end of one of the side wall portions and being configured to elastically engage to a backward end of one of the side plates of the third coupling component; and a fifth locking device 238a, 238b, 238c for securing the pin of the fifth coupling component transversely to the side wall portions and locking the circumferential groove of the fifth coupling component to the side wall portions. The side pin of the fourth coupling component is insertable into and pivotable about the pivot bore.

The Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

Arrangements and embodiments may be described in detail with reference to the following drawings in which like reference numerals refer to like components and wherein.

DETAILED DESCRIPTION

Figure 1:
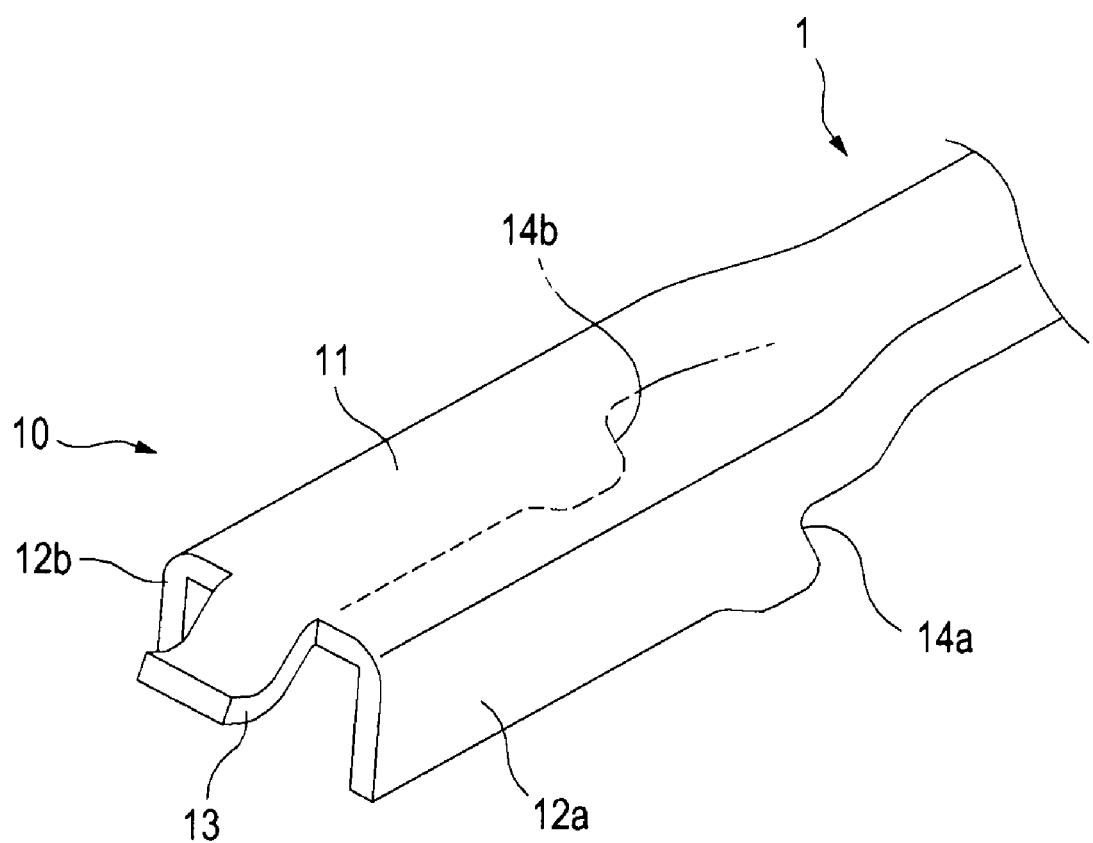
FIG. 1 is a perspective view illustrating a conventional top lock wiper arm.
Figure 2:
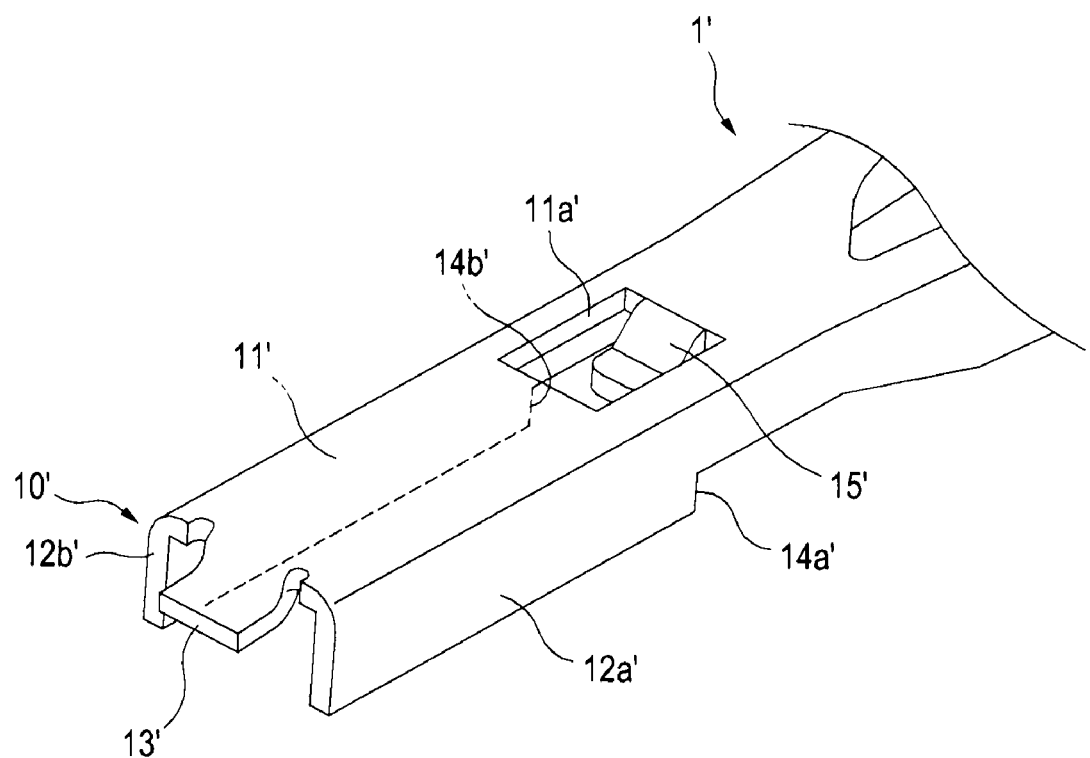
FIG. 2 is a perspective view illustrating another conventional top lock wiper arm.
Figure 3:
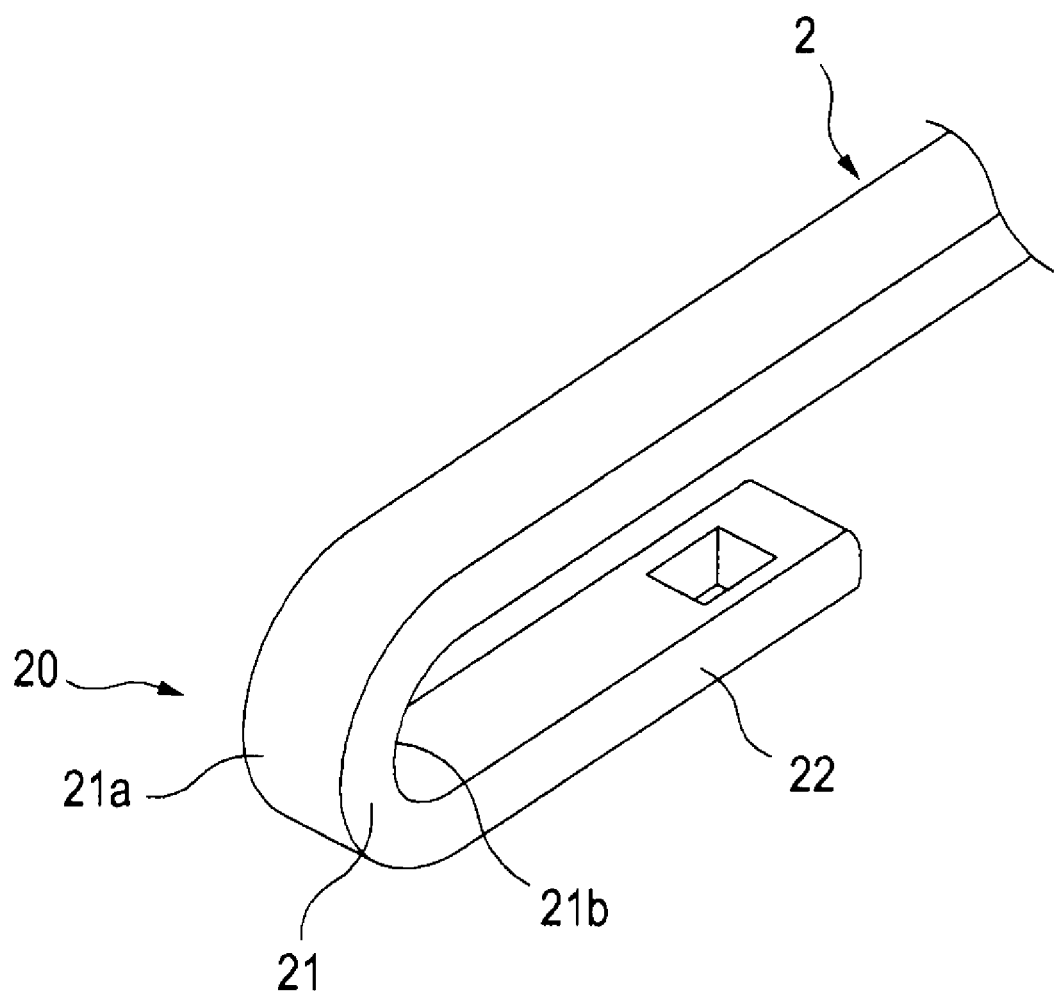
FIG. 3 is a perspective view illustrating a conventional hook wiper arm.
Figure 4:
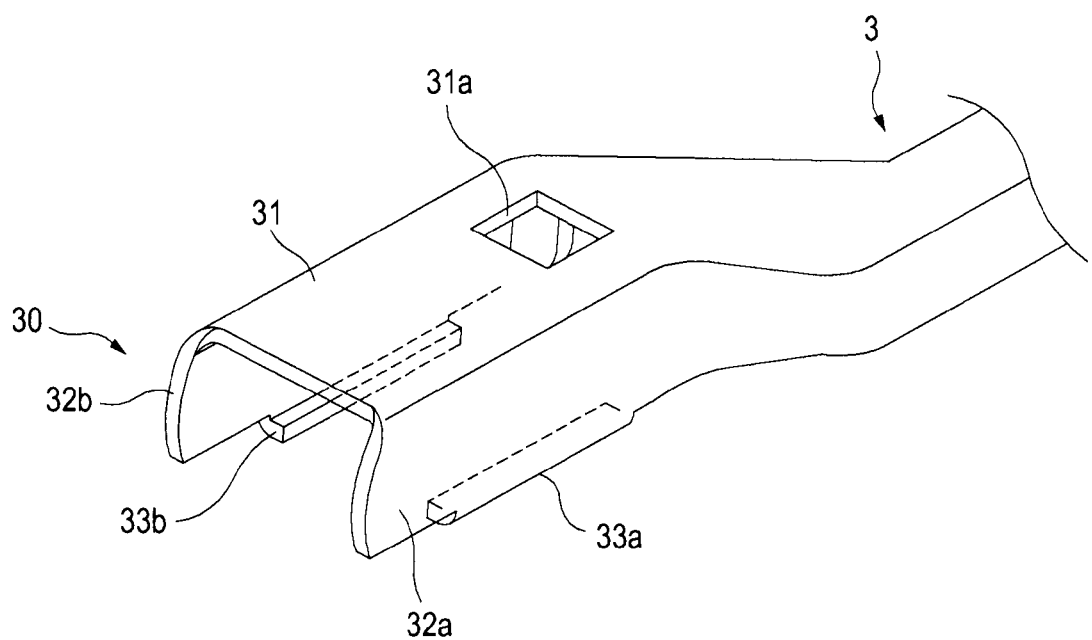
FIG. 4 is a perspective view illustrating a conventional bayonet wiper arm.
Figure 5:
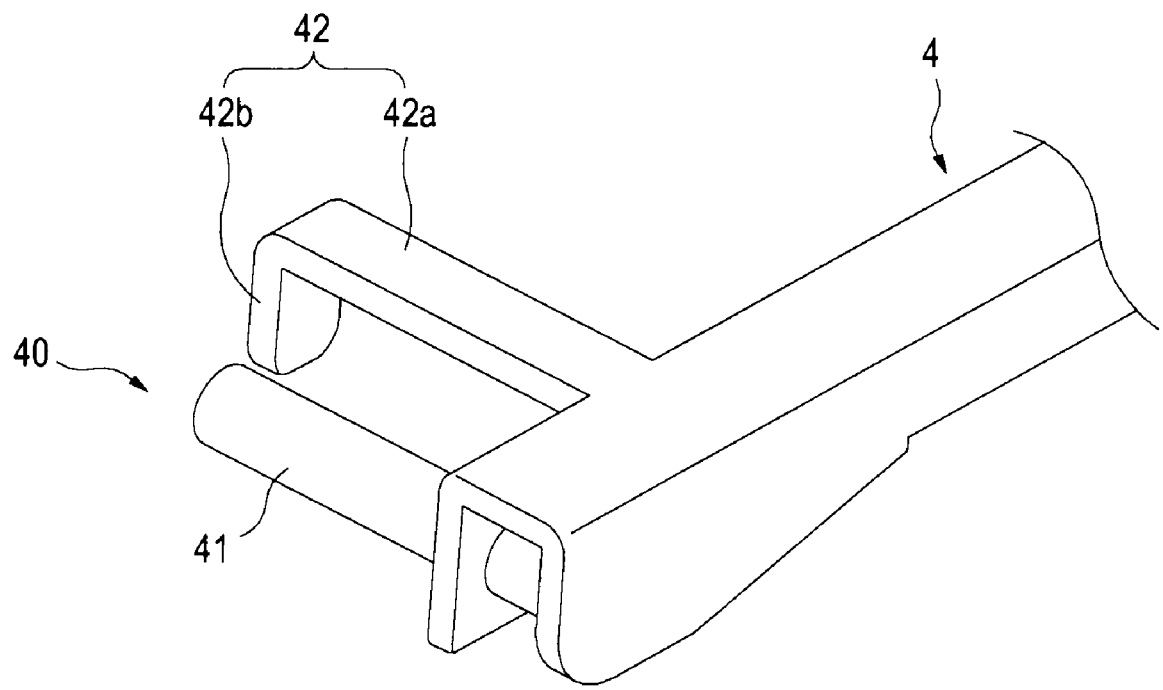
FIG. 5 is a perspective view illustrating a conventional side lock wiper arm.
Figure 6:
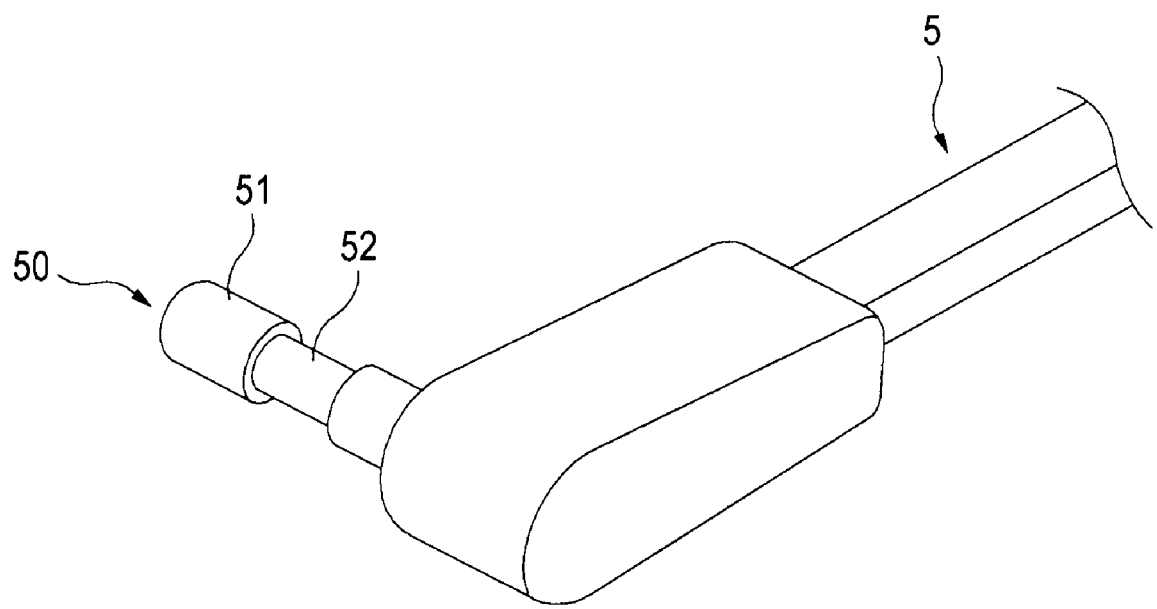
FIG. 6 is a perspective view illustrating a conventional pin wiper arm.

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

As used herein, the term "forward" generally refers to a direction toward a distal end of a wiper arm, while the term "backward" generally refers to a direction opposite to the forward direction. Further, as used herein, the term "upward" or "upper" generally refers to a direction toward a wiper arm in an assembly of a wiper arm and a flat wiper blade, while the term "downward" or "lower" generally refers to a direction opposite to the upward or upper direction.

A device for connecting a flat wiper blade to wiper arms (hereinafter, simply referred to as "the connecting device") according to exemplary embodiments of the present disclosure may be constructed to be applicable to various types of wiper arms. Specifically, the connecting device may include an adaptor configured to be detachably connected to all of the coupling components provided at distal end portions of the wiper arms.

With reference to FIGS. 1 to 6, wiper arms 1, 1', 2, 3, 4, 5 and first to fifth coupling components 10, 10', 20, 30, 40, 50 provided at their distal ends, to which the connecting device of the present disclosure may be applied, will be first described.

A first coupling component 10 may include a top plate 11 and a pair of side plates 12a, 12b extending from both lateral edges of the top plate 11, thereby forming a general U-shape and defining an accommodating space therein, to which the adaptor may be inserted. The top plate 11 may be placed in contact with a top side of the adaptor, while side plates 12a, 12b may face toward lateral sides of the adaptor. Further, the first coupling component 10 includes the following: a tongue 13 extending from a forward end of top plate 11; and concave portions 14a, 14b formed in such a manner that backward end portions of the side plates 12a, 12b are cut away in part or that the backward end portions of the side plates 12a, 12b are recessed upward in part.

Another first coupling component 10' may be configured similarly to the first coupling component 10, except that an aperture 11a' is provided in a top plate 11', another tongue 15' extends from an edge of aperture 11a' and concave sections 14a', 14b' are formed at a right angle. Another example of the first coupling component 10' may not include said another tongue 15'.

A second coupling component 20 may include a hooked portion 21 generally curved at 180 degrees and an extension portion 22 backwardly extending from the hooked portion 21 substantially parallel to a wiper arm 3. The hooked portion 21 may have an outer surface 21a that is an outside of the convexly curved shape and an inner surface 21b that is an inside of the convexly curved shape.

A third coupling component 30 may include a top plate 31 and side plates 32a, 32b vertically extending from both lateral edges of the top plate 31, thereby forming a general U-shape and defining an insertion space, to which the adaptor may be inserted. The top plate 31 may have an aperture 31a therethrough. Further, the third coupling component 30 may include a stopper portion 33a, 33b inwardly extending from a lower edge of each of the side plates 32a, 32b. The stopper portions 33a, 33b may be located at backward portions of the side plates 32a, 32b.

A fourth coupling component 40 may include a side pin 41 perpendicularly extending from a distal end of a wiper arm 4 and a clip arm 42 extending adjacent to the side pin 41 and parallel thereto. The clip arm 42 may include a stopper section 42a and a clip section 42b extending from a distal end of the stopper section 42a as bent downwardly therefrom.

A fifth coupling component 50 may include a pin 51 perpendicularly extending from a distal end of a wiper arm 5 and a circumferential groove 52 formed at a middle section of the pin 51 and having a diameter smaller than that of the pin 51.

The connecting device of the present disclosure may be constructed to detachably connect a flat wiper blade to wiper arms 1, 1', 2, 3, 4, 5, which has one of the differently-configured first to fifth coupling components 10, 10', 20, 30, 40, 50 at its distal end, by using said adaptor or its component other than the adaptor. To this end, the connecting device of the present disclosure may include first to fifth locking devices for implementing locking operations to the first to fifth coupling components, respectively. The first to fifth locking devices may be provided only at the adaptor or provided at the adaptor and the component other than the adaptor in a combination manner.

The first locking device may be provided at the adaptor. The first locking device may carry out a locking operation of hanging and snap-engaging between the adaptor and the first coupling component 10, 10'.

The second locking device may be provided at the adaptor. The second locking device may carry out a locking operation of hooking and snap-engaging between the adaptor and the second coupling component 20.

The third locking device may be provided at the adaptor. The third locking device may carry out a locking operation of inserting and fitting between the adaptor and the third coupling component 30.

The fourth locking device may be provided at the adaptor and a component for pivotally coupling the adaptor thereon. The fourth locking device may carry out a locking operation of inserting and pivoting between the connecting device and the fourth coupling component 40.

The fifth locking device may be provided at the adaptor. The fifth locking device may carry out a locking operation of inserting and snap-engaging between the adaptor and the fifth coupling component 50.

Figure 7:
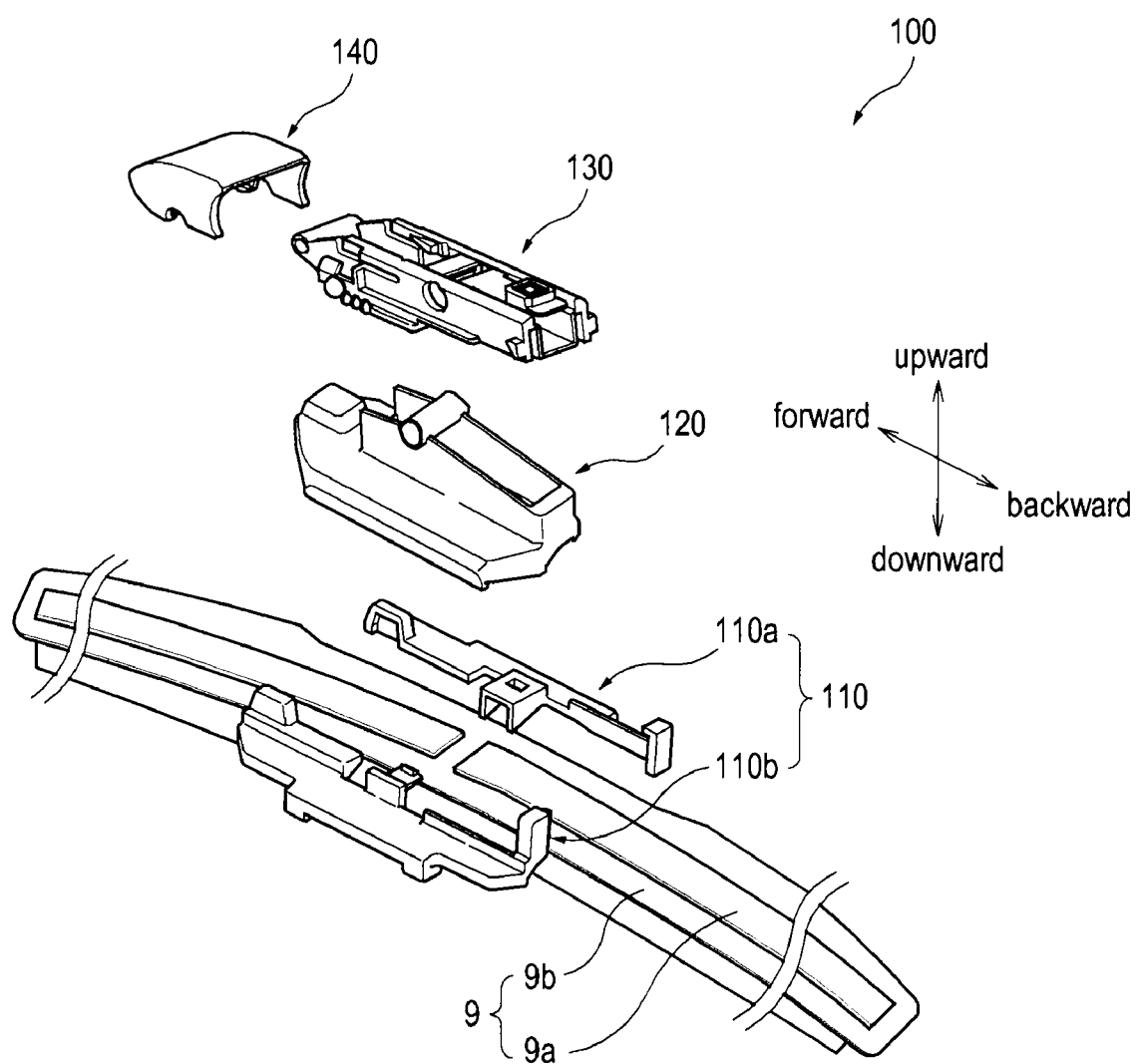
FIG. 7 is an exploded perspective view showing a connecting device for a flat wiper blade and wiper arms according to a first exemplary embodiment of the present disclosure.

FIG. 7 is an exploded perspective view illustrating the connecting device according to a first exemplary embodiment of the present disclosure. A connecting device 100 according to the first exemplary embodiment may detachably connect a flat wiper blade to the wiper arm 1, 1', 2, 3, 4 having one of the first to fourth coupling components at its distal end. Further, the connecting device 100 may include the first to fourth locking devices to carry out the detachable connection.

In one embodiment, the connecting device 100 may include the following: a joint 110 coupled to a flat wiper blade 9; a bracket 120 snap-mounted on the joint 110, an adaptor 130 mounted on the bracket 120; and a cover 140 pivotally joined to a forward end of the adaptor 130.

The flat wiper blade 9 may include: a wiping strip 9a configured to contact a surface of a windshield; and a frame 9b for attaching and supporting the wiping strip 9a therealong and thereon. The wiping strip 9a may be made from, for example, a rubber material. The wiping strip 9a includes a tip portion having a triangular cross-section and being placed in contact with the windshield surface. The frame 9b may be made from a metallic or plastic material and may have a shape of a thin and elongated bar. The wiping strip 9a may be affixed to the frame 9b by fitting into a slot (not shown) formed along the frame 9b in a length direction thereof. The frame 9b may be curved or bent with a certain radius of curvature as shown in FIG. 7. Further, a substantially linear frame (e.g., a frame 9b' shown in FIG. 33) may be used as said frame for the wiping strip.

Figure 8:
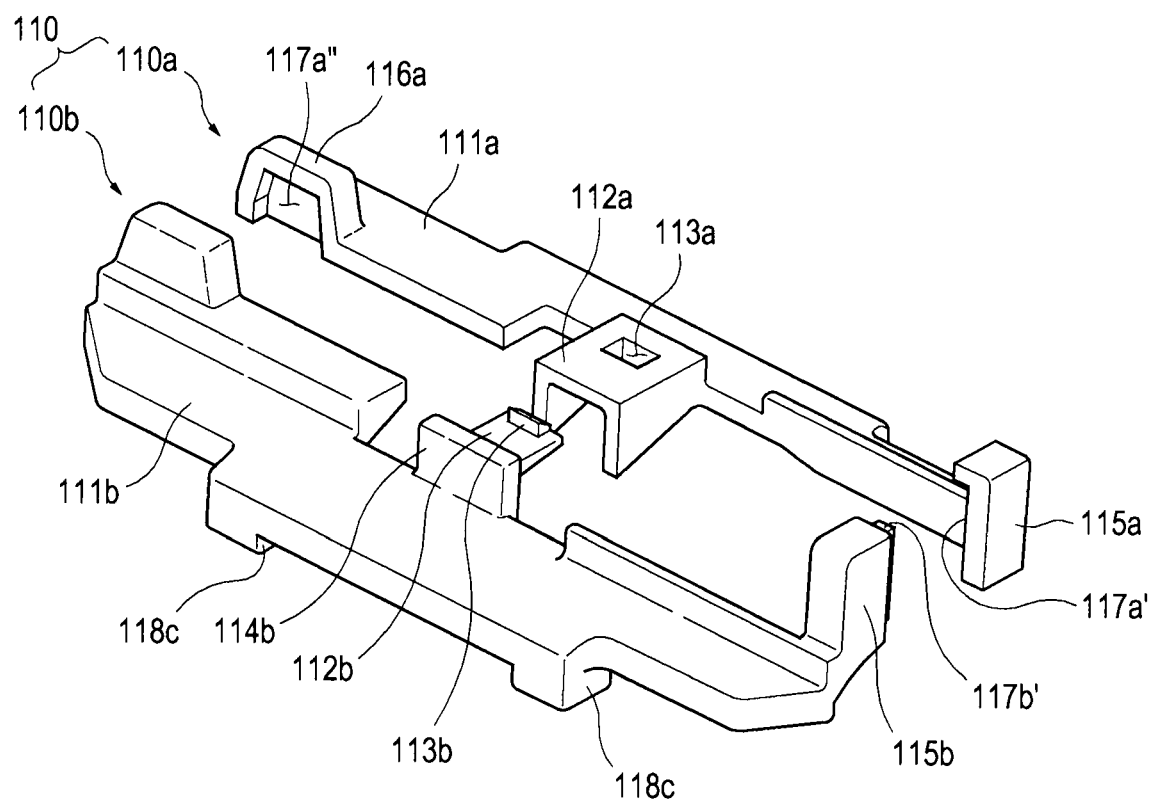
FIG. 8 is a perspective view showing a joint shown in FIG. 7.

FIG. 8 is a perspective view showing the joint. The joint 110 may be coupled to the frame 9b of the flat wiper blade 9 to connect the flat wiper blade 9 to the wiper arm 1, 1', 2, 3, 4, 5. The joint 110 may be disposed at a middle section of the frame 9b and fixed thereto.

Figure 9:
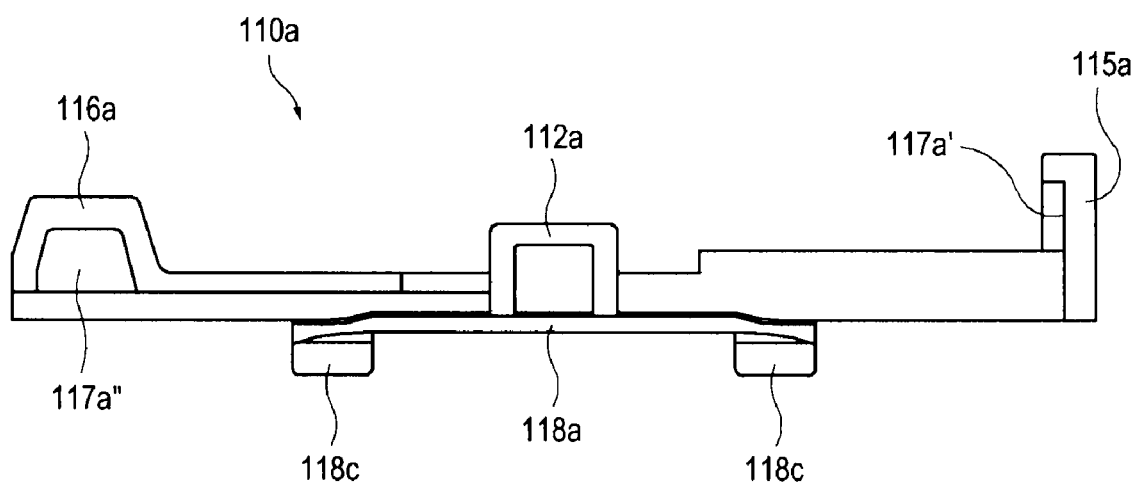
FIG. 9 is a front elevation view showing a one-half section of the joint shown in FIG. 8.
Figure 10:
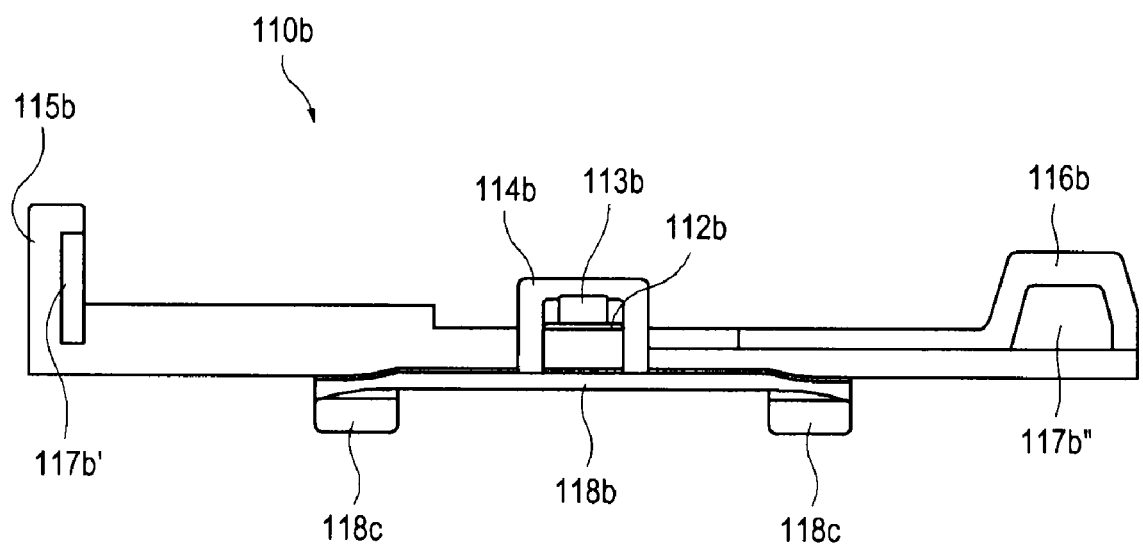
FIG. 10 is a front elevation view showing the other half section of the joint shown in FIG. 8.
Figure 11:
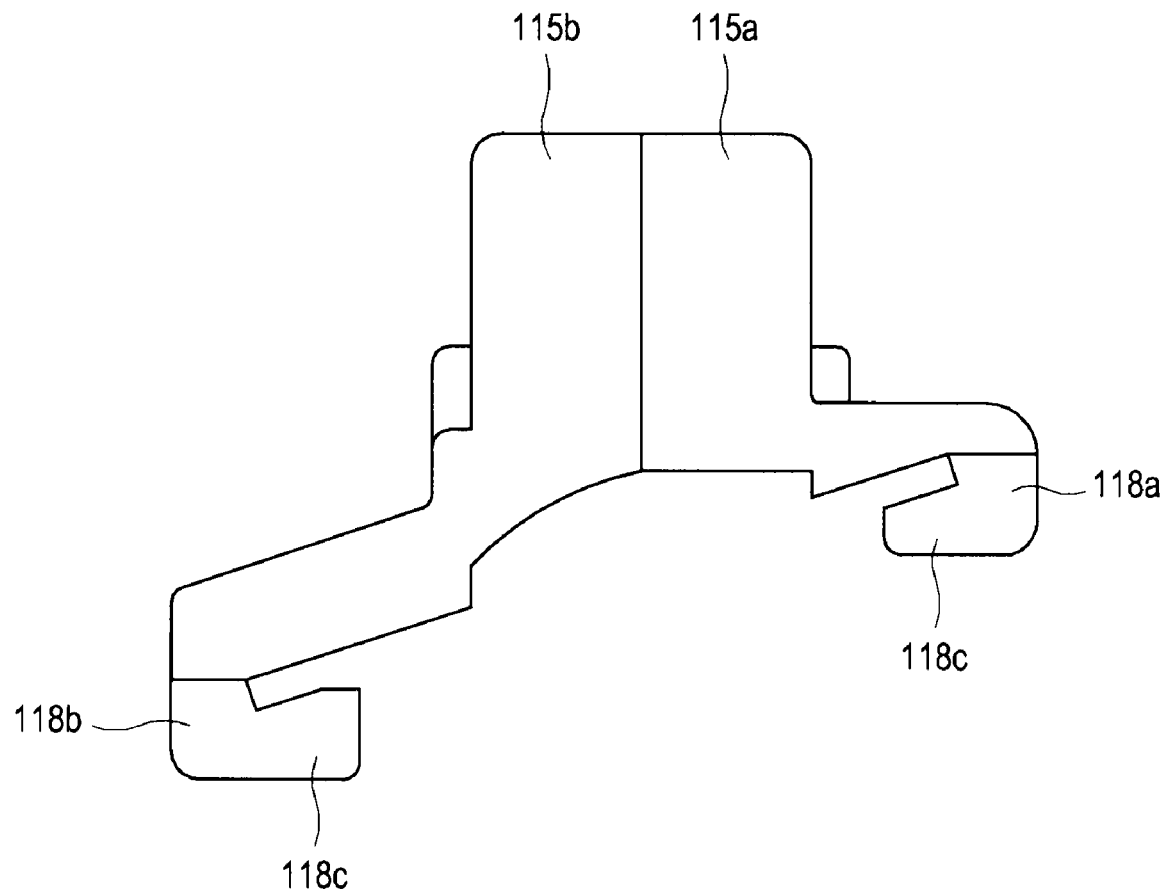
FIG. 11 is a side view showing the assembled joint.

In one embodiment, the joint 110 may include the following: a first half section 110a engaged to one edge of the frame 9b; and a second half section 110b engaged to an opposite edge of the frame 9b. The first half section 110a and the second half section 110b may be joined to each other while holding or clamping the frame 9b therebetween. FIGS. 9 and 10 are front views showing each half section respectively. FIG. 11 is a side view showing the assembled joint 110. The joint 110 will be further described with reference to FIGS. 8 to 11.

The first half section 110a may have a half section body 111a. The second half section 110b may have a half section body 111b. The joint 110 may include a securing component provided at one of the half sections and an engaging component provided at the other of the half sections, and configured to engage the securing component to implement joining of each of the half sections 110a, 110b. In one embodiment of the securing component, a receiving portion 112a having a reversed U-shape and an engagement aperture 113a drilled at a top side of the receiving portion 112a may be provided at the first half section 110a. Further, in one embodiment of the engaging component, an elastic insertion arm 112b and an engagement protrusion 113b protruding a free end of insertion arm 112b may be provided at the second half section 110b. The insertion arm 112b is located at an upper end of a support 114b formed at the middle of the half section body 111b. The insertion arm 112b is inserted into the receiving portion 112a and the engagement protrusion 113b is elastically engaged to the engagement aperture 113, thereby coupling the first half section 110a and the second half section 110b to each other. As shown in FIGS. 8 and 11, since the receiving portion 112a protrudes from the half section body 111a and the insertion arm 112b is located at the upper end of support 114b, the half section body 111b of the second half section 110b is situated lower than the half section body 111a of the first half section 110a when they are coupled.

The joint 110 may include a positioning component for ensuring coupling of the half sections and preventing a relative movement therebetween when each half section 110a, 110b is coupled to each other. In one embodiment of the positioning component, a first mating portion 115a, 115b may be provided at forward ends of the first and second half sections 110a, 110b, while a second mating portion 116a, 116b may be provided at backward ends of the first and second half sections 110a, 110b. In the illustrated embodiment, one of the first mating portion 115b includes a vertically extending protrusion 117b', while the other of the first mating portion 115a includes a groove 117a' located therein, to which the protrusion 117b' is fitted. Further, one of the second mating portion 116b includes a horizontally extending protrusion 117b", while the other of the second mating portion 116a includes a groove 117a", to which the protrusion 117b" is inserted and fitted. Lower sides of the first mating portion 115a, 115b and the second mating portion 116a, 116b are concave upward such that a portion of the wiping strip 9a appearing on the frame 9b can be placed therein.

The joint 110 may include frame holding legs 118a, 118b for fixing either edge of the frame 9b thereto in a fitting or engagement manner and a frame holding protrusions 118c inwardly protruding therefrom. The frame holding legs 118a, 118b are provided at lower ends of the half sections 110a, 110b. In the illustrated embodiment, the frame holding leg 118a downwardly extends from the lower end of the first half section 110a and the frame holding protrusions 118c are formed at both ends thereof. Further, the frame holding leg 118b downwardly extends from the lower end of the second half section 110a and the frame holding protrusions 118c are formed at both ends thereof. Upper surfaces of the frame holding protrusions 118c and bottom surfaces of the first and second half sections 110a, 110b are curved to correspond to a curvature of the frame 9b. The frame 9b may be held between opposed half sections 110a, 110b and between bottom surfaces of the half sections 110a, 110b and upper surfaces of the frame holding protrusions 118c when the half sections 110a, 110b are coupled to each other. Alternatively, the frame 9b may be fixed to the joint 110 by fitting in a length direction thereof between the frame holding legs 118a, 118b of the assembled joint 110.

Figure 12:
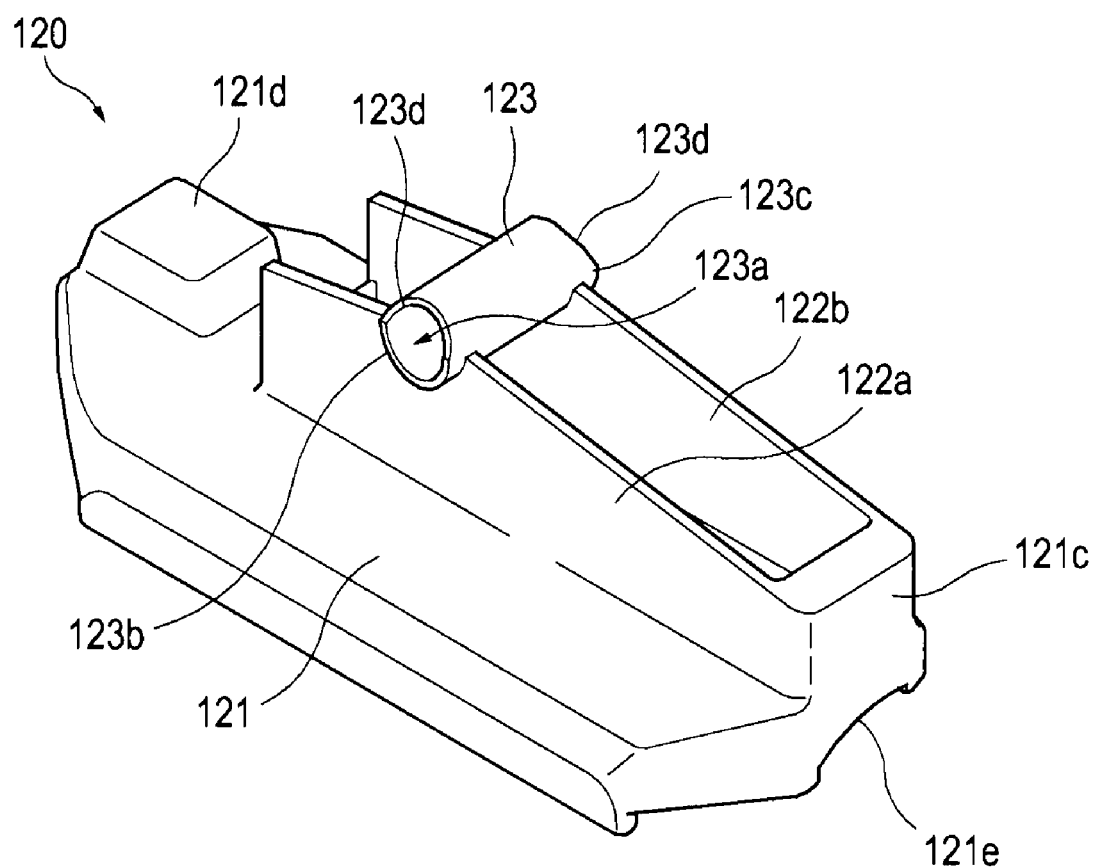
FIG. 12 is a perspective view illustrating a bracket shown in FIG. 7.

FIG. 12 is a perspective view showing the bracket 120. The bracket 120 may be disposed on the joint 110 and be mounted thereto in a snap-engagement manner.

In one embodiment, the bracket 120 may include the following: a base 121 configured to substantially cover up the joint 110; a pair of vertical wall portions 122a, 122b vertically standing on the base 121; and a pivot shaft 123 disposed at a top side of the vertical wall portions 122a, 122b.

The pivot shaft 123 may serve as a pivot center of an assembly of the flat wiper blade 9 and the wiper arm 1, 1', 2, 3, 4. The pivot shaft 123 is provided on the top side of the vertical wall portions 122a, 122b with an orientation substantially perpendicular to a length direction of the frame 9b. The pivot shaft 123 may be hollow to define a pivot bore 123a extending therethrough. The pivot bore 123a may participate in connecting the flat wiper blade 9 to the wiper arm 4 having a fourth coupling component 40 at its distal end. Both lateral ends of the pivot shaft 123 slightly protrude outwardly of the vertical wall portions 122a, 122b. The both lateral ends of the pivot shaft 123 have inclined portions 123d that are inwardly inclined to facilitate mounting of the adaptor 130.

Figure 13:
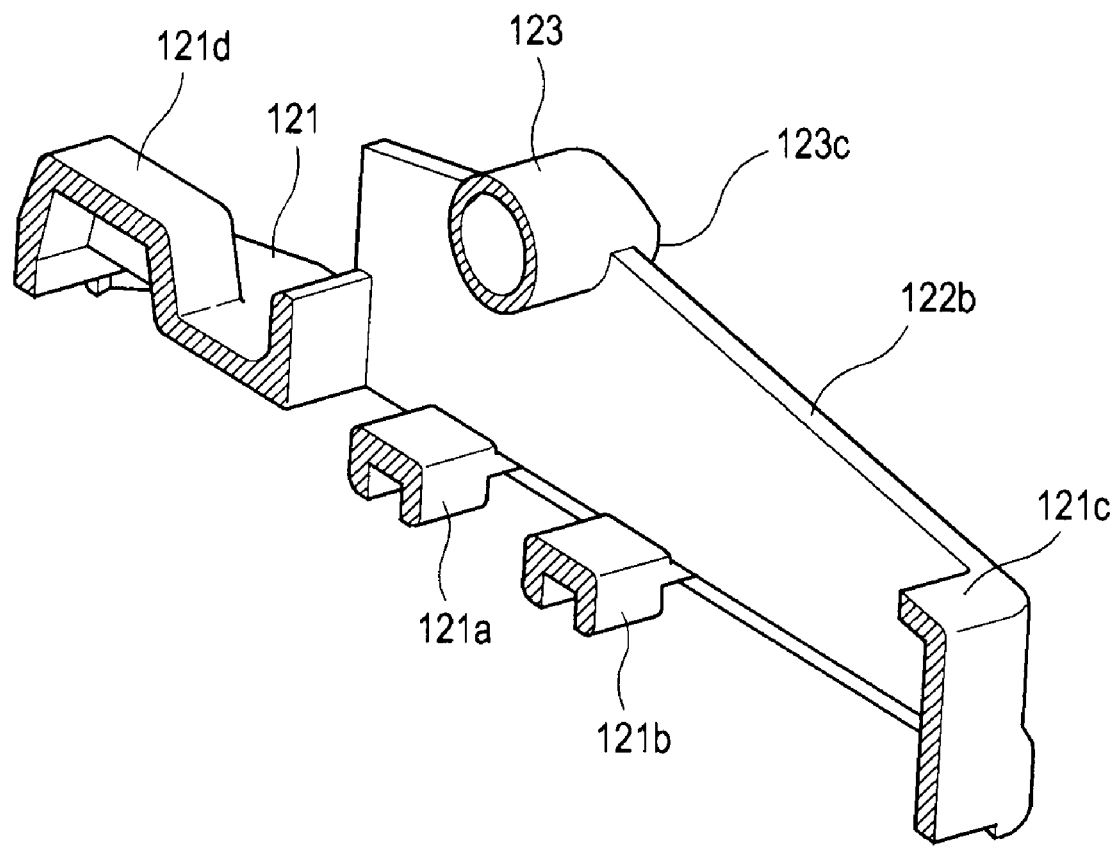
FIG. 13 is a perspective view of the bracket shown in FIG. 12 with a longitudinal section.
Figure 14:
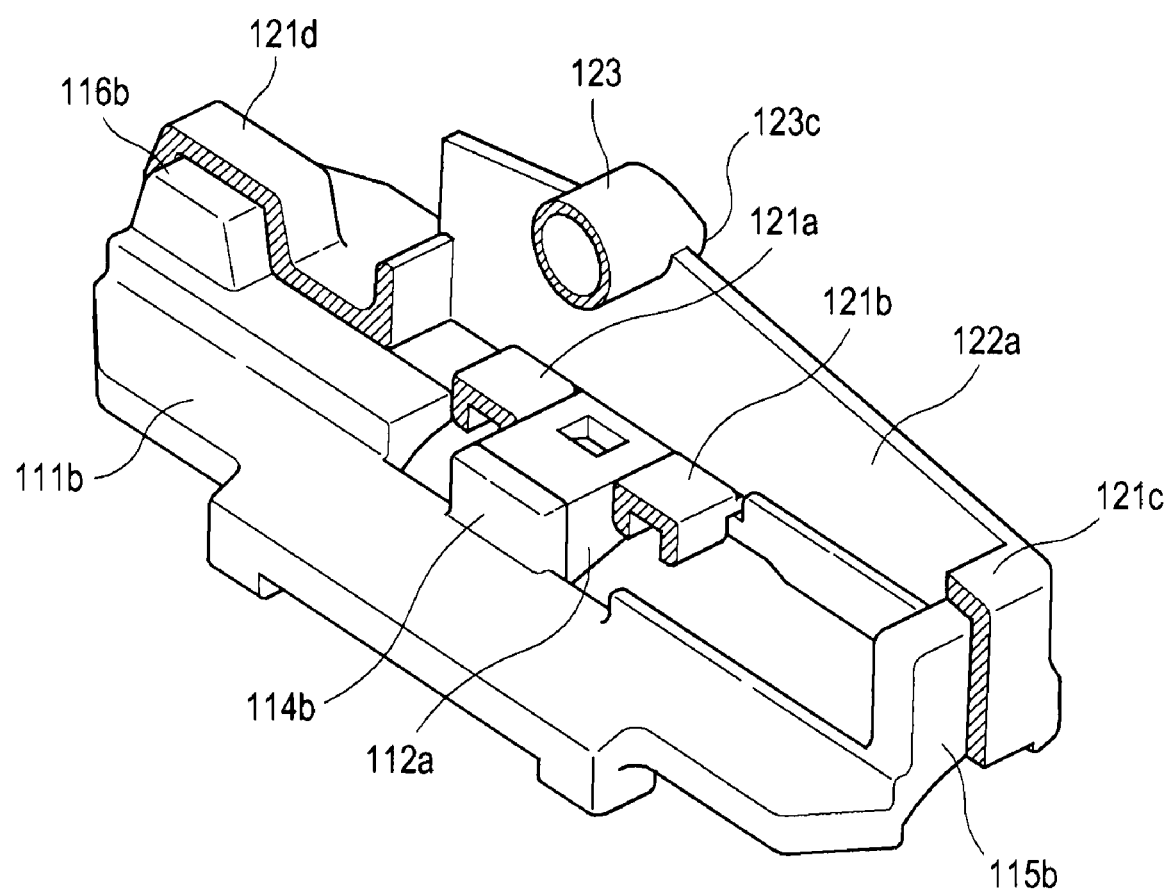
FIG. 14 is a perspective view illustrating an assembly of the joint and the bracket.
Figure 15:
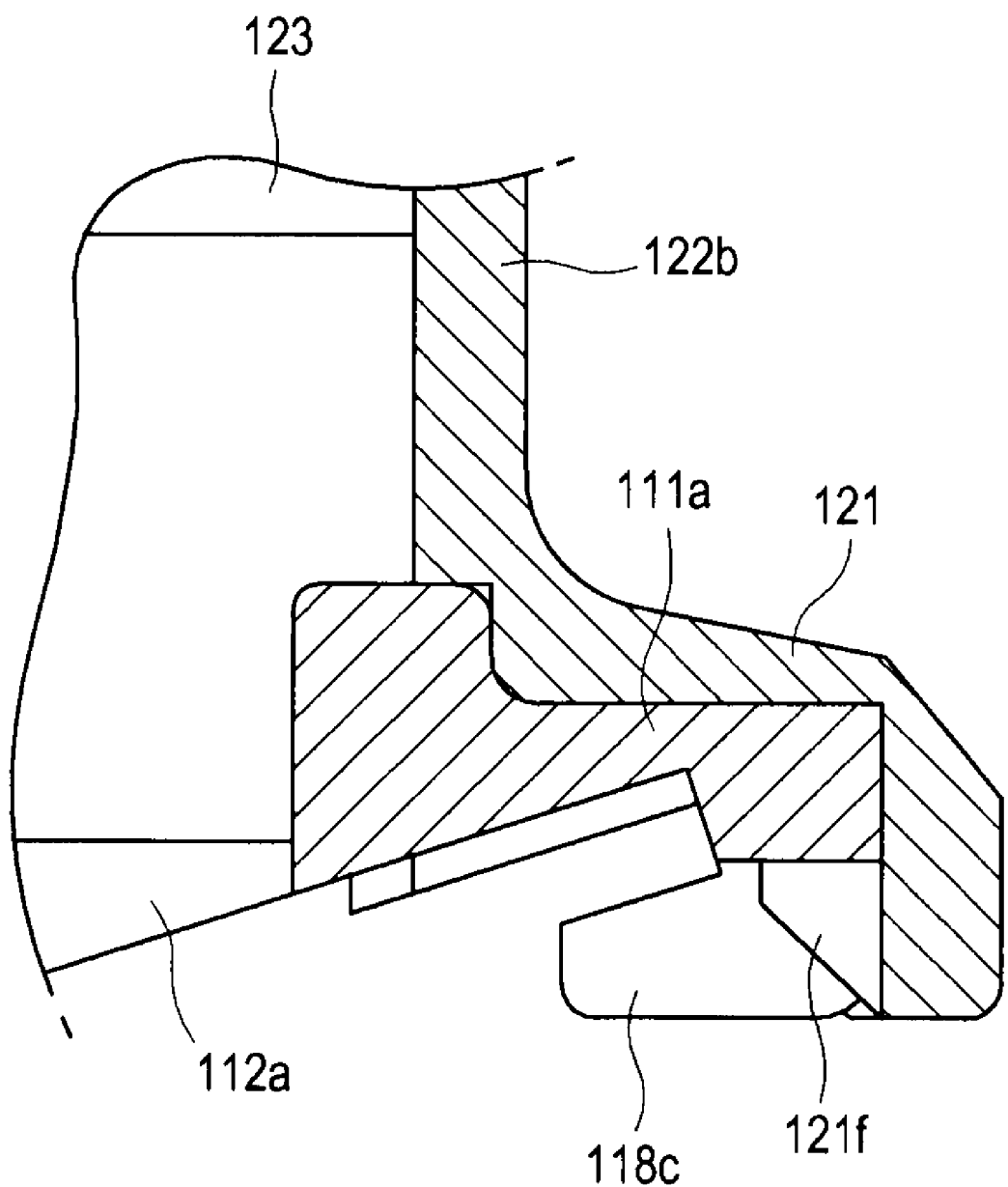
FIG. 15 is a partial cross-sectional view of the assembly of the joint and the bracket shown in FIG. 14.

FIG. 13 is a perspective view showing the internal side of the bracket. FIGS. 14 and 15 illustrate an assembly of the joint and the bracket.

Referring to FIGS. 12 to 15, the bracket 120 may have a positioning component for the positioning bracket 120 when the bracket 120 is coupled to the joint 110. In one embodiment of the positioning component, a ridge portion 121d is formed at a forward end side of the base 121 and an angularly-bent wall portion 121c is formed at a backward end side of the base 121. Further, two cross bars 121a, 121b having a reversed U cross-section are provided at lower ends of the vertical wall portions 122a, 122b. The ridge portion 121d is configured such that its lower surface corresponds to an upper surface of the second mating portion 116a, 116b. Thus, when the bracket 120 is mounted on the joint 110, the second mating portion 116a, 116b is fitted to the inside of the ridge portion 121d. In addition, the ridge portion 121d may lie between forward sides of the side wall portions 131, 132 of the adaptor 130 and prevent the adaptor 130 from shaking transversely relative to the pivot shaft 123. The angularly-bent wall portion 121c is located at backward end sides of the vertical wall portions 122a, 122b. The angularly-bent wall portion is formed so as to contact the upper and backward surfaces of the first mating portion 115a, 115b. The cross bars 121a, 121b are positioned so as to place bilaterally to the receiving portion 112a when the bracket 120 is mounted on the joint 110.

The bracket 120 may include a snap component for allowing snap-engagement to the joint 110. In one embodiment of the snap component, snap protrusions 121e of a wedge shape inwardly protrude from both lateral lower edges of the base 121 (see FIG. 15). Two snap protrusions are formed at each lateral lower edge of the base 121. The snap protrusions are snap-engaged to the half section bodies of the half sections of the joint between the two frame holding protrusions 118c. When the bracket 120 is positioned against the joint 110 via the positioning component 121a, 121b, 121c, 121d and is then pressed down toward the joint 110, the snap protrusions 121e are snap-engaged to the half section bodies of the joint 110 as portions of the base 121 having the snap protrusion 121e are curved or warped outwardly and then elastically returned inward.

Figure 16:
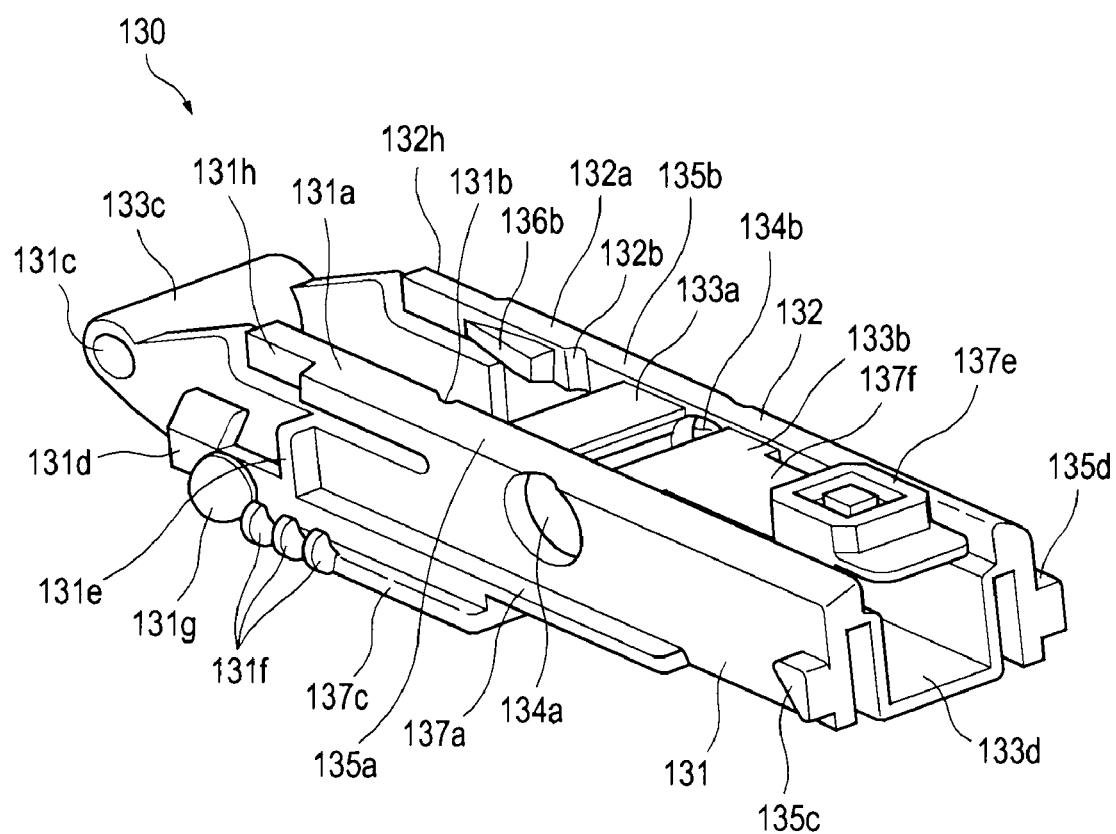
FIG. 16 is a perspective view illustrating an adaptor shown in FIG. 7.
Figure 17:
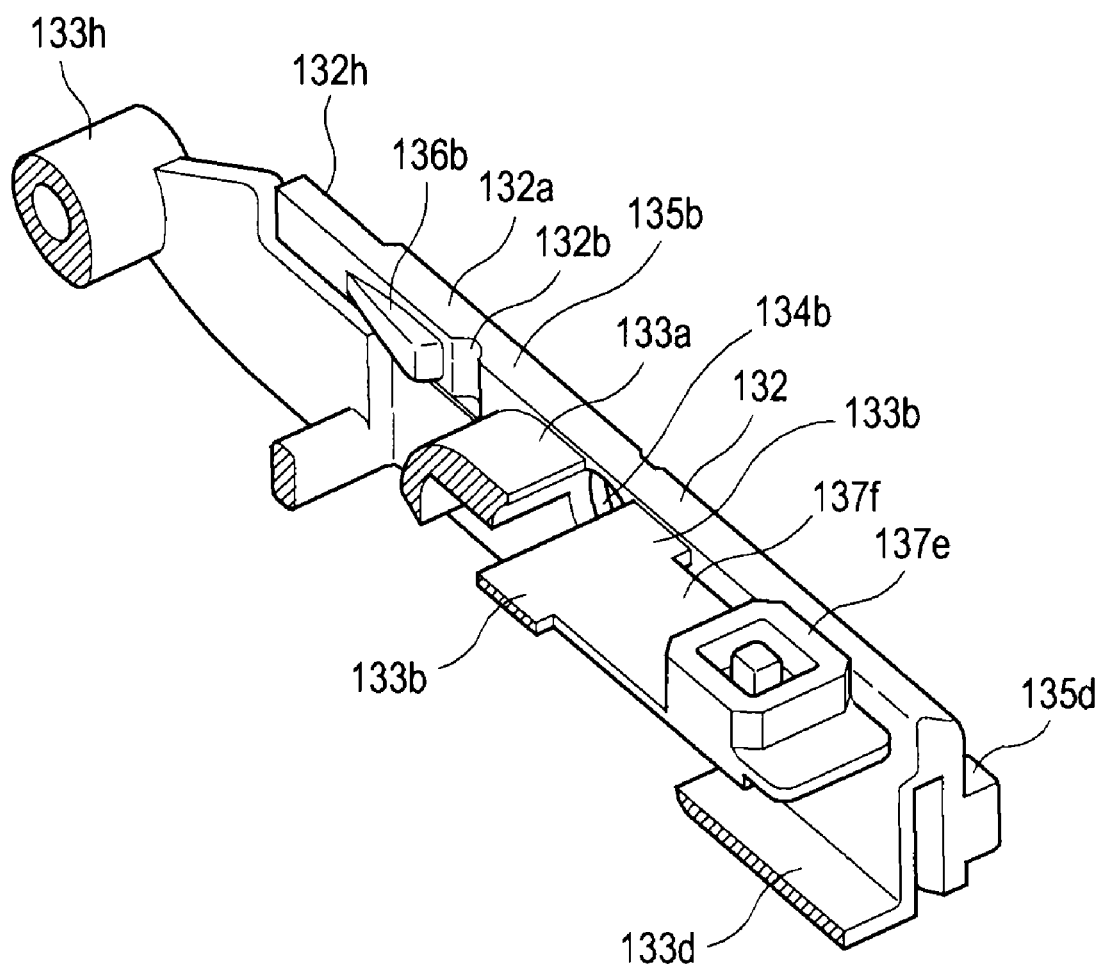
FIG. 17 is a perspective view illustrating an internal side of the adaptor shown in FIG. 16.
Figure 18:
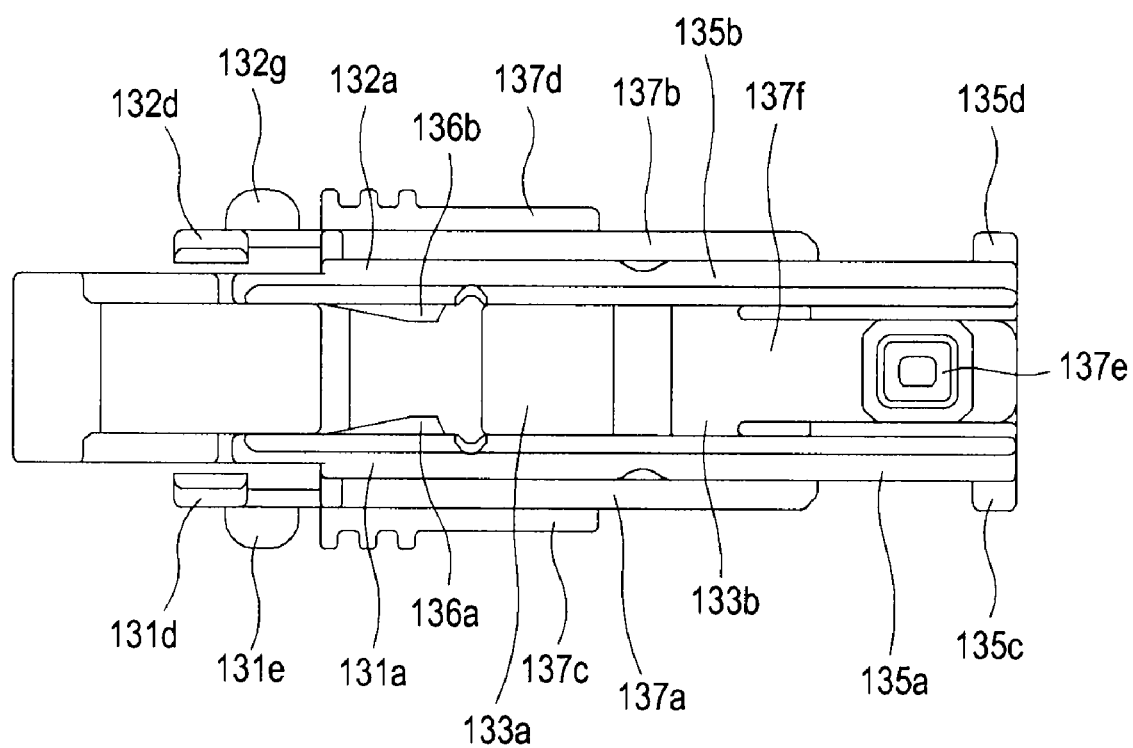
FIG. 18 is a plan view of the adaptor shown in FIG. 16.
Figure 19:
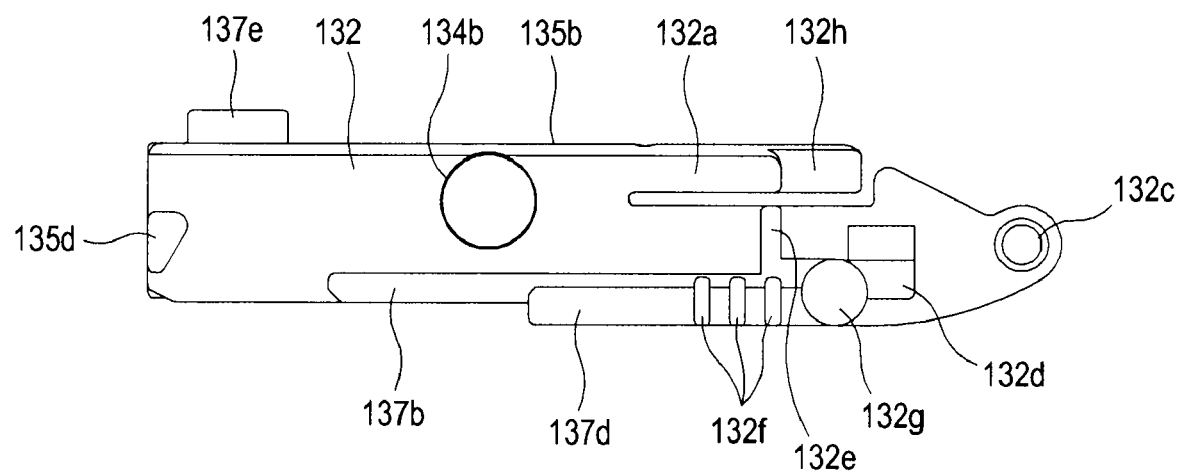
FIG. 19 is a side view of the adaptor shown in FIG. 16.

FIG. 16 is a perspective view showing the adaptor. FIG. 17 is a perspective view showing the internal side of the adaptor. FIG. 18 is a plan view of the adaptor. FIG. 19 is a side view of the adaptor.

Referring to FIGS. 16 to 19, in one embodiment, the adaptor 130 may include: a pair of side wall portions 131, 132; and first to fourth cross-connecting portions 133a, 133b, 133c, 133d connecting the side wall portions 131, 132 to each other. A section of the bracket 120 including the pivot shaft 123 may lie between the side wall portions 131, 132. Further, the ridge portion 121d provided at the forward side of the base 121 of the bracket 120 may lie between the forward sides of the side wall portions 131, 132. Fourth cross-connecting portion 133d that may be bent in a U-shape may lie between backward sides of the side wall portions 131, 132. In case the adaptor 130 is mounted on the bracket 120, the ridge portion 121d and the fourth cross-connecting portion 133d may prevent the adaptor 130 from shaking transversely relative to an axis of the pivot shaft 123.

Fitting apertures 134a, 134b are formed through the side wall portions 131, 132, respectively. Both lateral ends 123b, 123c may be fitted to the fitting apertures 134a, 134b, respectively. Spacing between inner surfaces of the side wall portions 131, 132 is slightly larger than a distance between outer surfaces of the vertical wall portions 122a, 122b. Further, the spacing between the inner surfaces of the side wall portions 131, 132 is set such that the tongue 13, 13' of the first coupling component 10, 10' and the hooked portion 21 of the second coupling component 20 can be received between the side wall portions 131, 132. When the adaptor 130 is mounted on the bracket 120, the pivot shaft 123 is brought in contact with lower edges of the side wall portions 131, 132 at inclined portions 123d of both lateral ends thereof. As the adaptor 130 is pressed down toward the bracket 120, both lateral ends of the pivot shaft 123 enter the fitting apertures 134a, 134b, while the side wall portions 131, 132 are elastically curved or warped outwardly of the adaptor 130. Then, if the lateral ends of the pivot shaft 123 are fully inserted into the fitting apertures 134a, 134b, the side wall portions 131, 132 elastically return, and thus, the lateral ends of the pivot shaft 123 and their respective fitting apertures 134a, 134b are fitted to each other. When the adaptor 130 is completely mounted on the bracket 120, outer surfaces of the side wall portions 131, 132 and outer edges of both lateral ends of the pivot shaft 123 are substantially flush with each other.

As described above, the adaptor 130 may be mounted on the bracket 120 by being pressed down toward the bracket 120 and then snap-engaged. The pivot shaft 123 is oriented perpendicular to the frame 9b and the wiper arms are coupled to the adaptor 130 parallel to the frame 9b. Thus, when the flat wiper blade 9 is connected to the wiper arm 1, 1', 2, 3, 4, both may relatively rotate clockwise or counterclockwise about the pivot shaft 123 within a certain angular range. Accordingly, when the flat wiper blade 9 is moved on the windshield surface by the wiper arm 1, 1', 2, 3, 4, the flat wiper blade 9 can be placed in close contact with the windshield surface in conformance with a curvature of the windshield surface.

The first cross-connecting portion 133a is situated in front of the fitting apertures 134a, 134b. A forward surface of the first cross-connecting portion 133a is rounded such that the inner surface 21b of the hooked portion 21 of the second coupling component 20 may be seated thereon. The second cross-connecting portion 133b is situated in the rear of the fitting apertures 134a, 134b. The third cross-connecting portion 133c is situated at forward ends of the side wall portions 131, 132. In the illustrated embodiment, the third cross-connecting portion 133c includes a tubular member with its both lateral ends opened. Apertures 131c, 132c located at the lateral ends of the third cross-connecting portion 133c serve to pivotally couple the cover 140, as will be described below. The fourth cross-connecting portion 133d is situated at backward ends of the side wall portions 131c, 132c and is generally U-shaped. Thus, a gap or space is formed between lateral surfaces of the fourth cross-connecting portion 133d and inner surfaces of the side wall portions 131, 132. A portion of backward side of the vertical wall portions 122a, 122b may be inserted into said gap or space when the adaptor 130 is mounted on the bracket 120.

Figure 20:
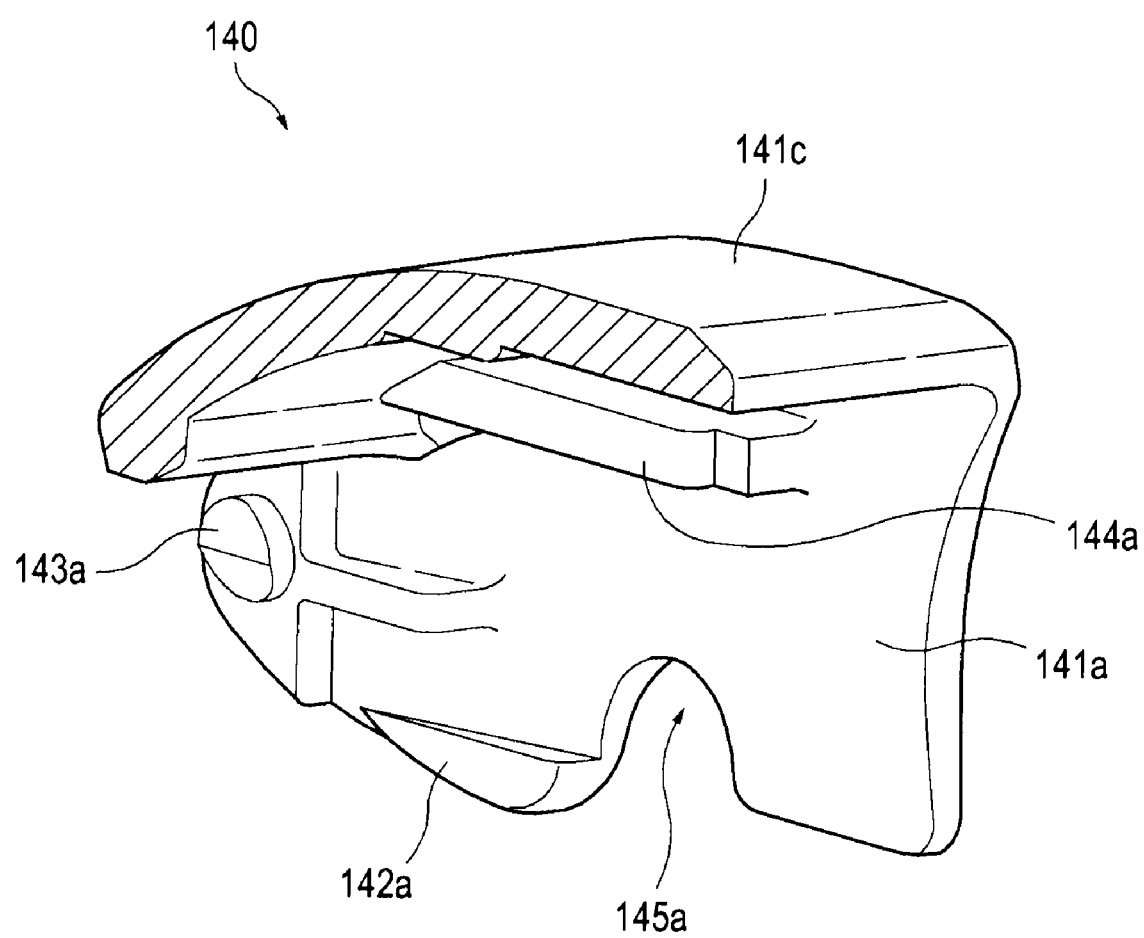
FIG. 20 is a perspective view illustrating an internal side of a cover shown in FIG. 7.
Figure 21:
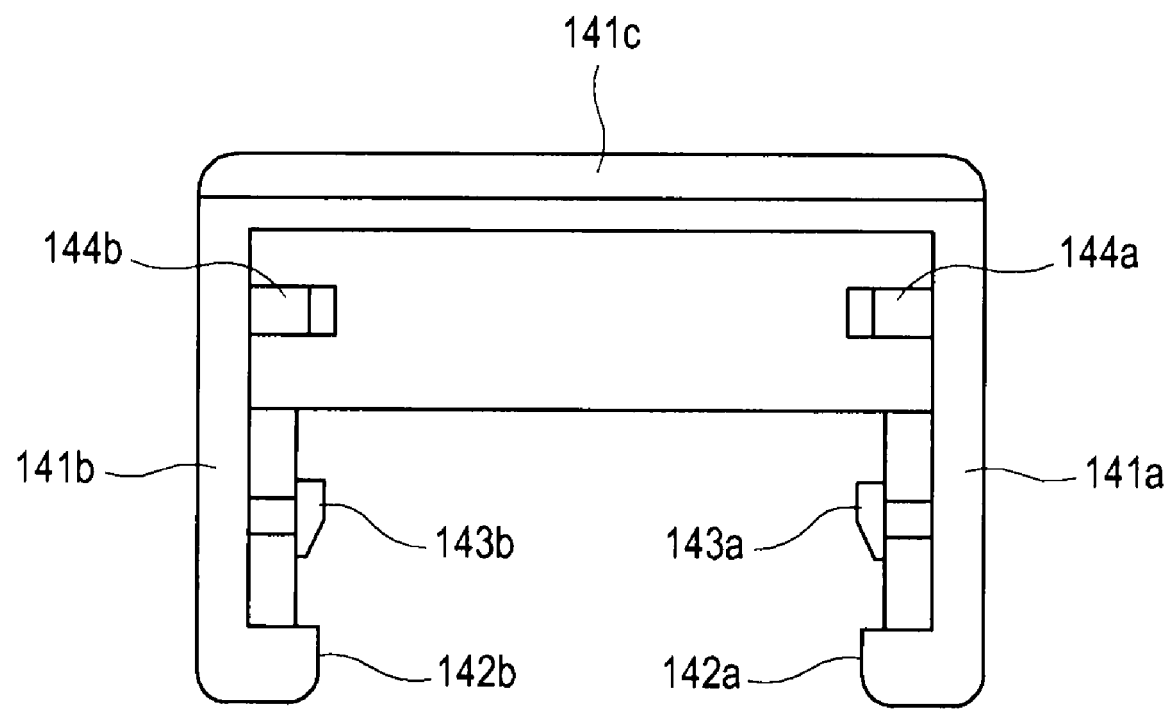
FIG. 21 is a side view of the cover shown in FIG. 20.
Figure 22:
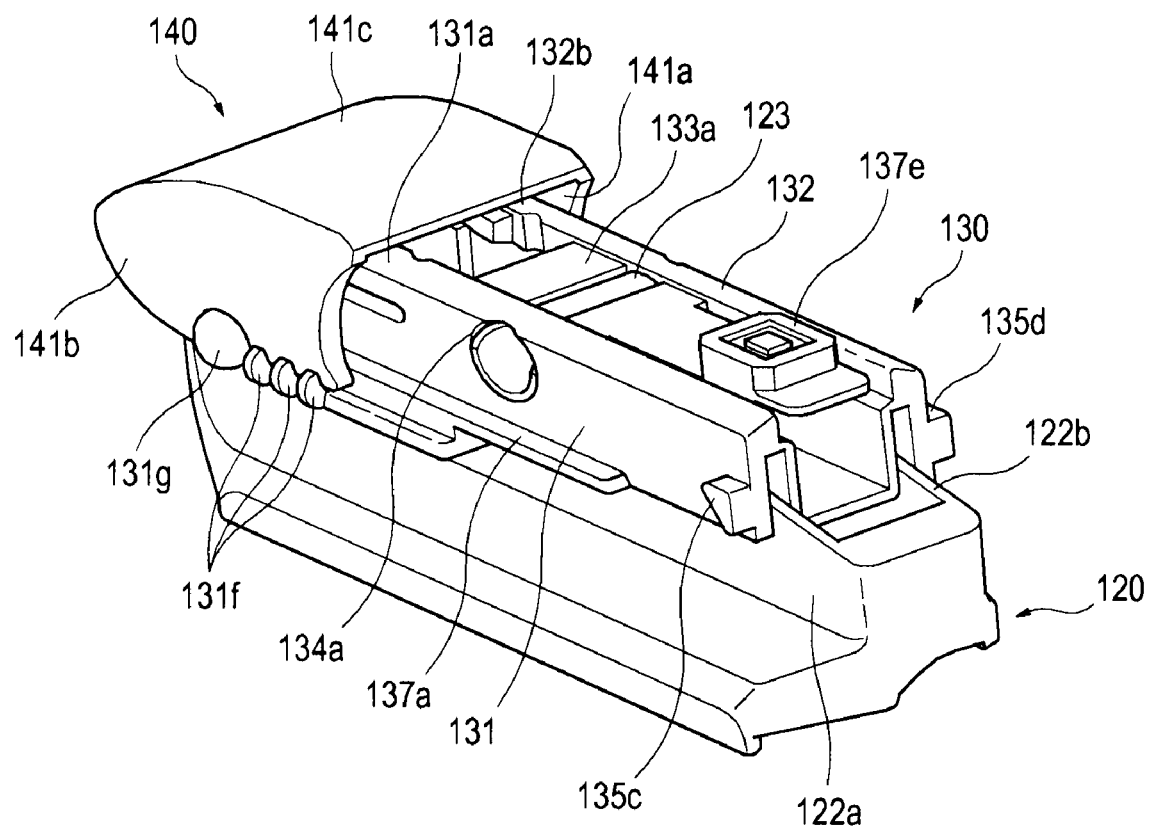
FIG. 22 is a perspective view illustrating an assembly of the bracket, the adaptor and the cover.

The internal side of the cover is illustrated in FIG. 20. FIG. 21 is a side view of the cover. FIG. 22 shows an assembly of the bracket, the adaptor and the cover.

The cover 140 may serve to help or participate in locking operations between the first and second coupling components 10, 10', 20 and the adaptor 130. Further, the cover 140 serves to cover or hide the distal end of the wiper arm 1, 1', 2 and the adaptor 130 in part. Referring to FIGS. 20 and 21, in one embodiment, the cover has a general U-shape. The cover 140 includes a top plate 141c placed above upper edges of the side wall portions 131, 132 and a pair of side plates 141a, 141b facing toward the side wall portions 131, 132, respectively. A spacing between side plates 141a, 141b is set such that the side plates 12a, 12b, 12a', 12b' of the first coupling element lie between them with a little play. Pivot pins 143a, 143b for pivotally coupling the cover 240 to the adaptor 130 inwardly protrude from a forward end of the cover 140 (i.e., forward ends of the side plates 141a, 141b). Pivot pins 143a, 143b are fit-engaged to the apertures 131c, 132c formed at both lateral ends of the third cross-connecting portion 133c. To facilitate the fit-engagement, the pivot pins 143a, 143b have inclined portions at their lower sides. The cover 140 may be easily coupled to the adaptor 130 by contacting the pivot pins 143a, 143b to the both lateral ends of the third cross-connecting portions 133c and pressing it inwardly of the adaptor 130.

The cover 140 may be configured to pivot toward the adaptor 130 and be locked thereto. To this end, in one embodiment, the cover 140 has latch protrusions 142a, 142b at lower inner sides of the side plates 141a, 141b. Correspondingly, the adaptor 130 has locking bars 131d, 132d (see FIG. 18), to which the latch protrusions 142a, 142b are snap-engaged when the cover 140 is fully pivoted to the adaptor 130. The locking bars 131d, 132d extend parallel to the respective side wall portions 131, 132 from the stopper walls 131e, 132e, which are formed at the respective side wall portions 131, 132 in front of the fitting apertures 143a, 143b. Distal ends of the locking bars 131d, 132d comprise free ends. Thus, the locking bars 131d, 132d are elastically flexible toward the side wall portions 131, 132. The locking bars 131d, 132d have inclined pieces at their distal ends, which are contacted to the latch protrusions 142a, 142b and the curve locking bars 131d, 132d toward the side wall portions along with lowering down of the latch protrusions 142a, 142b. The latch protrusions 142a, 142b are engaged to lower edges of the locking bars 131d, 132d, thereby locking the cover 140 to the adaptor 130. An engagement position between the latch protrusions 142a, 142b and the locking bars 131d, 132d is set such that the top plate 11, 11' of the first coupling component 10, 10' or a backward section of the second coupling component 20 may be interposed between a lower surface of the top plate 141a of the cover 140 and the upper edges of the side wall portions 131, 132 with a little play or without any play.

The adaptor 130 includes cover stoppers 131g, 132g to restrict the pivoting of the cover 140 at the locking bars 131d, 132d. The cover stoppers 131g, 132g may have a hemisphere shape. Concave portions 145a are formed at lower edges of the side plates 141a, 141b so as to correspond to the cover stoppers 131g, 132g. The cover stoppers 131e, 132d and the concave portions 145a are configured such that when the cover 140 is pivoted to the adaptor 130 and the cover stoppers 131g, 132g are contacted to the concave portions 145a, the latch protrusions 142a, 142b are engaged to the locking bars 131d, 132d and the backing protrusions 144a, 144b lie next to the stepped portions 131h, 132h of the clamping bars 131a, 132a.

The adaptor 130 has cover retaining protrusions 131f, 132f to prevent the cover 140 from shaking when the cover 140 is closed. The cover retaining protrusions 131f, 132f are located at lower edges of the side wall portions 131, 132 (e.g., at stopper portions 137c, 137d). The cover retaining protrusions 131f, 132f are spaced apart from the outer surfaces of the side wall portions 131, 132 by a predetermined gap (e.g., as spaced apart from the slide rails 137a, 137b by a predetermined gap). As shown in FIG. 22, when the cover 140 is closed and locked to the adaptor 130, the lower sides of the side wall portions 141a, 141b of the cover 140 are fitted between the cover retaining protrusions 131f, 132f and the slide rails 137a, 137b. Thus, the cover 140 may be prevented from shaking.

In the first exemplary embodiment, the first locking device may include the following: a positioning device for concave portions 14a, 14b, 14a', 14b' of the first coupling component 10, 10' to the side wall portions 131, 132 such that the adaptor 130 can be pivoted relative to the first coupling component 10, 10'; and a securing device for top plates 11, 11' of the first coupling component 10, 10' on the side wall portions 131, 132.

The positioning device may include the pivot protrusions 135c, 135d outwardly protruding from the respective backward ends of the side wall portions 131, 132. The pivot protrusions 135c, 135d are configured to be inserted to the concave portions 14a, 14b, 14a', 14b'. The pivot protrusions 135c, 135d may take the shape of a triangle with a rounded corner.

The securing device is configured to lock the top plates 11, 11' to the side wall portions 131, 132. In one embodiment, the securing device includes the following: a seat component on which the top plate 11, 11' is seated; the cover 140; and a cover locking device for locking the cover 140 to the adaptor 130. In the illustrated embodiment, the seat component is the upper edges or upper surfaces 135a, 135b of the side wall portions 131, 132. Further, the cover locking device includes the latch protrusions 142a, 142b provided inside of the side plates 141a, 141c and locking bars 131d, 132d provided at the respective side wall portions 131, 132 so as to be snap-engaged to the latch protrusions 142a, 142b when the cover 140 is fully pivoted to the adaptor 130. Other embodiment of the cover locking device may include wedge-shaped protrusions that are formed on outer surfaces of the side wall portions 131, 132 to be complementarily engaged to the latch protrusions 142a, 142b.

In the first exemplary embodiment, the second locking device may include a pair of second locking protrusions 136a, 136b provided at inner surfaces of the side wall portions 131, 132 adjacent to the first cross-connecting portions 133a. The second locking protrusions 136a, 136b have a wedge shape such that the hooked portion 21 of the second coupling component 21 can be easily inserted between the second locking protrusions. Inclined surfaces of the second locking protrusions face forwardly of the adaptor 130, while the engagement surfaces thereof face backwardly of the adaptor 130. A gap between the engagement surfaces of the second locking protrusions 136a, 136b and the forward surface of the first cross-connecting portion 133a may generally correspond to a thickness of the hooked portions 21. Further, the second locking protrusions 136a, 136b may be configured to be elastically movable inwardly and outwardly of the adaptor 130. To this end, in one embodiment, each of the side wall portions 131, 132 has an elastically curving clamping bar 131a, 132a. The second locking protrusions 136a, 136b are formed at opposed sides of the clamping bars 131a, 132a, respectively.

In the illustrated embodiment, the clamping bars 131a, 132a are formed, for example, by slitting portions of the side wall portions 131, 132 adjacent to their upper edges parallel to the upper edges. In addition, notches 131b, 132b are formed at base end portions of the clamping bars 131a, 132a, thereby allowing the clamping bars 131a, 132a to be curved more easily. The stepped portions 131h, 132h are formed at forward free ends of the clamping bars 131a, 132a. The stepped portions are configured to contact the backing protrusions 144a, 144b of the cover 140.

The second locking device may further include a component for supplementing the locking operation between the connecting device 100 and the wiper arm 2 by restricting the second locking protrusions 136a, 136b from moving outwardly of the side wall portions 131, 132 when the second coupling component 20 is locked to the side wall portions 131, 132. In one embodiment, the component may be provided at the cover 140 to implement the supplementing function when the cover 140 is coupled to the adaptor 130. In the illustrated embodiment, the component includes a pair of backing protrusions 144a, 144b formed on inner surfaces of the side plates 141a, 141b of the cover 140. Spacing between the backing protrusions 144a, 144b is slightly larger than a distance between the stepped portions 131h, 132h. The backing protrusions 144a, 144b are configured such that when the cover 140 is coupled to the adaptor 130, they lie near the stepped portions 131h, 132h or slightly press the stepped portions 131h, 132h. Thus, when the cover 140 is fully pivoted and locked to the adaptor 140, the backing protrusions 144a, 144b prevent the clamping bars 131a, 132a from curving outwardly of the side wall portions 131, 132. Accordingly, where the hooked portion 21 of the second coupling component 20 is locked as fitted between the second locking protrusions 136a, 136b and the first cross-connecting portion 133a, a firm locking between the hooked portion 21 and the adaptor 130 can be obtained with the help of the backing protrusions 144a, 144b.

In the first exemplary embodiment, the third locking device may include the following: slide rails 137a, 137b slidably moving between the side plates 32a, 32b of the third coupling component 30 and being fitted thereto; stopper walls 131e, 132e disposed so as to contact the forward ends of the side plates 32a, 32b; and a latching protrusion 137e elastically latchable to an aperture 31a of the top plate 31. In the illustrated embodiment, the slide rails 137a, 137b protrude from the lower edges of the side wall portions 131, 132 along a length direction, respectively. Further, the third locking device may include the stopper portions 137c, 137d to limit the insertion of the adaptor 130 into the third coupling component 30 by being contacted to the stopper portions 33a, 33b provided at the lower edges of the side plates 32a, 32b of the third coupling component 30. The stopper portions 137c, 137d have a length shorter than that of the slide rails 137a, 137b. The stopper portions 137c, 137d protrude outwardly of the slide rails 137a, 137b beneath the slide rails. The latching protrusion 137e may be provided at the backward side of the side wall portions 131, 132. In the illustrated embodiment, the latching protrusion 137e is provided at a free end of an elastic cantilevered bar 137f backwardly extending from the second cross-connecting portion 133b. Since the bar 137f may be elastically curved upwardly and downwardly about the second cross-connecting portion 133b, the latching protrusion 137e may be elastically latched to the aperture 31a. The elastic bar 137f is positioned such that when the forward ends of the side plates 32a, 32b of the third coupling component 30 are contacted to the stopper walls 131e, 132e, the latching protrusion 137e can be latched to the aperture 31a. In unlocking the adaptor 130 and the third coupling component 30, when the latching protrusion 137e is pressed downwardly and then unlatched from the aperture 31a, the connecting device 100 may be separated from the third coupling component 30.

In the first exemplary embodiment, the fourth locking device may include: pivot shaft 123, to which the side pin 41 of the fourth coupling component 40 may be pivotally fitted; and a component to which the clip arm 42 of the fourth coupling component 40 may be snap-engaged. In the illustrated embodiment, the component is the outer surface of the side wall portion 132. The distance between outer surfaces of the side wall portions 131, 132 is set such that the clip arm 42 can be snapped to the outer surface of the side wall portion 132.

Figure 23:
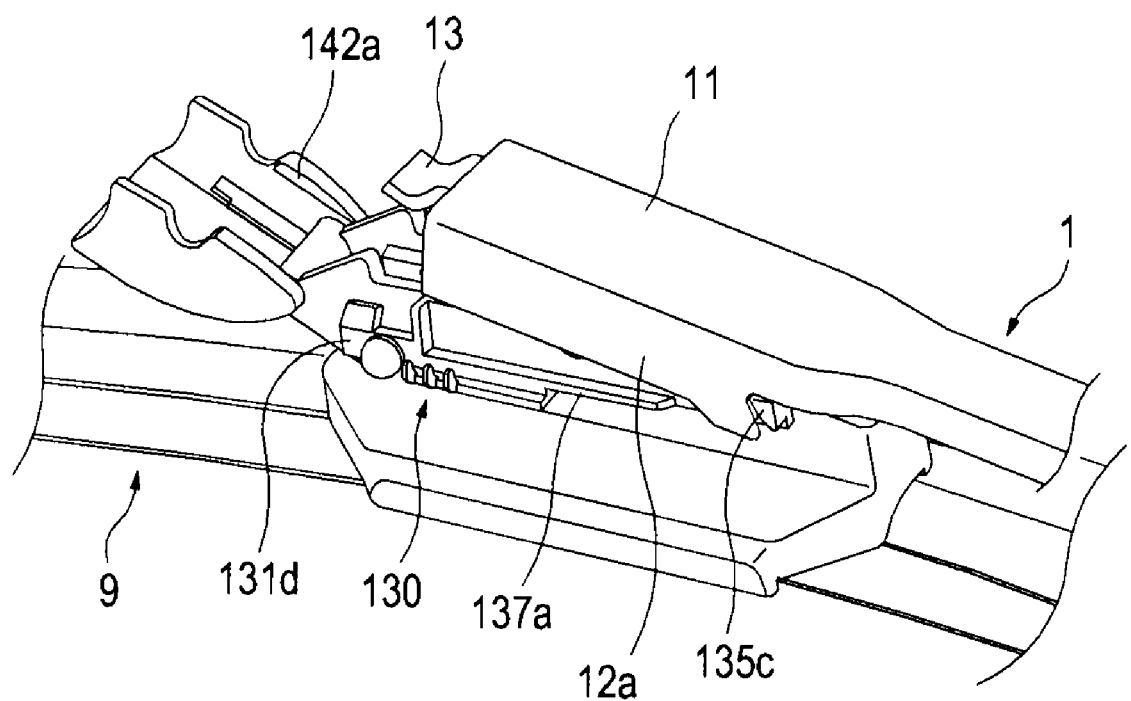
FIG. 23 is a perspective view illustrating an exemplary connection operation between a flat wiper blade and a top lock wiper arm using the connecting device according to the first embodiment.
Figure 24:
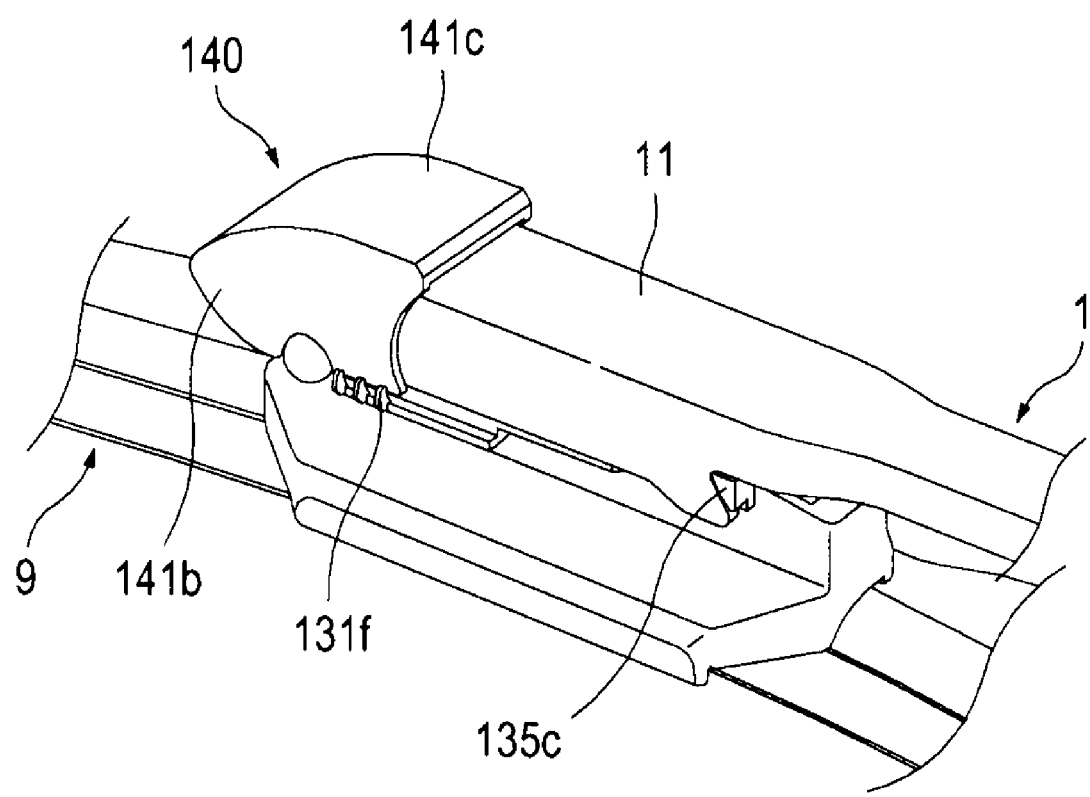
FIG. 24 is a perspective view illustrating that a flat wiper blade and a top lock wiper arm are connected to each other using the connecting device according to the first embodiment.

FIGS. 23 and 24 illustrate a locking operation between the connecting device 100 and the wiper arm I having the first coupling component 10 at its distal end. With reference to FIGS. 1, 23 and 24, an exemplary connection example between the connecting device 100 and the wiper arm 1 will be described in detail.

As the cover 140 is turned forward from the adaptor 130, the pivot protrusions 135c, 135d of the adaptor 130 are fitted to the corresponding concave portions 14a, 14b of the first coupling component 10. When the pivot protrusions 135c, 135d are contacted to the concave portions 14a, 14b, the adaptor 130 (and the flat wiper blade 9 with the adaptor 130 mounted thereon) can be pivoted to the first coupling component 10 about the pivot protrusions 135a, 135b. When fully pivoted, the tongue 13 lies between the forward sides of the side wall portions 131, 132 (specifically the forward sides including the forward end portions of the clamping bars 131a, 132a) and the top plate 11 is contacted to the upper edges of the side wall portions 131, 132. Subsequently, the cover 140 is turned back toward the adaptor 130 until the latch protrusions 142a, 142b are engaged to the locking bars 131d, 132d. The cover 140 may be locked to the adaptor 130 due to the engagement between the latch protrusions and the locking bars. Then, the lower surface of the top plate 141 c of the cover 140 is partially placed in contact with the upper surface of the top plate 11 of the first coupling component 10. Further, the inner surfaces of the side plates 141a, 141b of the cover 140 are partially placed against the outer surface of the side plates 12a, 12b of the first coupling component 10 with a little spacing. Thus, the adaptor 130 is held on the first coupling component 10 and locked together therewith. Moreover, since the lower edges of the side plates 141a, 141b of the cover 140 are fixed between the cover holding protrusions 131f, 132f and the side wall portions 131, 132 after locking between the cover 140 and the adaptor 130, the adaptor 130 can be prevented from shaking transversely relative to the first coupling component 10. As described above, the flat wiper blade 9 may be connected to the wiper arm 1 with the first coupling component 10 at its distal end in such a manner that the adaptor 130 is secured to the first coupling component 10 via the positioning device of the first locking device (e.g., pivot protrusions 135c, 135d) at its backward end side and via the cover 140 and the cover locking device (e.g., latch protrusions 142a, 142b and locking bars 131d, 132d) at its forward end side.

Figure 25:
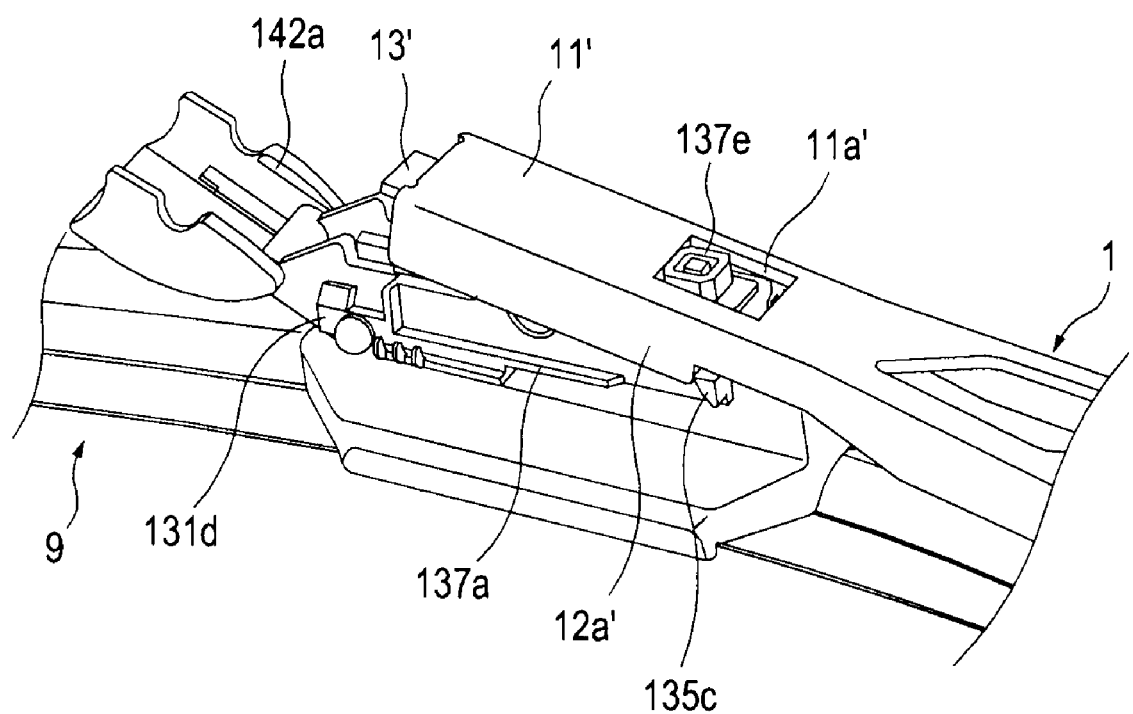
FIG. 25 is a perspective view illustrating an exemplary connecting operation between a flat wiper blade and another top lock wiper arm using the connecting device according to the first embodiment.
Figure 26:
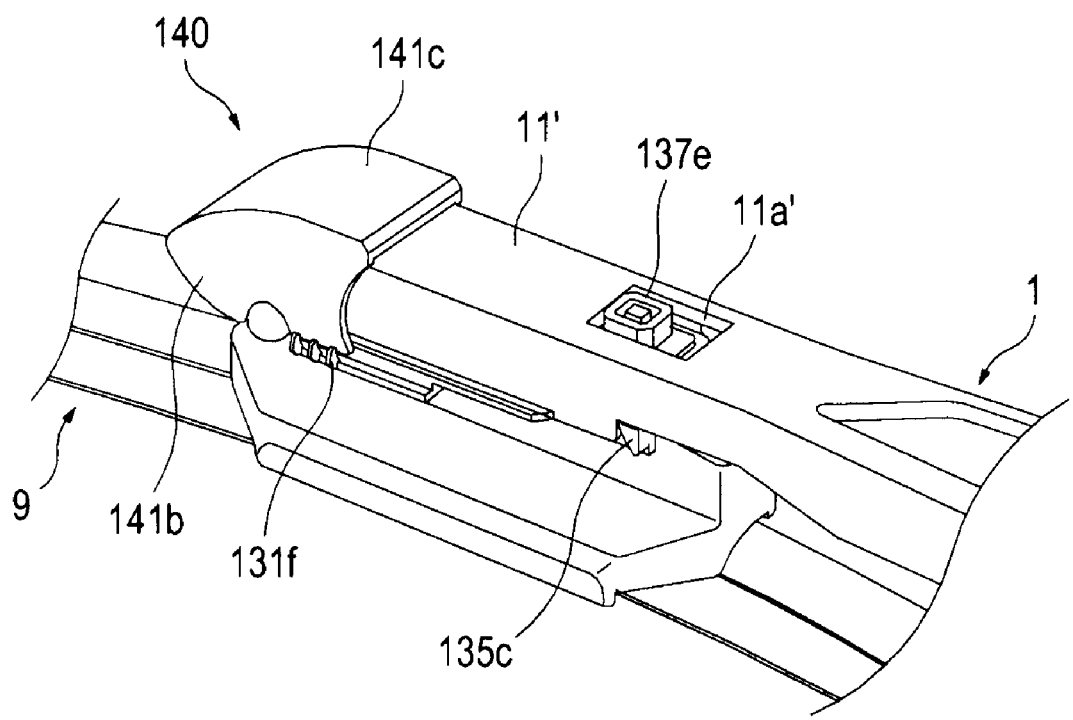
FIG. 26 is a perspective view illustrating that a flat wiper blade and another top lock wiper arm are connected to each other using the connecting device according to the first embodiment.

FIGS. 25 and 26 illustrate a locking operation between the connecting device 100 and the wiper arm 1' with the first coupling component 10' at its distal end.

As the cover 140 is turned forward from the adaptor 130, the pivot protrusions 135c, 135d of the adaptor 130 are fitted to the corresponding concave portions 14a', 14b' of the first coupling component 10'. Subsequently, the flat wiper blade 9 with the adaptor 130 mounted thereon is pivoted to the first coupling component 10' and the adaptor 130 and the first coupling component 10' are contacted to each other at their corresponding parts. Thereafter, the cover 140 is turned back toward the adaptor 130, thereby finishing the locking operation. The connecting device 100 may be locked to the wiper arm 1' having the first coupling component 10' in the same manner as the first coupling component 10. When the locking operation is finished, the latching protrusion 137e may be inserted into the aperture 11a' of the first coupling component 10'.

Figure 27:
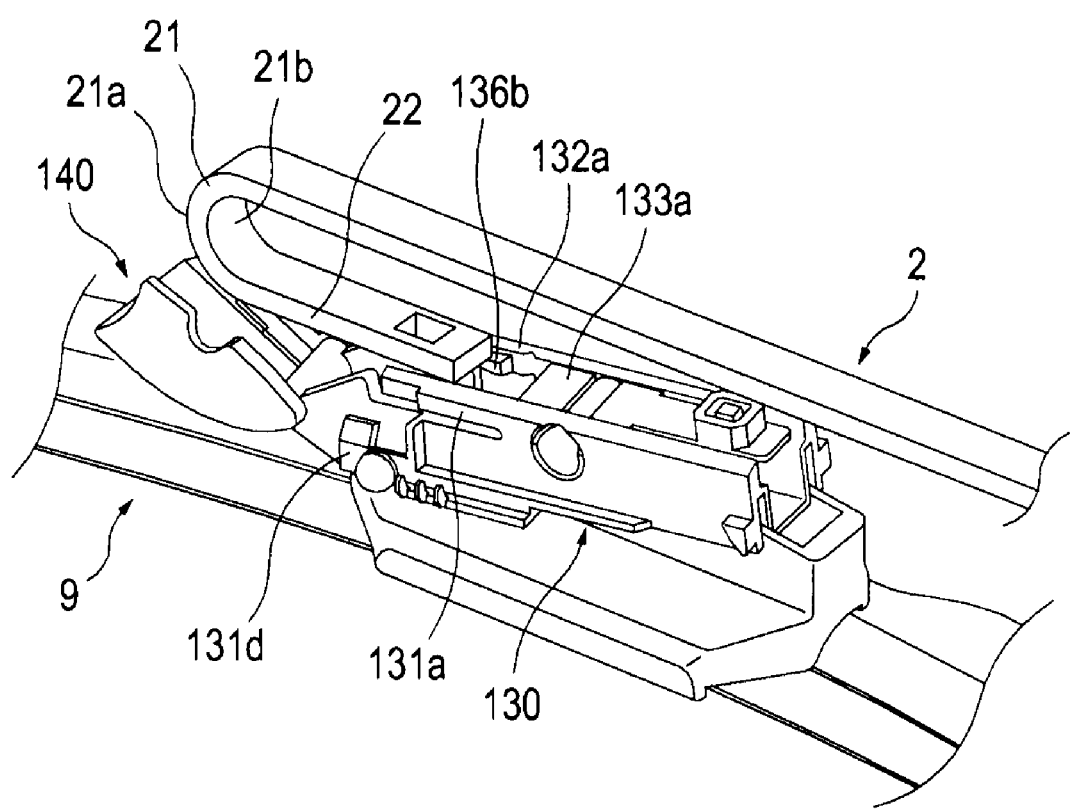
FIG. 27 is a perspective view illustrating an exemplary connecting operation between a flat wiper blade and a hook wiper arm using the connecting device according to the first embodiment.
Figure 28:
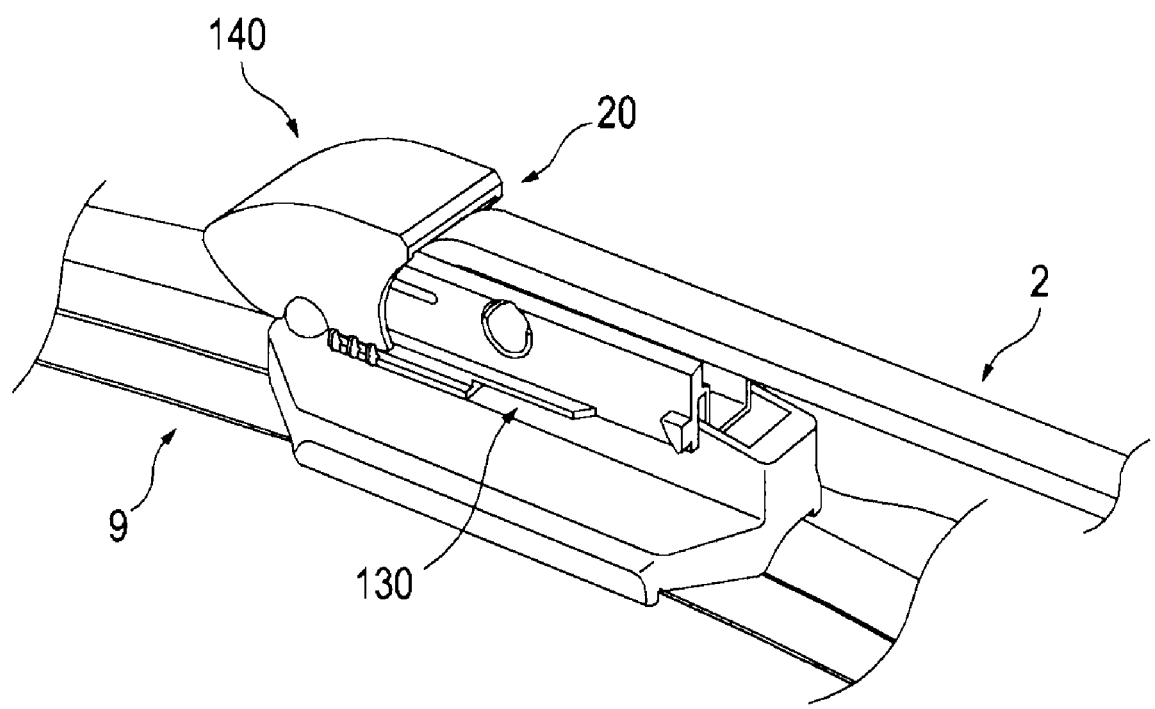
FIG. 28 is a perspective view illustrating that a flat wiper blade and a hook wiper arm are connected to each other using the connecting device according to the first embodiment.

FIGS. 27 and 28 illustrate a locking operation between the connecting device 100 and the wiper arm 2 having the second coupling component 20 at its distal end.

As the cover 140 is turned forward from the adaptor 130, the extension portion 22 of the second coupling component is inserted inwardly of the adaptor 130 through and between the clamping bars 131a, 132a. During insertion, the clamping bars 131a, 132a are curved outwardly as the hooked portion 21 and the second locking protrusions 136a, 136b are contacted to each other. Also, as the hooked portion 21 passes by the second locking protrusions 136a, 136b, the clamping bars return, and thus, the second locking protrusions 136a, 136b engage to the outer surface 21a of the hooked portion 21. At this time, the inner surface 21b of the hooked portion 21 is placed into contact with the forward surface of the first cross-connecting portion 133a, while the extension portion 22 underlies the first cross-connecting portion 133a and the pivot shaft 123.

When the adaptor 130 is locked to the hooked portion 21 by the second locking device (e.g., clamping bars 131a, 132a and second locking protrusions 136a, 136b), the cover 140 is turned back toward the adaptor 130 and is closed thereto. Then, as the latch protrusions 142a, 142b engage the locking bars 131d, 132d, the backing protrusions 144a, 144b are positioned near the stepped portions 131h, 132h to restrict the clamping bars 131a, 132a. Then, the locking operation is finished.

Figure 29:
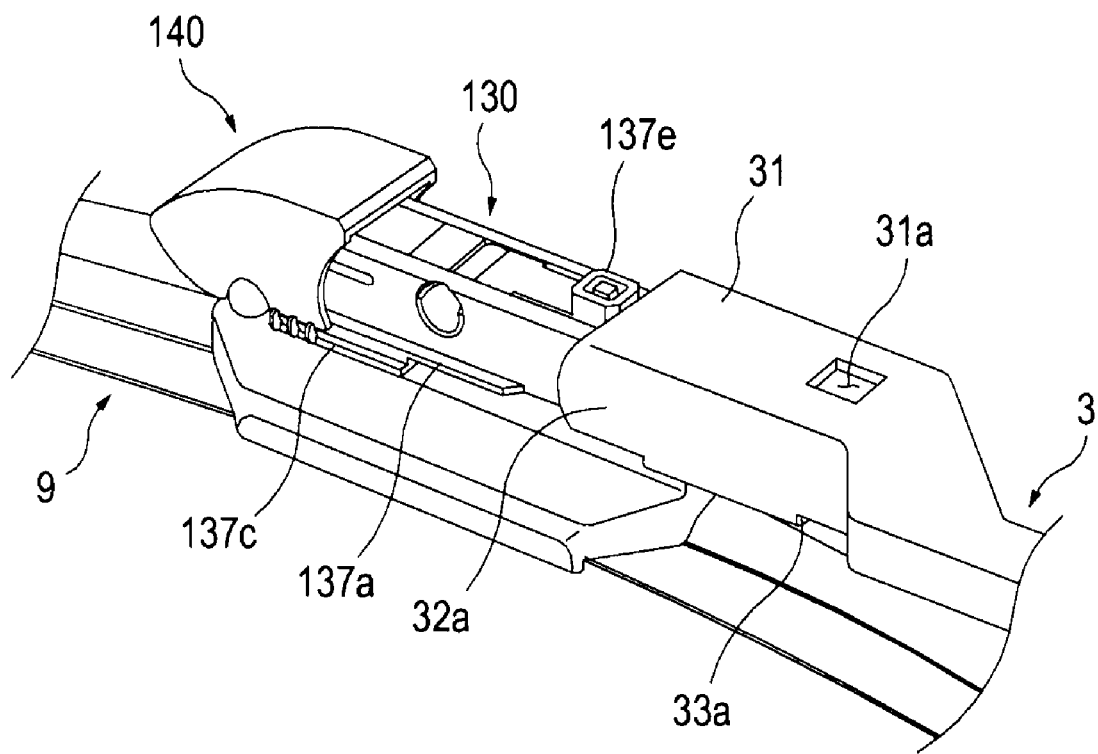
FIG. 29 is a perspective view illustrating an exemplary connecting operation between a flat wiper blade and a bayonet wiper arm using the connecting device according to the first embodiment.
Figure 30:
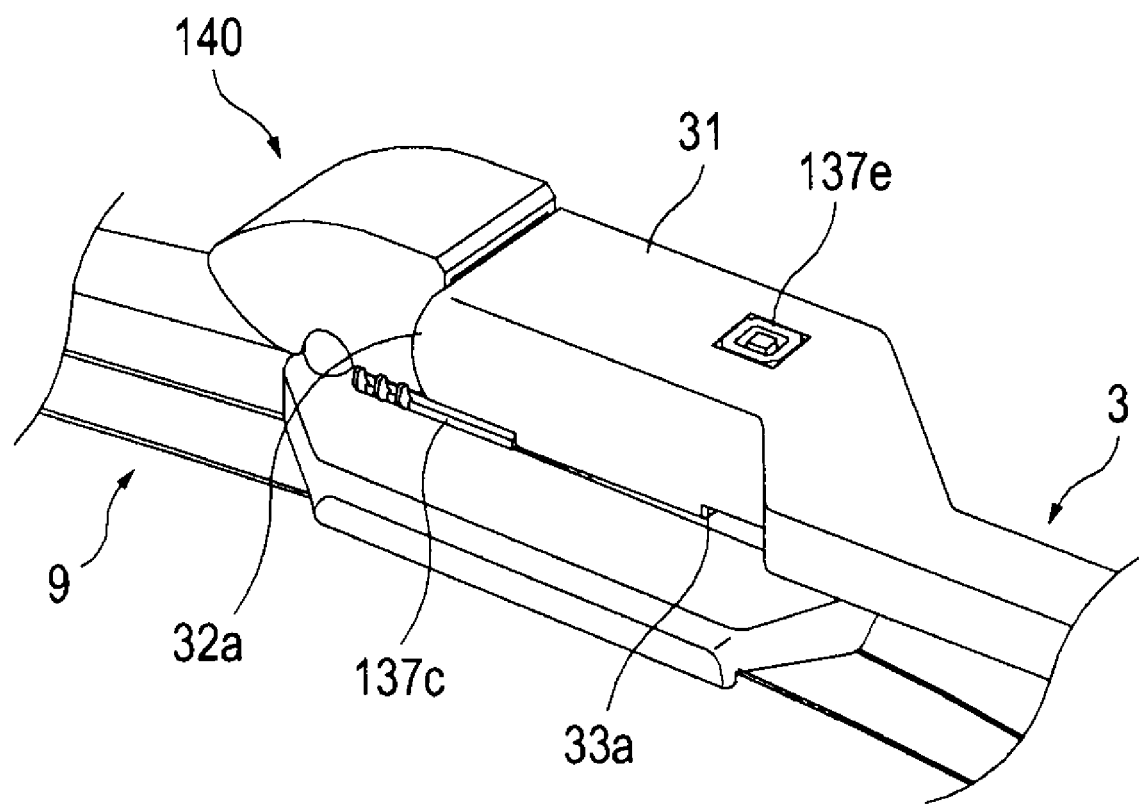
FIG. 30 is a perspective view illustrating that a flat wiper blade and a bayonet wiper arm are connected to each other using the connecting device according to the first embodiment.

FIGS. 29 and 30 illustrate a locking operation between the connecting device 100 and the wiper arm 3 having the third coupling component 30 at its distal end.

As illustrated in FIG. 29, the adaptor 130 mounted on the flat wiper blade 9 is inserted into the third coupling component 30 from the backward end side of the adaptor 130. The adaptor 130 is fitted into the third coupling component 30 as the slide rails 137a, 137b are slidably contacted to the inner surfaces of the side plates 32a32b, respectively. The fitting locking is finished when the forward ends of the side plates 32a, 32b contact the stopper walls 131e, 132e, the stopper portions 33a, 33b contact the stopper portions 137c, 137d of the slide rails 137a, 137b, and the latching protrusion 137e is latched to the aperture 31a of the top plate 31. Since the latching protrusion 137e is latched to the aperture 31a of the top plate 31, the unlocking of the third coupling component 30 and the adaptor 130 can be prevented.

Figure 31:
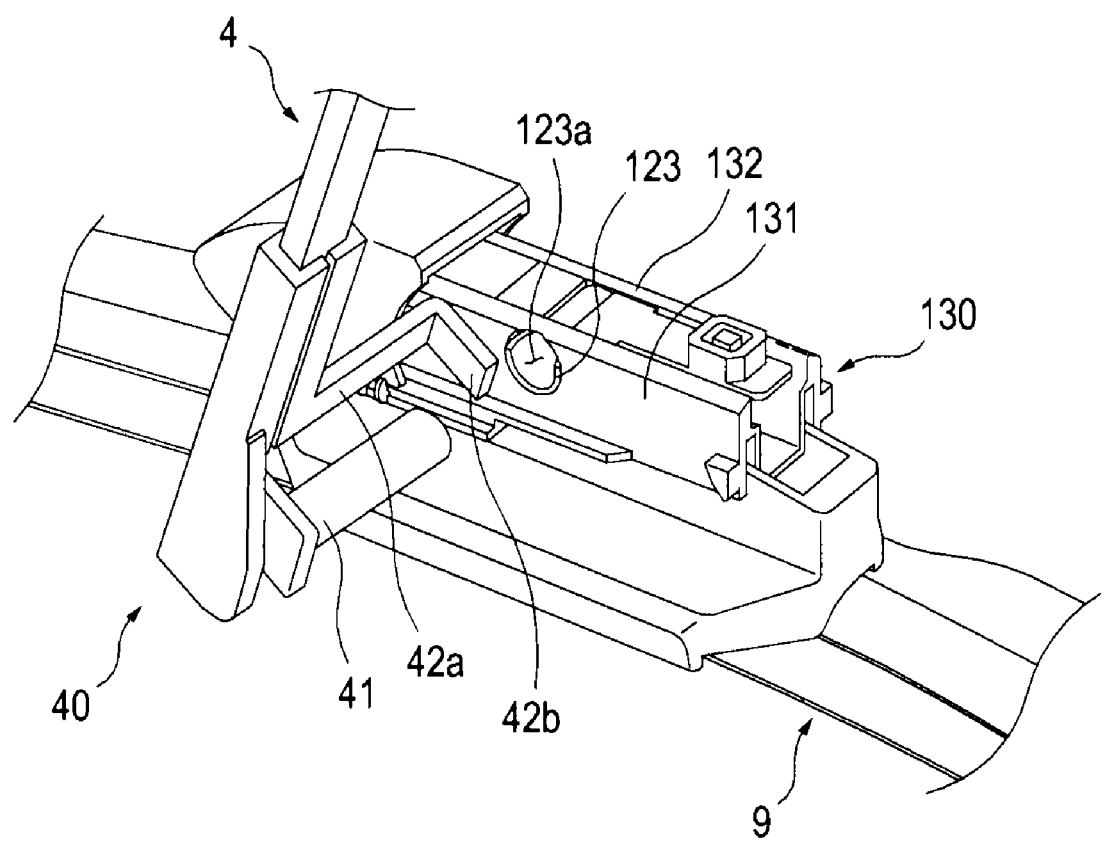
FIG. 31 is a perspective view illustrating an exemplary connecting operation between a flat wiper blade and a side lock wiper arm using the connecting device according to the first embodiment.
Figure 32:
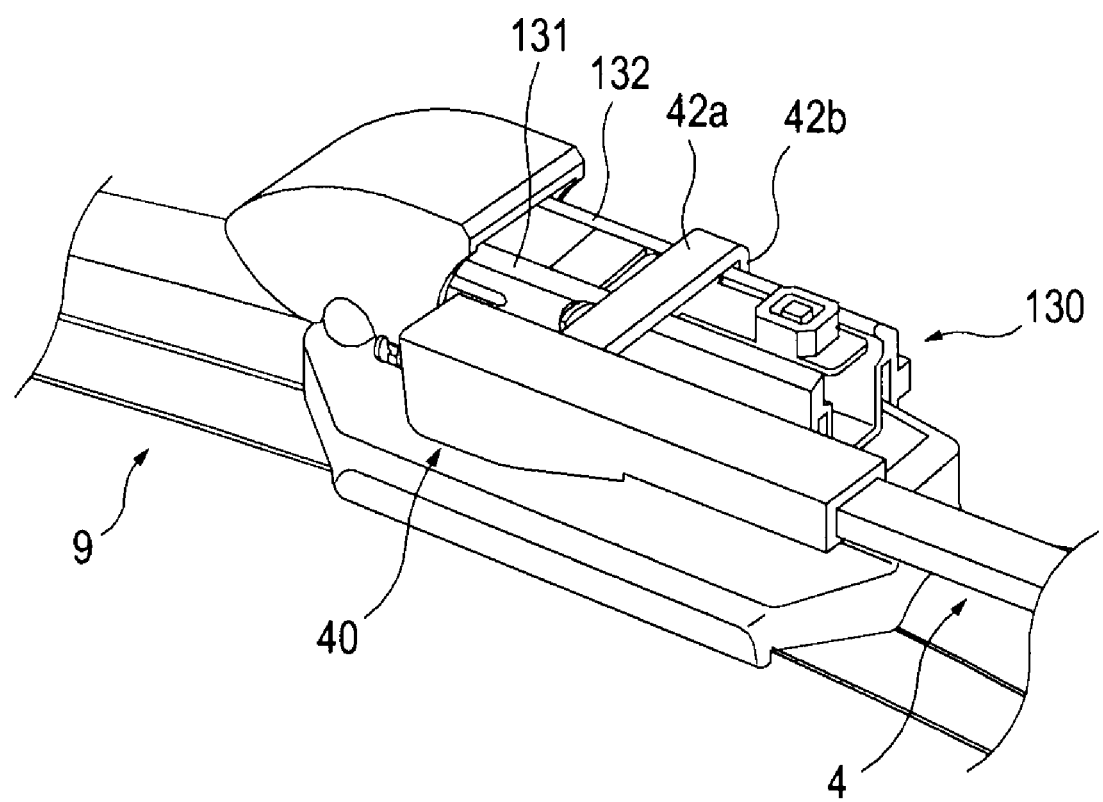
FIG. 32 is a perspective view illustrating that a flat wiper blade and a side lock wiper arm are connected to each other using the connecting device according to the first embodiment.

FIGS. 31 and 32 illustrate a locking operation between the connecting device 100 and the wiper arm 4 having the fourth coupling component 40 at its distal end.

As illustrated in FIG. 31, the flat wiper blade 9 with the adaptor 130 mounted thereon is connected to the wiper arm 4 in such a manner that the side pin 41 is fitted into the pivot shaft 123. Such fitting is finished when a portion of the fourth coupling component 40 adjacent to the side pin 41 is contacted to the outer surface of the side wall portion 131. While the side pin 41 is fitted to the pivot shaft 123, the adaptor 130 (and the flat wiper blade 9) can be pivoted about the side pin 41. Subsequently, the adaptor 130 is pivoted toward the wiper arm 4 such that the stopper section 42a is brought into contact with the upper edges of the side wall portions 131, 132. Then, the clip section 42b is snap-engaged to the outer surface of the side wall portions 132. As illustrated in FIG. 32, since the side pin 41 is fitted to the pivot shaft 123 and the clip section 42b is elastically engaged to the outer surface of the side wall portion 132, the connecting device 100 and the fourth coupling component 40 are locked to each other in fitting and snap-engagement manners.

With reference to FIGS. 33 to 56, a connecting device according to a second exemplary embodiment of present disclosure will be described below.

The connecting device 200 according to the second exemplary embodiment are constructed to be connected to all of the coupling components 10, 10', 20, 30, 40, 50 of the wiper arms 1, 1', 2, 3, 4, 5, as shown in FIGS. 1 to 6. Thus, the connecting device 200 according to this exemplary embodiment further includes the fifth locking device adapted to the fifth coupling component of the wiper arm 5 in addition to the first to fourth locking devices.

Figure 33:
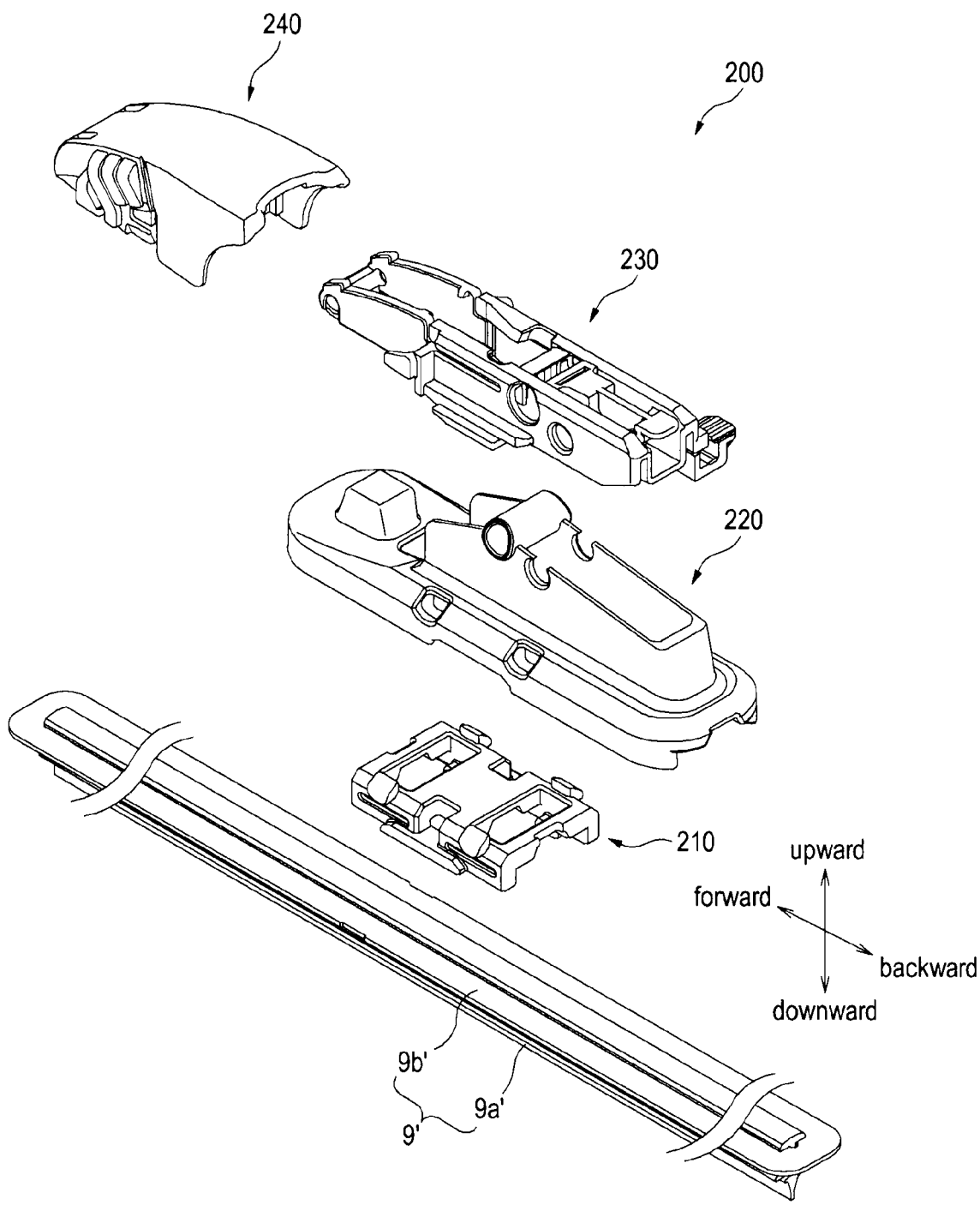
FIG. 33 is an exploded perspective view illustrating a connecting device for a flat wiper blade and wiper arms according to a second exemplary embodiment of the present disclosure.

Referring to FIG. 33, the connecting device 200 may include the following: a joint 210 coupled to a flat wiper blade 9' therealong and thereon; a bracket 220 snap-mounted on the joint 210; an adaptor 230 mounted on the bracket 220; and a cover 240 pivotally coupled to a forward end of the adaptor 230.

The flat wiper blade 9' may include a wiping strip 9a' and a frame 9b' for attaching and supporting the wiping strip 9a'. The frame 9b' is configured to be substantially linear, as shown in FIG. 33.

Figure 34:
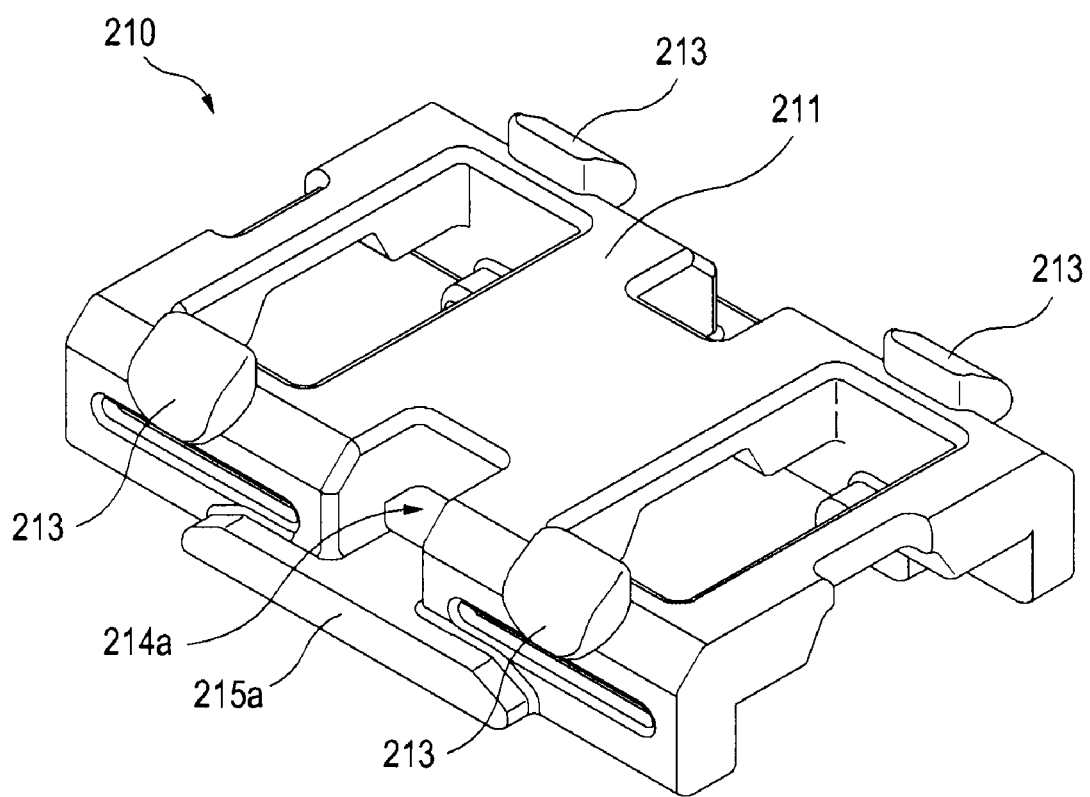
FIG. 34 is a perspective view illustrating a joint shown in FIG. 33.
Figure 35:
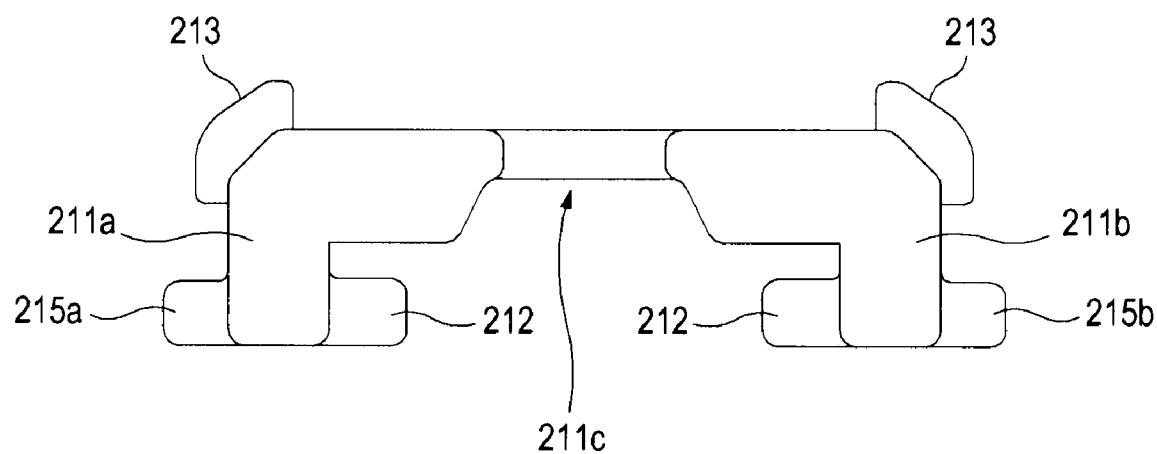
FIG. 35 is a side view of the joint shown in FIG. 34.

FIG. 34 is a perspective view of the joint. FIG. 35 is a side view of the joint. The joint 210 may be coupled to the flat wiper blade 9' to connect the flat wiper blade 9' to the wiper arm 1, 1', 2, 3, 4, 5. Specifically, the joint 210 may be disposed at the middle of the frame 9b' and be fixed to the frame 9b', for example, by interference fit.

Referring to FIGS. 33 to 35, in one embodiment, the joint 210 may include: a joint body 211 having a general U-shaped cross-section; frame holding protrusions 212 for holding the frame 9b'; and a snap component 213 for snap-engagement to the bracket 220.

The joint body 211 has frame holding legs 211a, 211b at respective lateral edges. The frame holding protrusions 212 protrude inwardly of the joint body 211 from lower edges of the frame holding legs 211a, 211b. The frame 9b' is held with interference fit by the frame holding legs 211a, 211b and the frame holding protrusions 212. In other words, the joint 210 and the frame 9b' may be coupled to each other by fitting the frame 9b' between the frame holding legs 211a, 211b under the lower surface of the joint body 211 from one end of the frame 9b'. The connecting device 200 may include a component for supplementing the interference fit of the frame 9b'. To this end, in the illustrated embodiment, apertures 214a are perforated at both lateral sides of the joint body 211. Pressing protrusions 221e of the bracket 220, which will be described later, are inserted into the apertures 213a. Once inserted, the pressing protrusions 221e protrude more inwardly than the frame holding legs 211a, 211b to be contacted to both lateral edges of the frame 9b'. Snap components 213 may be provided at both lateral edges on an upper surface of the joint body 211. Snap components 213 may have a shape of a claw or hook protruding upwardly and outwardly of the joint body 211. In the illustrated embodiment, the frame holding protrusions 212 and the snap components 213 are provided in pairs at the respective lateral edges of the joint body 211. Other embodiment may include more than two of the frame holding protrusions and the snap components. The joint body 211 has a groove or recess 211c concave upwardly at its lower surface. Such a groove or recess 211c serves as a space in which a portion of the wiping strip 9a' appearing on the frame 9b' can be received.

Figure 36:
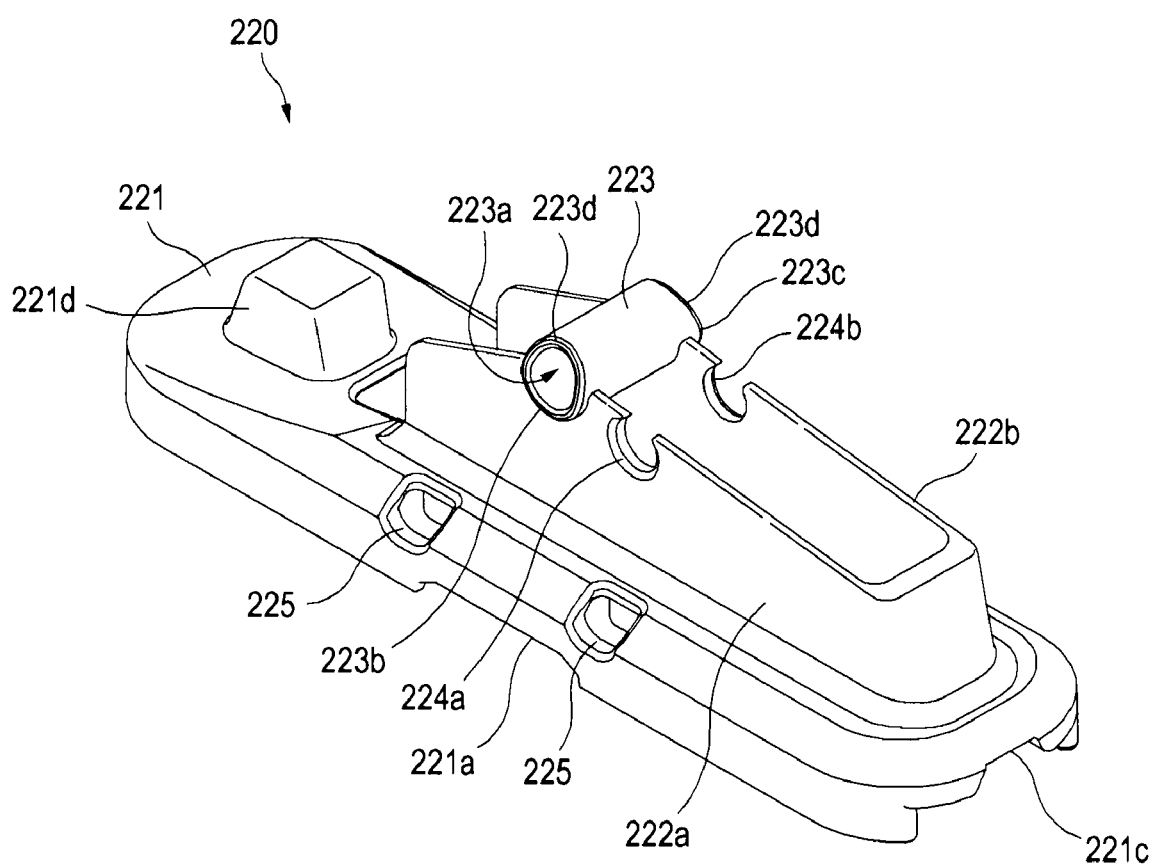
FIG. 36 is a perspective view illustrating a bracket shown in FIG. 33.

FIG. 36 is a perspective view showing the bracket 220. The bracket 220 may be disposed on the joint 210 and be mounted thereto in a snap-engagement manner.

In one embodiment, the bracket 220 may include the following: a base 221 configured to substantially cover up the joint 210; a pair of vertical wall portions 222a, 222b vertically standing on the base 221; a pivot shaft 223 disposed at a top side of the vertical wall portions 222a, 222b; and bearing notches 224a, 224b formed at the respective vertical wall portions 222a, 222b adjacent to the pivot shaft 223.

The pivot shaft 223 may serve as a pivot center of an assembly of the flat wiper blade 9 and the wiper arm 1, 1', 2, 3, 4, 5. In the illustrated embodiment, the pivot shaft 223 is provided on the top side of the vertical wall portions 222a, 222b with an orientation substantially perpendicular to a length direction of the frame 9b'. The pivot shaft 223 may be hollow to define a pivot bore 223a extending therethrough. The pivot shaft 223 is open at its one end 223b and is closed at its opposite end 223c. The pivot bore 223a may participate in connecting the flat wiper blade 9 to the wiper arm 4 having the fourth coupling component 40 at its distal end. Both lateral ends of the pivot shaft 223 slightly protrude outwardly of the vertical wall portions 222a, 222b. Each of the both lateral ends of the pivot shaft 223 has an inclined portion 223d, which is inwardly inclined to facilitate mounting of the adaptor 230.

Figure 37:
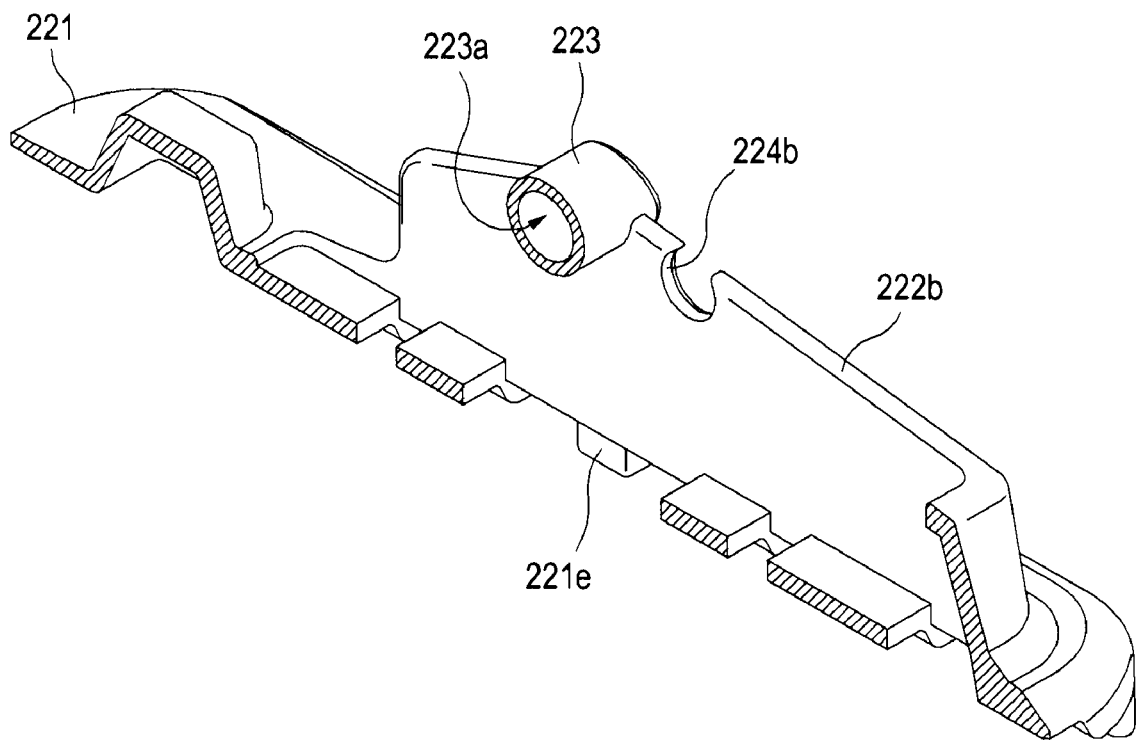
FIG. 37 is a perspective view of the bracket shown in FIG. 36 in a longitudinal section.
Figure 38:
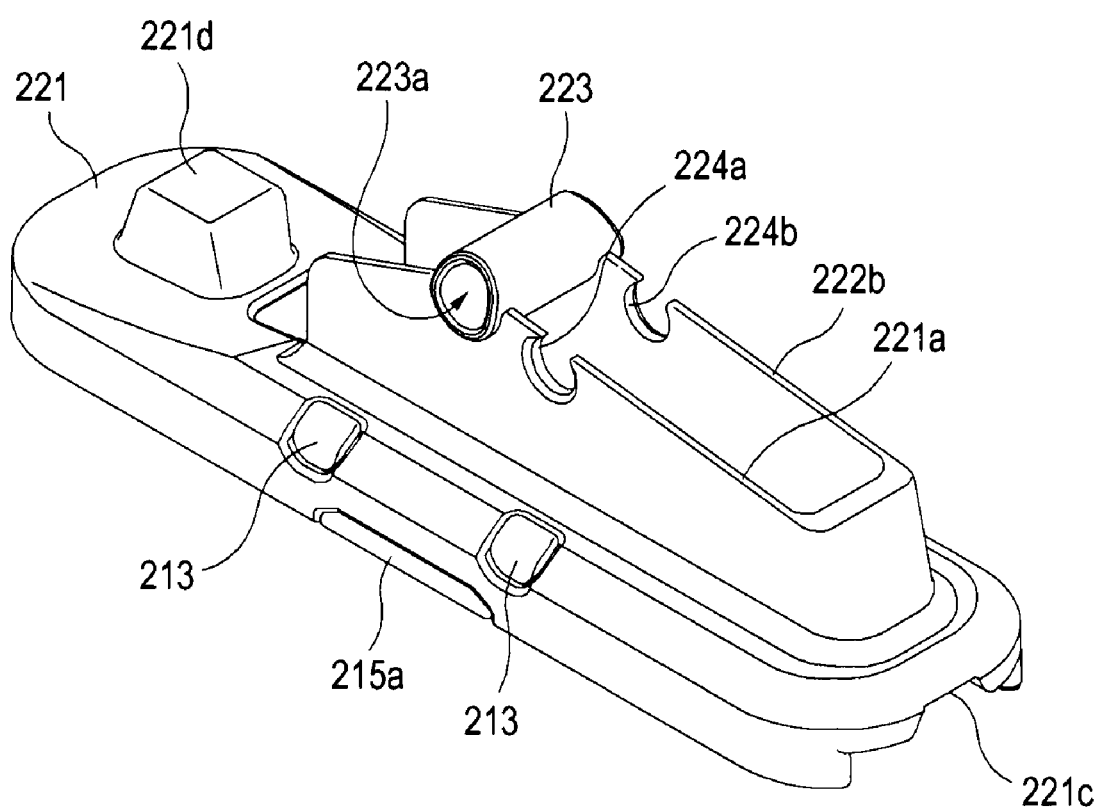
FIG. 38 is a perspective view illustrating an assembly of the joint and the bracket.

FIG. 37 is a perspective view showing the internal side of the bracket. FIG. 38 illustrates an assembly of the joint and the bracket.

Referring to FIGS. 36 to 38, the bracket 220 may have a positioning component for positioning the bracket 220 to the joint 210 when the bracket 220 is coupled to the joint 210. In one embodiment of the positioning component, undercuts 221a are formed at the middle of both lateral edges of the base 211. The undercuts 221a are configured to correspond to the mating protrusions 215a, 215b provided at both lateral edges of the joint body 211. Further, a groove or recess 221c extending in a length direction of the base 221 is formed on a bottom side of the base 211. Recess 221c coincides with the groove or recess 211c of the joint body 211 in terms of shape or configuration. The recess 221c serves as a space in which a portion of the wiping strip 9a' appearing on the frame 9b' can be received. Snap apertures 225 for snap-engagement to the snap components 213 of the joint 210 are perforated bilaterally to the undercuts 221a. Thus, the snap components 213 of the joint 210 are snap-engaged to the snap apertures 225, thereby mounting the bracket 220 to the joint 210. The mating protrusions 215a, 215b and the undercuts 221a are positioned such that when the bracket 220 is mounted on the joint 210, lower surfaces of the base 221 and the joint body 211 are substantially flush with each other.

The bearing notches 224a, 224b are cut away from the upper edges of the vertical wall portions 222a, 222b in a general semi-circular shape, as shown in the illustrated embodiment. A pin 51 of the fifth coupling component 50 can be borne on the bearing notches 224a, 224b. In some embodiment, in case portions of the vertical wall portions 222a, 222b in the rear of the pivot shaft 123 are lowered, the bearing notches can be omitted.

Figure 39:
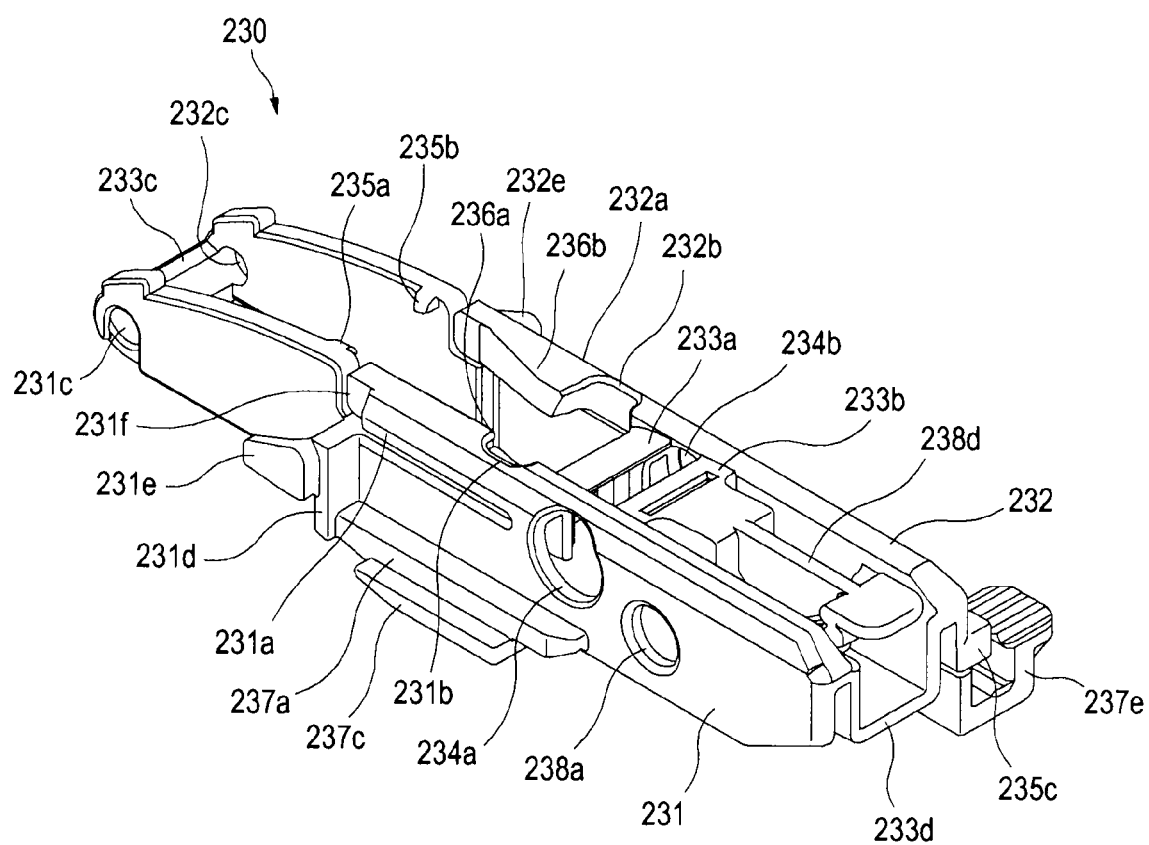
FIG. 39 is a perspective view illustrating an adaptor shown in FIG. 33.
Figure 40:
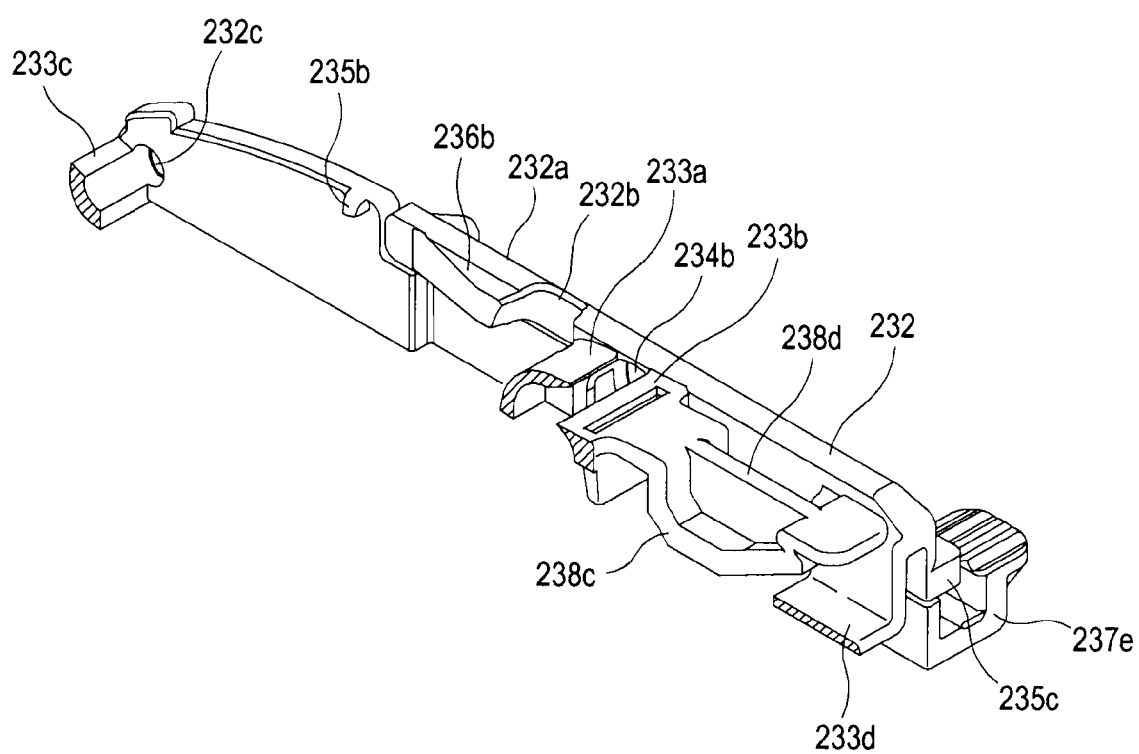
FIG. 40 is a perspective view illustrating an internal side of the adaptor shown in FIG. 39.
Figure 41:
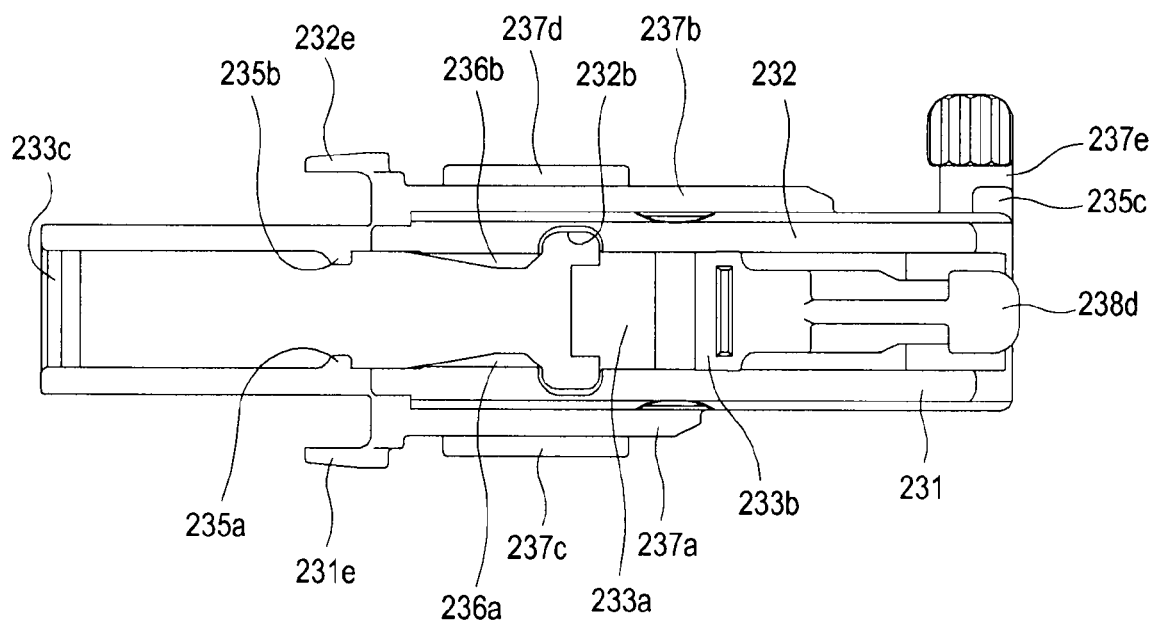
FIG. 41 is a plan view of the adaptor shown in FIG. 39.
Figure 42:
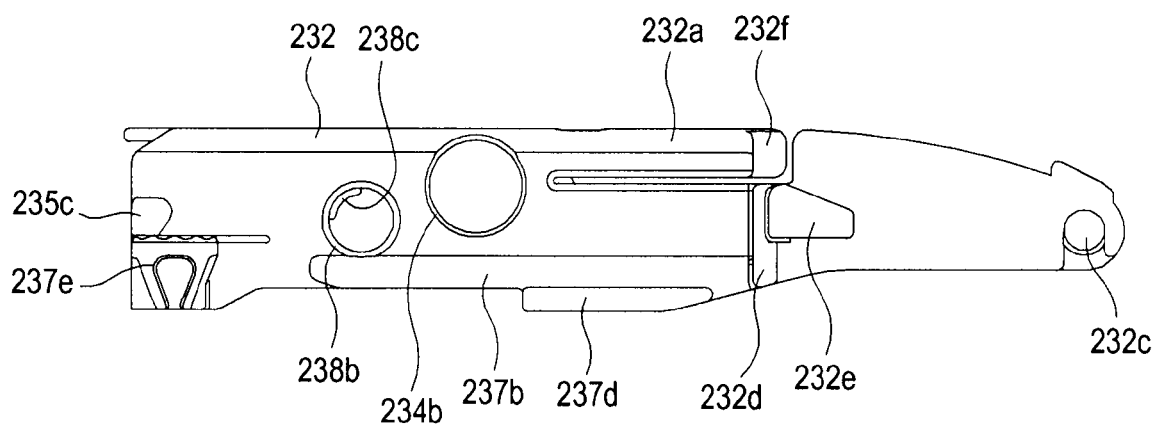
FIG. 42 is a side view of the adaptor shown in FIG. 39.

FIG. 39 is a perspective view of the adaptor. FIG. 40 is a perspective view showing the internal side of the adaptor. FIG. 41 is a plan view of the adaptor. FIG. 42 is a side view of the adaptor.

Referring to FIGS. 39 to 42, in one embodiment, the adaptor 230 may include the following: a pair of side wall portions 231, 232; and first to fourth cross-connecting portions 233a, 233b, 233c, 233d connecting the side wall portions 231, 232 to each other. A section of the bracket 220 including the pivot shaft 223 may lie between the side wall portions 231, 232. Further, the ridge portion 221d provided at the forward side of the base 221 of the bracket 220 may lie between forward sides of the side wall portions 231, 232. The fourth cross-connecting portions 233d that may be bent in a U-shape may lie between backward sides of the side wall portions 231, 232. In case the adaptor 230 is mounted on the bracket 220, the ridge portion 221d and the fourth-cross-connecting portion 233d may prevent the adaptor 230 from shaking transversely relative to an axis of the pivot shaft 223.

The fitting apertures 234a, 234b are formed through the side wall portions 231, 232, respectively. Both lateral ends 223b, 223c of the pivot shaft 223 may be fitted to the fitting apertures 234a, 234b, respectively. Spacing between inner surfaces of the side wall portions 231, 232 is slightly larger than a distance between outer surfaces of the vertical wall portions 222a, 222b. Further, the spacing between inner surfaces of the side wall portions 231, 232 is set such that the tongue 13, 13' of the first coupling component 10, 10' and the hooked portion 21 of the second coupling component 20 can be sufficiently received between the side wall portions 231, 232. When the adaptor 230 is mounted on the bracket 220, the pivot shaft 223 is brought into contact with lower edges of the side wall portions 231, 232 at inclined portions 223d of both lateral ends thereof. As the adaptor 230 is pressed down toward the bracket 220, both lateral ends of the pivot shaft 223 enter the fitting apertures 234a, 234b, while the side wall portions 231, 232 are elastically curved or warped outwardly of the adaptor 230. Then, if the lateral ends of the pivot shaft 223 are fully inserted into the fitting apertures 234a, 234b, then the side wall portions 231, 232 elastically return. Thus, the lateral ends of the pivot shaft 223 and their respective fitting apertures 234a, 234b are fitted to each other. When the adaptor 230 is completely mounted on the bracket 220, the outer surfaces of the side wall portions 231, 232 and the outer edges of both lateral ends of the pivot shaft 223 are substantially flush with each other.

As described above, the adaptor 230 may be mounted on the bracket 220 by being pressed down toward the bracket 220 and snap-engaged. The pivot shaft 223 is oriented perpendicular to the frame 9b' and the wiper arms 1, 1', 2, 3, 4, 5 are coupled to the adaptor 230 parallel to the frame 9b. Thus, when the flat wiper blade 9 is connected to the wiper arm 1, 1', 2, 3, 4, they both may relatively rotate clockwise or counterclockwise about the pivot shaft 223 within a certain angular range. Accordingly, when the flat wiper blade 9 is moved on the windshield surface by the wiper arm 1, 1', 2, 3, 4, 5, the flat wiper blade 9 can be placed in close contact with the windshield surface while conforming to a curvature of the windshield surface.

The first cross-connecting portion 233a is situated in front of the fitting apertures 234a, 234b. A forward surface of the first cross-connecting portion 233a is rounded such that an inner surface 21b of the hooked portion 21 of the second coupling component 20 may be seated thereon. The second cross-connecting portion 233b is situated at the rear of the fitting apertures 234a, 234b. The third cross-connecting portion 233c is situated at forward ends of the side wall portions 231, 232. The pivot apertures 231c, 232c for pivotally coupling the cover 240, which will be described below, are perforated in the respective side wall portions 231, 232. The fourth cross-connecting portion 233d is situated at backward ends of the side wall portions 231c, 232c and is generally U-shaped. Thus, gaps or spaces are formed between lateral surfaces of the fourth cross-connecting portion 233d and inner surfaces of the side wall portions 231, 232. Backward portions of the vertical wall portions 222a, 222b may be inserted into said gaps or spaces when the adaptor 230 is mounted on the bracket 220.

In the second exemplary embodiment, the first locking device may include the following: first locking protrusions 235a, 235b elastically engageable to the tongue 13, 13' of the first coupling component 10, 10'; and a pivot protrusion 235c configured to fit to the concave portion 14a, 14b, 14a', 14b' of the first coupling component 10, 10'.

The first locking protrusions 235a, 235b are wedge-shaped. The first locking protrusions 235a, 235b protrude on inner surfaces of the side wall portions 231, 232 adjacent to the upper edges thereof. The first locking protrusions 235a, 235b are located between the first cross-connecting portion 233a and the third cross-connecting portions 233c. Sections of the side wall portions 231, 232 between the first and third cross-connecting portions 133a and 133c are configured to be elastically curved or warped. Thus, the first locking protrusions 235a, 235b are allowed to elastically move inwardly and outwardly of the adaptor 130. The pivot protrusion 235c is formed at a backward end of the side wall portion 232. The pivot protrusion 235c is configured to be inserted into the concave portion 14b, 14b' formed at the backward end of the side plate 12b, 12b' of the first coupling component 10, 10'. The pivot protrusions 235c may take the shape of a triangle with a rounded corner. In the illustrated embodiment, while the pivot protrusion 235c is formed at only the side wall portion 232, another pivot protrusion may be provided at a backward end of the side wall portion 231.

In the second exemplary embodiment, the second locking device may include a pair of second locking protrusions 236a, 236b provided at inner surfaces of the side wall portions 231, 232 adjacent to the first cross-connecting portions 233a.

The second locking protrusions 236a, 236b are wedge-shaped such that the hooked portion 21 of the second coupling component 21 can be easily inserted between the second locking protrusions. Inclined surfaces of the second locking protrusions face forwardly of the adaptor 230, while engagement surfaces thereof face backwardly of the adaptor 230. A gap between the engagement surfaces of the second locking protrusions 236a, 236b and the forward surface of the first cross-connecting portion 233a may generally correspond to a thickness of the hooked portions 21. Further, the second locking protrusions 236a, 236b may be configured to be elastically movable inwardly and outwardly of the adaptor 230. To this end, in one embodiment, each of the side wall portions 231, 232 has an elastically curving clamping bar 231a, 232a. The second locking protrusions 236a, 236b are formed at opposed sides of the clamping bars 231a, 232a, respectively.

In the illustrated embodiment, the clamping bars 231a, 232a are formed by, for example, slitting portions of the side wall portions 231, 232 adjacent to their upper edges. Also, the notches 231b, 232b are formed near the base end portions of the clamping bars 231a, 232a, thereby allowing the clamping bars 231a, 232a to be curved more easily. The stepped portions 231f, 232f are formed at forward free ends of the clamping bars 231a, 232a. The stepped portions may contact the backing plates 244a, 244b of the cover 240.

Figure 43:
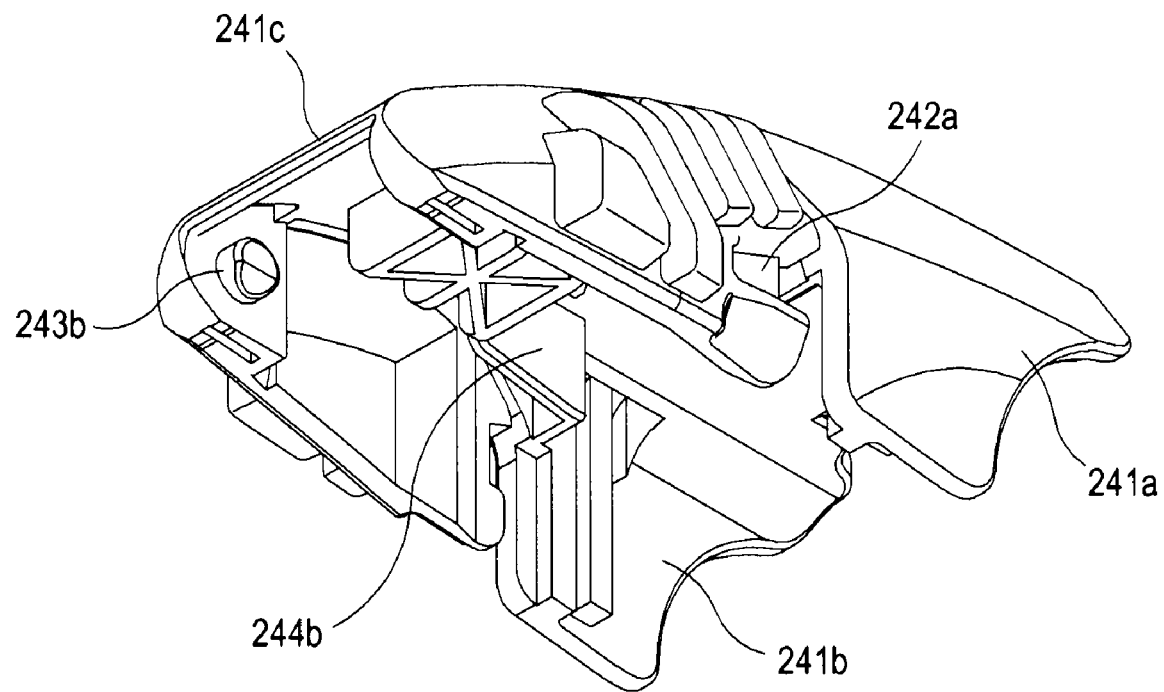
FIG. 43 is a perspective view illustrating an internal side of a cover shown in FIG. 33.
Figure 44:
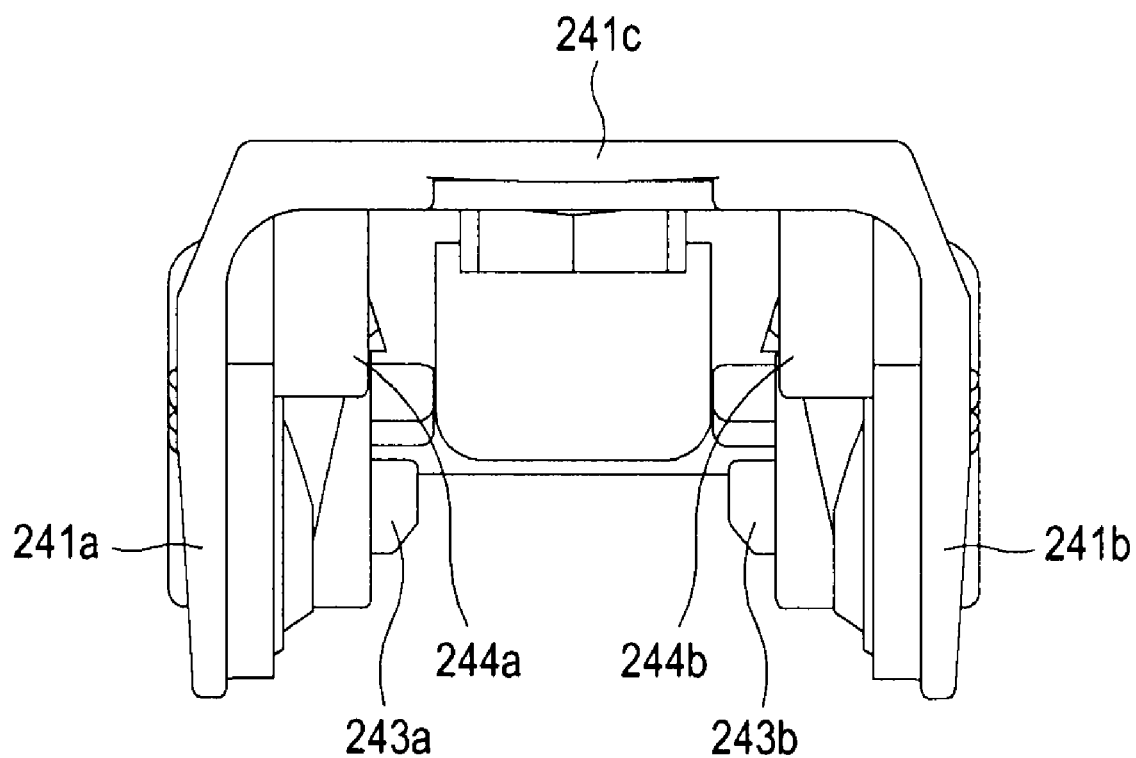
FIG. 44 is a side view of the cover shown in FIG. 43.
Figure 45:
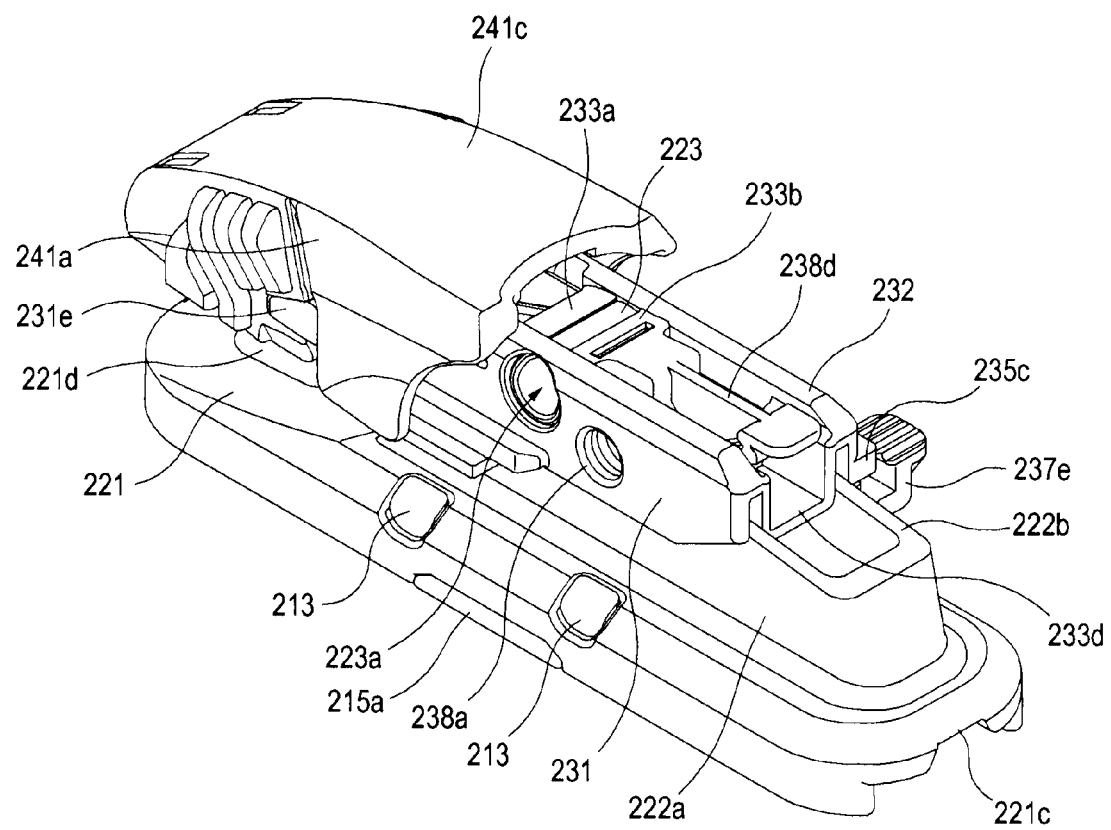
FIG. 45 is a perspective view illustrating an assembly of the joint, the bracket, the adaptor and the cover.

The internal side of the cover is illustrated in FIG. 43. FIG. 44 is a side view of the cover. FIG. 45 shows an assembly of the joint, the bracket, the adaptor and the cover.

The cover 240 serves to assist the locking operations of the first and second coupling components 10, 10', 20. Further, the cover 240 serves to partially cover or hide the distal end of the wiper arm 1, 1', 2 and the adaptor 230. Referring to FIGS. 43 and 44, the cover 240 has a general U-shape. The cover 240 includes a top plate 241c placed above the upper edges of the side wall portions 231, 232 and a pair of side plates 241a, 241b facing toward the side wall portions 231, 232, respectively. The pivot pins 243a, 243b for pivotally coupling the cover 240 to the adaptor 230 protrude inwardly from a forward end of the cover 240 (i.e., forward ends of side plates 241a, 241b). The pivot pins 243a, 243b are fit-engaged to the pivot apertures 231c, 232c provided adjacent to the third cross-connecting portion 233c. To facilitate the fit-engagement, the pivot pins 243a, 243b have inclined portions at their lower sides. The cover 240 may be easily coupled to the adaptor 230 by contacting the pivot pins 243a, 243b to the forward end of the side wall portions 231, 232 and pressing it inwardly of the adaptor 230.

The connecting device 200 may include a cover locking device for locking the cover 240 to the adaptor 230. In the second exemplary embodiment, the cover locking device includes: concave claw seats 242a provided at lower sides of the side plates 141a, 141c; and locking claws 231e, 232e provided at the respective side wall portions 131, 132 to be snap-engaged to the claw seats 242a when the cover 240 is fully pivoted to the adaptor 230.

The locking claws 231e, 232e extend parallel to the respective side wall portions 231, 232 from the stopper walls 231d, 232d, which are formed at the respective side wall portions 231, 232. The locking claws 231e, 232e are snap-engaged to the claw seat 242a, 242b beyond the lower edges of the side plates 241a, 241b, thereby locking the cover 240 to the adaptor 230. Inclined portions are formed at the lower edges of the side plates 241a, 241b in alignment with the claw seats 242a, thereby facilitating the engagement to the claw seats 242a. Engagement position between the claw seats 242a and the locking claws 231e, 232e is set such that the top plate 11, 11' of the first coupling component 10, 10' or a backward section of the second coupling component 20 may be interposed between a lower surface of the top plate 241a of the cover 240 and upper edges of the side wall portions 231, 232 with a little play or without any play.

The cover 240 may further include a component for supplementing the locking operation between the connecting device 200 and the wiper arm 1, 1', 2 by restricting the first locking protrusions 235a, 235b or the second locking protrusions 236a, 236b from moving outwardly of the side wall portions 231, 232 when the first coupling component 10, 10' or the second coupling component 20 is locked to the side wall portions 231, 232. In one embodiment, the component may be provided at the cover 240 to implement the supplementing function when the cover 240 is coupled to the adaptor 230. In the illustrated embodiment, the component includes a pair of backing plates 244a, 244b formed on the inner surfaces of the side plates 241a, 241b of the cover 240, respectively. Spacing between the backing plates 244a, 244b is slightly larger than a distance between the outer surfaces of sections of the side wall portions 231, 232 having the first locking protrusions 235a, 235b and a distance between the stepped portions 231f, 232f. The backing plates 244a, 244b are configured such that when the cover 240 is coupled to the adaptor 230, they are placed throughout the stepped portions 231g, 232g of the clamping bars 231a, 232a and the outer surfaces of the side wall portions 231, 232 at which the first locking protrusions 235a, 235b are provided. Further, the cover 240 may include the backing protrusions at the respective inner surfaces of the side plates 241a, 241b, which can be positioned against the side plates 12a, 2b, 12a', 12b' of the first coupling component when the cover 230 is locked to the adaptor 230.

In the second exemplary embodiment, the third locking device may include the following: slide rails 237a, 237b slidably moving between the side plates 32a, 32b of the third coupling component 30 and being fitted thereto; stopper walls 231d, 232d disposed so as to contact the forward ends of the side plates 32a, 32b; and a latching lever 237e elastically latchable to a backward end of the side plate 32b.

In the illustrated embodiment, the slide rails 237a, 237b protrude from the lower edges of the side wall portions 231, 232 along a length direction, respectively. Further, the third locking device includes the stopper portions 237c, 237d for limiting the insertion of the adaptor 230 into the third coupling component 30 by being contacted to the stopper portions 33a, 33b provided at the lower edges of the side plates 32a, 32b of the third coupling component 30. The stopper portions 237c, 237d have a length shorter than that of the slide rails 237a, 237b. The stopper portions 237c, 237d protrude outwardly of the slide rails 237a, 237b beneath the slide rails. The latching lever 237e extends outwardly from the backward end of the side wall portion 232. The latching lever 237e can be elastically curved outwardly of the side wall portion 232. To this end, the backward end portion of the side wall portion 232 is horizontally slit beneath the pivot protrusion 235c. The latching lever 237e is positioned such that when the adaptor 230 is fully inserted into the third coupling component 30, its forward end is snap-engaged to the backward end of the side plate 32b. In unlocking the adaptor 230 and the third coupling component 30, when the latching lever 237e is pressed downwardly and then unlatched from the backward end of the side plate 32d, the connecting device 200 may be separated from the third coupling component 30.

In the second exemplary embodiment, the fourth locking device may include the following: pivot shaft 223, to which the side pin 41 of the fourth coupling component 40 may be pivotally fitted; and a component to which the clip arm 42 of the fourth coupling component 40 may be snap-engaged. In the illustrated embodiment, the component is the outer surface of the side wall portion 232. The distance between the outer surfaces of the side wall portions 231, 232 is set such that the clip arm 42 can be snapped to the outer surface of the side wall portion 232.

The connecting device 200 according to the second exemplary embodiment includes the fifth locking device provided at the adaptor for carrying out a locking operation of inserting and snap-engaging between the adaptor 230 and the fifth coupling component 50. In one embodiment, the fifth locking device may include the following: bearing apertures 238a, 238b for bearing the pin 51 of the fifth coupling component; and a latch portion 238c elastically engageable to a circumferential groove 52 of the fifth coupling component.

In the illustrated embodiment, the bearing apertures 238a, 238b are respectively formed through the side wall portions 231, 232 adjacent to the fitting apertures 234a, 234b. The latch portion 238c is provided at a latching bar 238d integrally formed to the second cross-connecting portion 233b at one end thereof. An opposite end of the latching bar 238d is a free end such that the latching bar 238d can be elastically moved about the second cross-connecting portions 233b. The latch portion 238c includes a rounded contact surface so as to correspond to a peripheral shape of the circumferential groove 52. Moreover, the latch portion 238c is provided at the latching bar 238d such that it is placed within a cylindrical range made by the bearing apertures 238a, 238b in a free state of the latching bar 238d. With the above-described configuration, the pin 51 of the fifth coupling component 50 goes inwardly of the adaptor 230 through the bearing aperture 238a of the side wall portion 231 and can protrude outwardly from the bearing aperture 238b of the side wall portion 232. While the pin 51 goes through the bearing apertures 238a and 238b one after the other, the latching bar 238d is elastically curved upwardly. If the circumferential groove 52 reaches the latching bar 238d, then the latch portion 238c elastically engages the circumferential groove 52. In unlocking the adaptor 230 and the fifth coupling component, if the latching bar 238d is curved upwardly and unlatched from the circumferential groove 52, the pin 51 can be unlocked from the side wall portions 231, 231.

Figure 46:
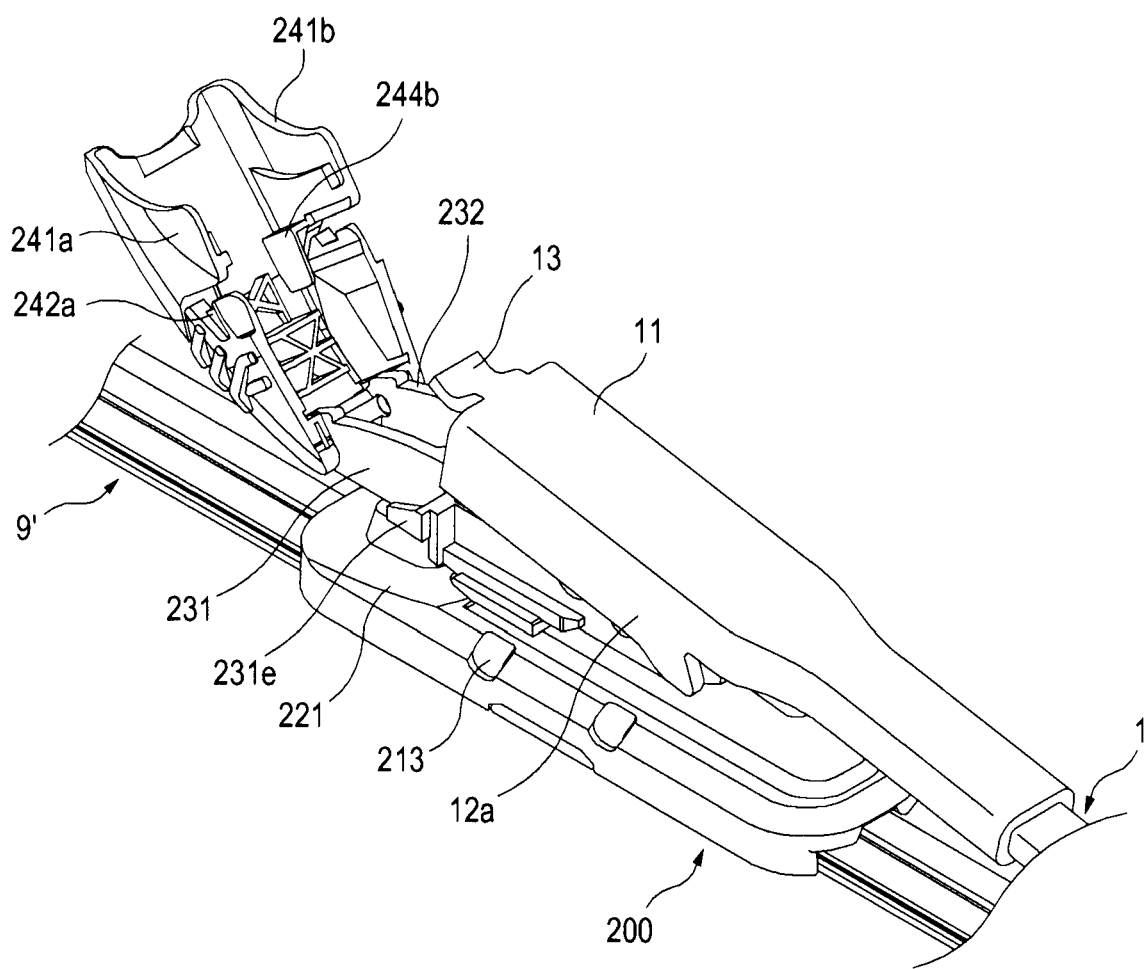
FIG. 46 is a perspective view illustrating an exemplary connecting operation between a flat wiper blade and a top lock wiper arm using the connecting device according to the second embodiment.
Figure 47:
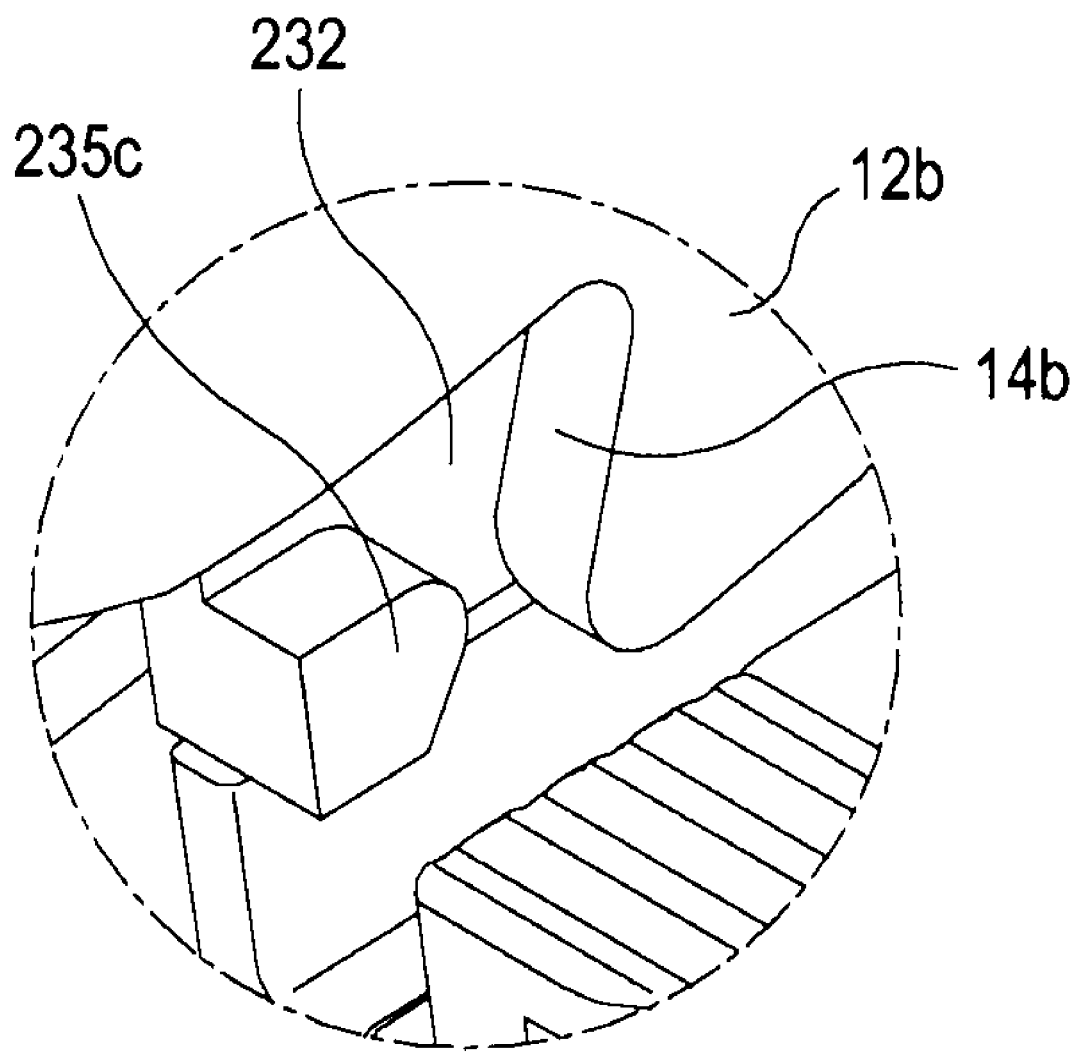
FIG. 47 is a fragmentary enlarged view illustrating a coupling between a pivot protrusion and a concave portion of the first coupling component.
Figure 48:
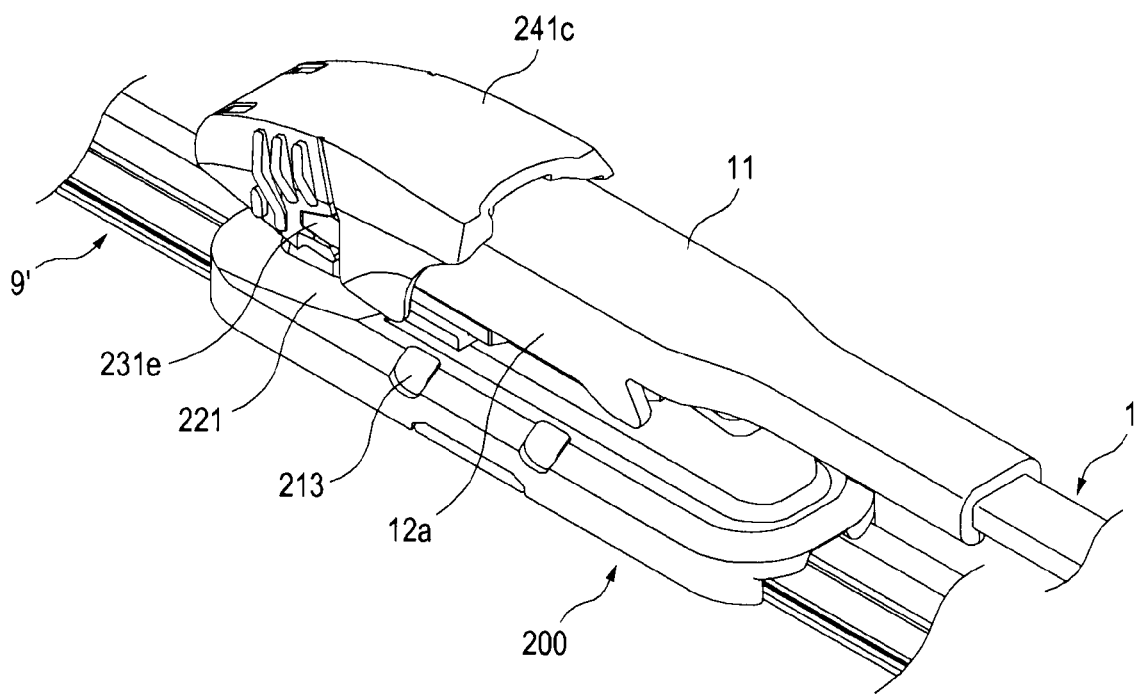
FIG. 48 is a perspective view illustrating that a flat wiper blade and a top lock wiper arm are connected to each other using the connecting device according to the second embodiment.

FIGS. 46 to 48 illustrate a locking operation between the connecting device 200 and the wiper arm 1 having the first coupling component 10 at its distal end. With reference to FIGS. 33 and 46 to 48, an exemplary connection example between the flat wiper blade 9' and the wiper arm 1 will be described in detail.

As the cover 240 is turned forward from the adaptor 230, the pivot protrusion 235c of the adaptor 230 is fitted to the corresponding concave portion 14b of the first coupling component 10. When the pivot protrusion 235c is contacted to the concave portion 14b, the adaptor 230 (and the flat wiper blade 9' with the adaptor 230 mounted thereon) can be pivoted to the first coupling component 10 about the pivot protrusion 235c. When fully pivoted, the tongue 13 is locked between the first locking protrusions 235a, 235b in the forward sides of the side wall portions 231, 232, while the top plate 11 is contacted to the upper edges of the side wall portions 231, 232. Subsequently, the cover 240 is turned back toward the adaptor 230 until the locking claws 231e, 232e are engaged to the claw seats 242a.

If the cover 240 is locked to the adaptor 230, then the lower surface of the top plate 241c of the cover 240 is partially placed in contact with the upper surface of the top plate 21 of the first coupling component 10. Also, the backing plates 244a, 244b are positioned near the outer surfaces of the side wall portions 231, 232 with the first locking protrusions 235a, 235b, thereby preventing the first locking protrusions 235a, 235 from being outwardly moved. As described above, the flat wiper blade 9' may be connected to the wiper arm 1 having the first coupling component 10 in such a manner that the adaptor 230 is secured to the first coupling component 10 via the pivot protrusion 235c at its backward end side and is locked to the first coupling component 10 via the first locking protrusions 235a, 235b at its forward end side.

Figure 49:
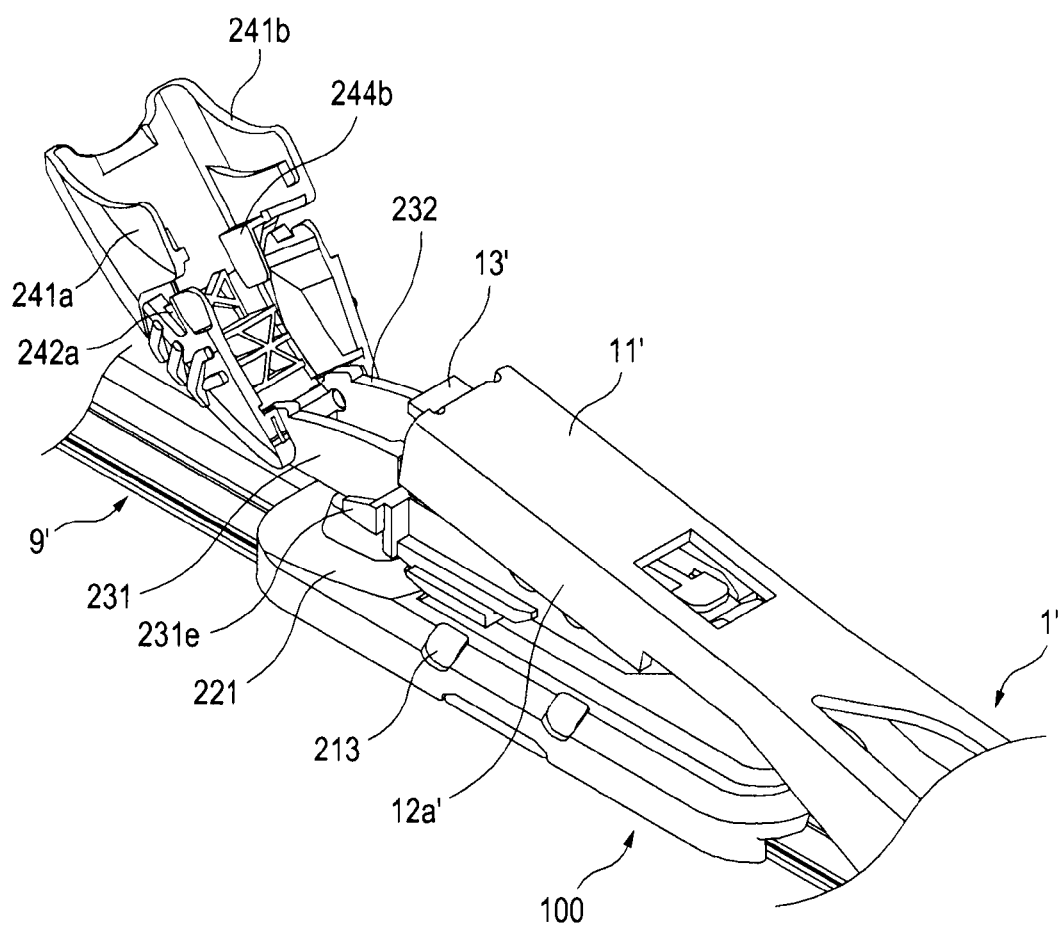
FIG. 49 is a perspective view illustrating an exemplary connecting operation between a flat wiper blade and another top lock wiper arm using the connecting device according to the second embodiment.
Figure 50:
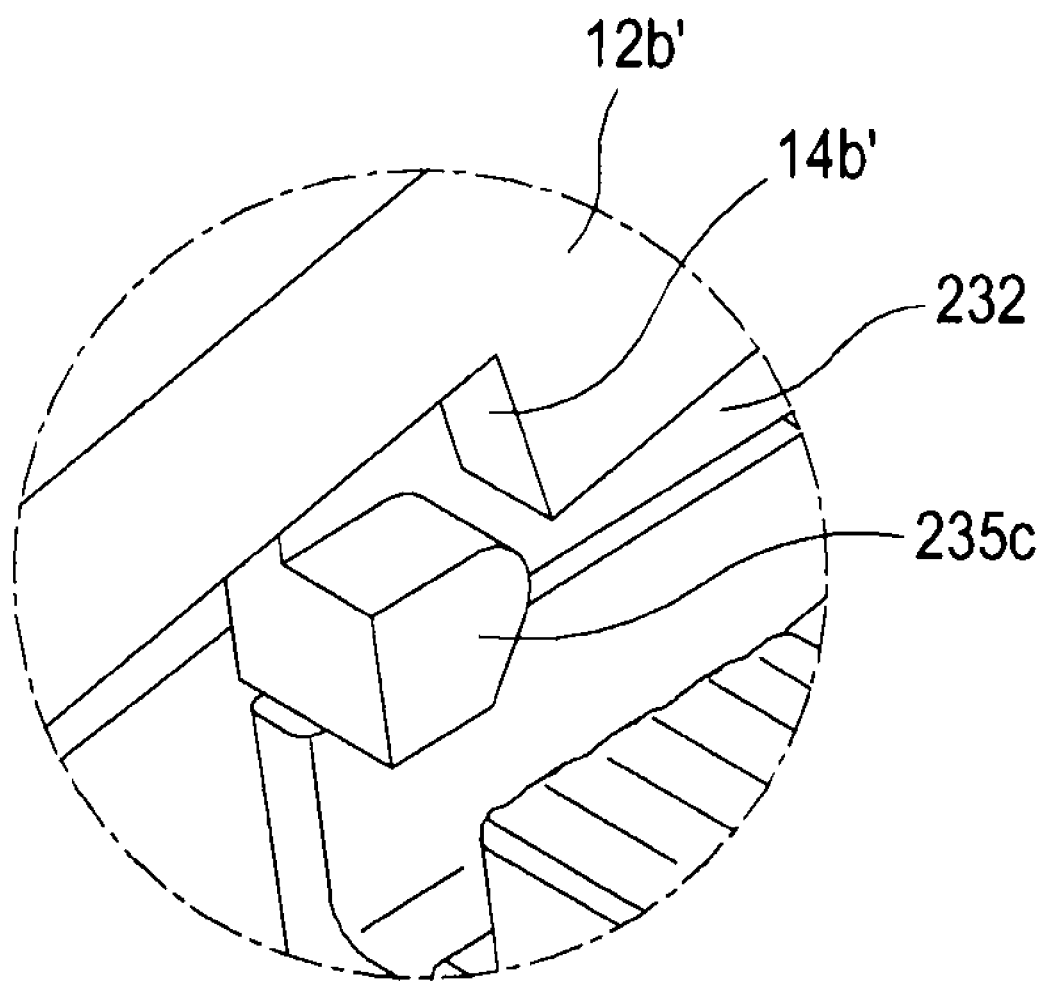
FIG. 50 is a fragmentary enlarged view illustrating a coupling between a pivot protrusion and a concave portion of the first coupling component.
Figure 51:
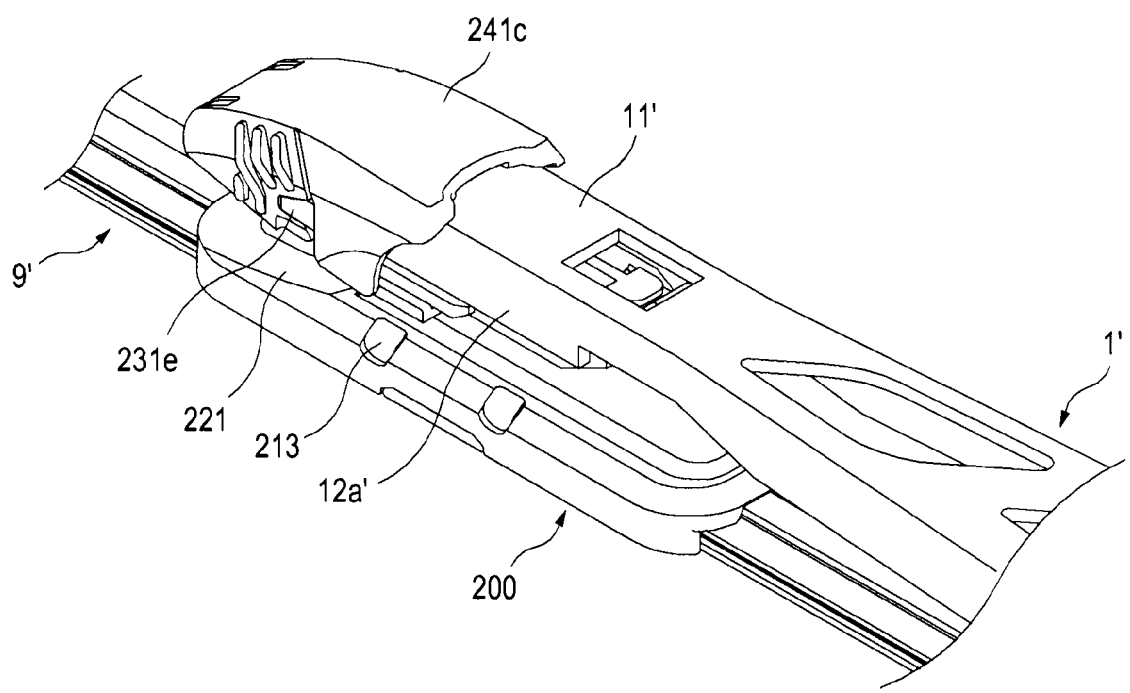
FIG. 51 is a perspective view illustrating that a flat wiper blade and another top lock wiper arm are connected to each other using the connecting device according to the second embodiment.

FIGS. 49 to 51 illustrate a locking operation between the connecting device 200 and the wiper arm 1' having the first coupling component 10' at its distal end.

As the cover 240 is turned forward from the adaptor 230, the pivot protrusion 235c is fitted to the corresponding concave portion 14b' of the first coupling component 10'. Subsequently, the flat wiper blade 9' with the adaptor 230 mounted thereon is pivoted to the first coupling component 10' and the adaptor 230 and the first coupling component 10' are contacted to each other at their corresponding parts. Thereafter, the cover 240 is turned back toward the adaptor 230, thereby finishing the locking operation. The connecting device 200 may be locked to the wiper arm 1' having the first coupling component 10' in the same manner as the first coupling component 10.

Figure 52:
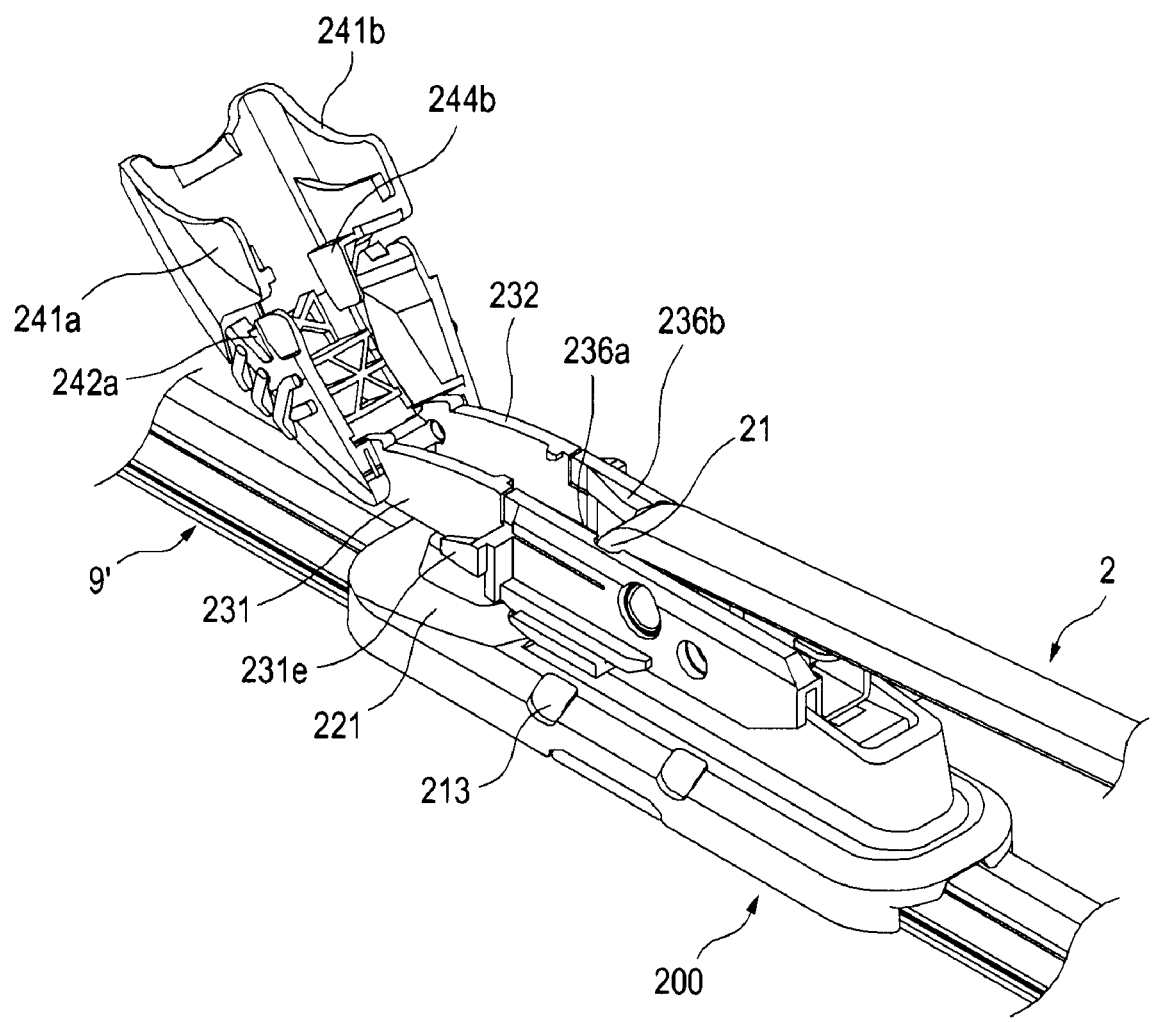
FIG. 52 is a perspective view illustrating an exemplary connecting operation between a flat wiper blade and a hook wiper arm using the connecting device according to the second embodiment.
Figure 53:
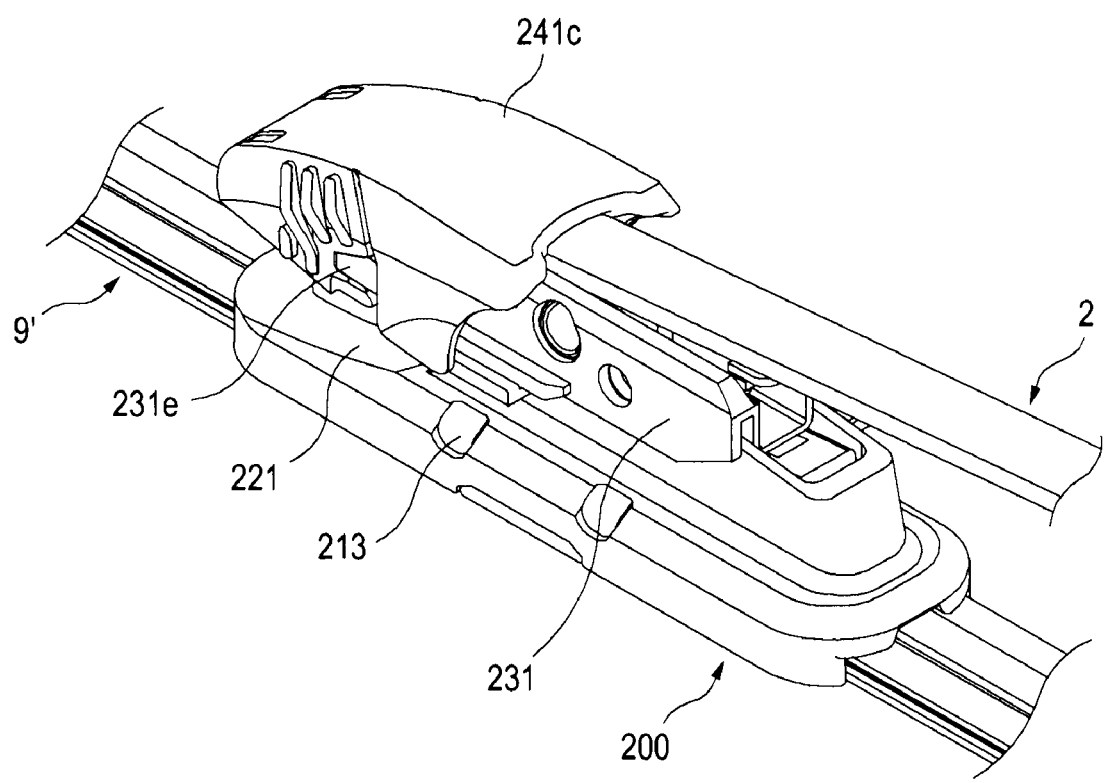
FIG. 53 is a perspective view illustrating that a flat wiper blade and a hook wiper arm are connected to each other using the connecting device according to the second embodiment.

FIGS. 52 and 53 illustrate a locking operation between the connecting device 200 and the wiper arm 2 having the second coupling component 20 at its distal end.

As the cover 240 is turned forward from the adaptor 230, the extension portion 22 of the second coupling component is inserted inwardly of the adaptor 230 through and between the clamping bars 231a, 232a. During the insertion, the clamping bars 231a, 232a are curved outwardly as the hooked portion 21 and the second locking protrusions 236a, 236b are contacted to each other. Also, as the hooked portion 21 passes by the second locking protrusions 236a, 236b, the clamping bars return. Thus, the second locking protrusions 236a, 236b engage to the outer surface 21a of the hooked portion 21. At this time, the inner surface 21b of the hooked portion 21 is placed in contact with the forward surface of the first cross-connecting portion 233a, while the extension portion 22 underlies the first cross-connecting portion 233a and the pivot shaft 223.

When the adaptor 230 is locked to the hooked portion 21 by the second locking device (e.g., clamping bars 231a, 232a and second locking protrusions 236a, 236b), the cover 240 is turned back toward the adaptor 230 and is closed thereto. Then, as the locking claws 231e, 2232e engage the claw seats 242a, the backing plates 244a, 244b are positioned near the stepped portions 231f, 232f to restrict the clamping bars 231a, 232a. Then, the locking operation is finished.

Figure 54:
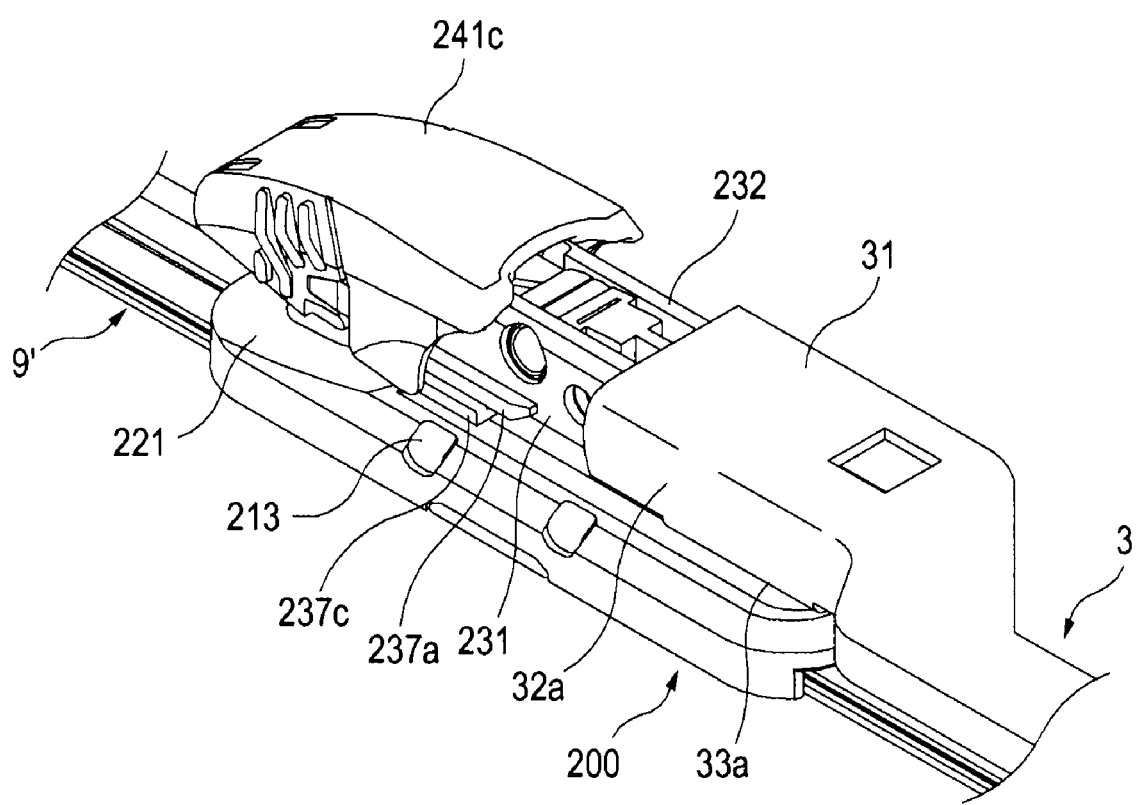
FIG. 54 is a perspective view illustrating an exemplary connecting operation between a flat wiper blade and a bayonet wiper arm using the connecting device according to the second embodiment.
Figure 55:
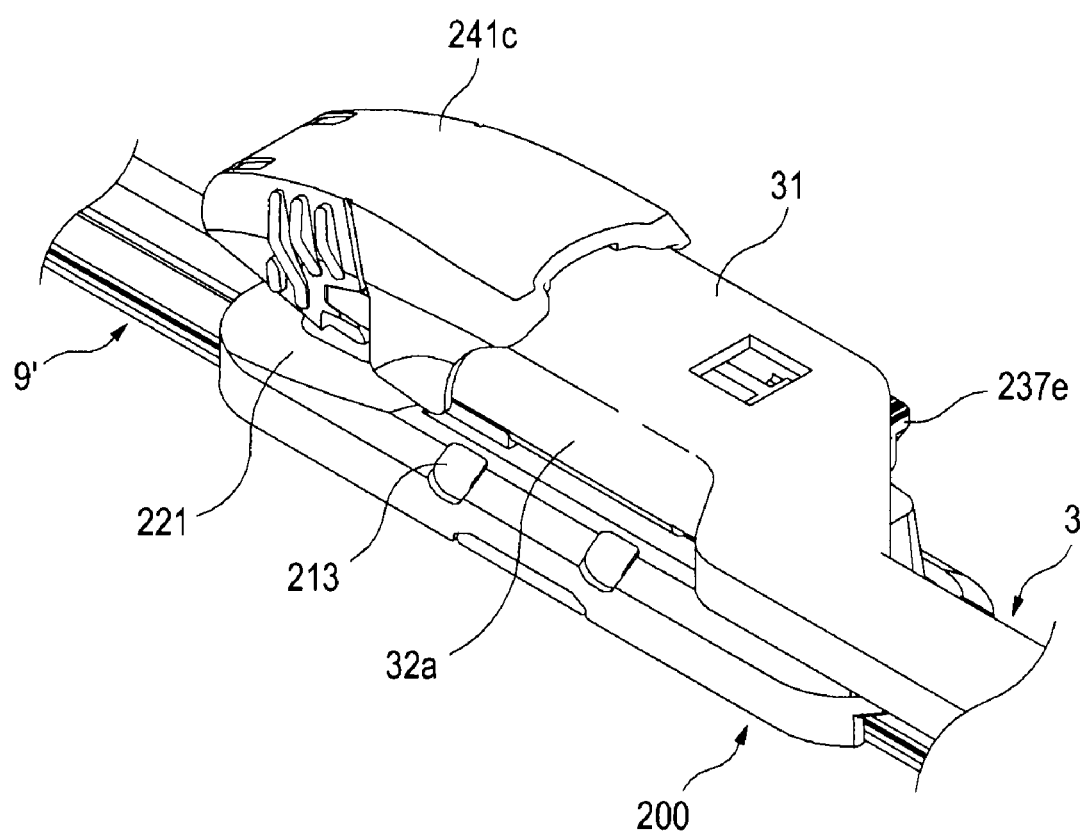
FIG. 55 is a perspective view illustrating that a flat wiper blade and a bayonet wiper arm are connected to each other using the connecting device according to the second embodiment.

FIGS. 54 and 55 illustrate a locking operation between the connecting device 200 and the wiper arm 3 having the third coupling component 30 at its distal end.

As illustrated in FIG. 54, the adaptor 230 mounted on the flat wiper blade 9' is inserted into the third coupling component 30 from the backward end side of the adaptor 230. The adaptor 230 is fitted into the third coupling component 30 as the slide rails 237a, 237b are slidably contacted to the inner surfaces of the side plates 32a, 32b, respectively. The fitting locking operation is finished when the forward ends of the side plates 32a, 32b contact the stopper walls 231d, 232d and the stopper portions 33a, 33b contact the stopper portions 237c, 237d of the slide rails 237a, 237b and the latching lever 237e is latched to the backward end of the side plate 32b. Since the latching lever 237e is engaged to the backward end of the side plate 32b, the third coupling component 30 and the adaptor 230 can be prevented from unlocking.

Figure 56:
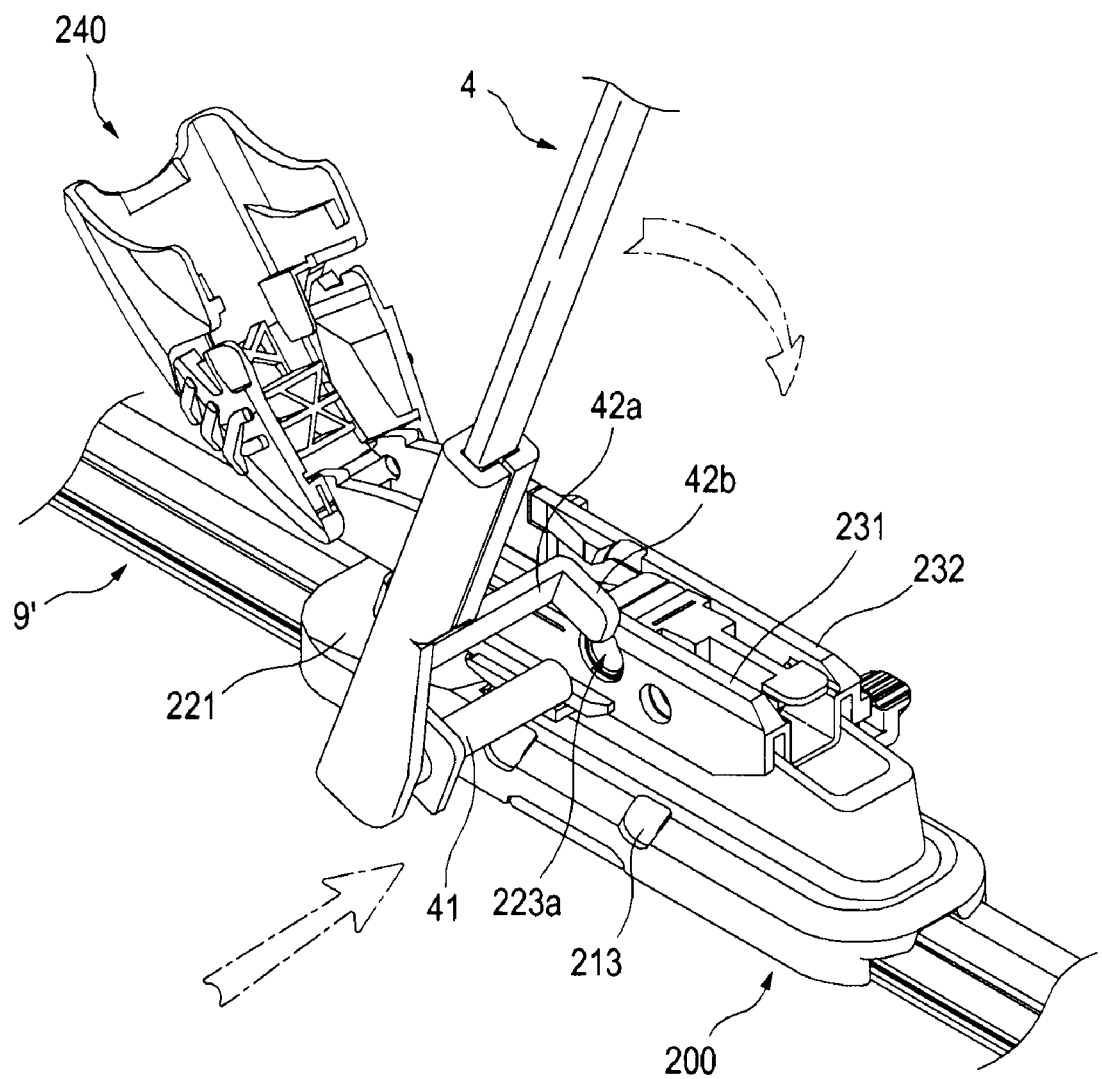
FIG. 56 is a perspective view illustrating an exemplary connecting operation between a flat wiper blade and a side lock wiper arm using the connecting device according to the second embodiment.
Figure 57:
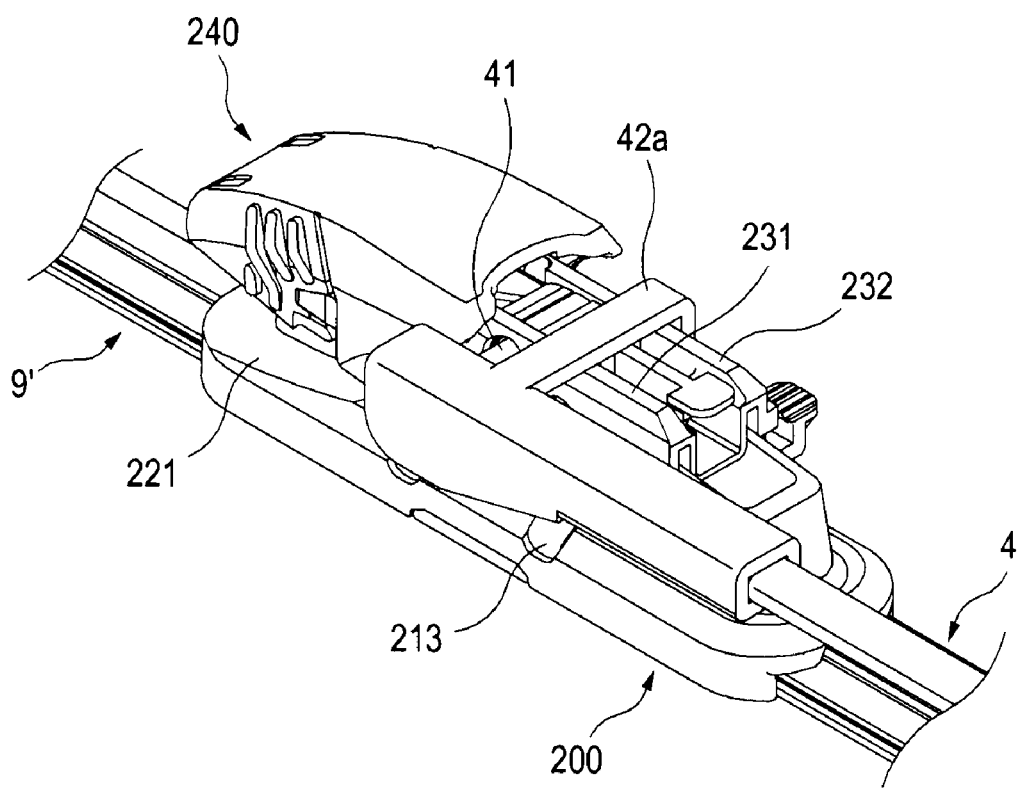
FIG. 57 is a perspective view illustrating that a flat wiper blade and a side lock wiper arm are connected to each other using the connecting device according to the second embodiment.

FIGS. 56 and 57 illustrate a locking operation between the connecting device 200 and the wiper arm 4 having the fourth coupling component 40 at its distal end.

As illustrated in FIG. 56, the flat wiper blade 9' with the adaptor 230 mounted thereon is connected to the wiper arm 4 in such a manner that the side pin 41 is fitted into the pivot shaft 223. Such fitting is finished when a portion of the fourth coupling component 40 adjacent to the side pin 41 is contacted to the outer surface of the side wall portion 231. While the side pin 41 is fitted to the pivot shaft 223, the adaptor 230 (and the flat wiper blade 9') can be pivoted about the side pin 41. Subsequently, the adaptor 230 is pivoted toward the wiper arm 4 such that the stopper section 42a of the clip arm 42 is brought in contact with the upper edges of the side wall portions 231, 232. Then, the clip section 42b is snap-engaged to the outer surface of the side wall portions 232. As illustrated in FIG. 57, since the side pin 41 is fitted to the pivot shaft 223 and the clip section 42b is elastically engaged to the outer surface of the side wall portion 232, the connecting device 200 and the fourth coupling component 40 are locked to each other in fitting and snap-engagement manners.

Figure 58:
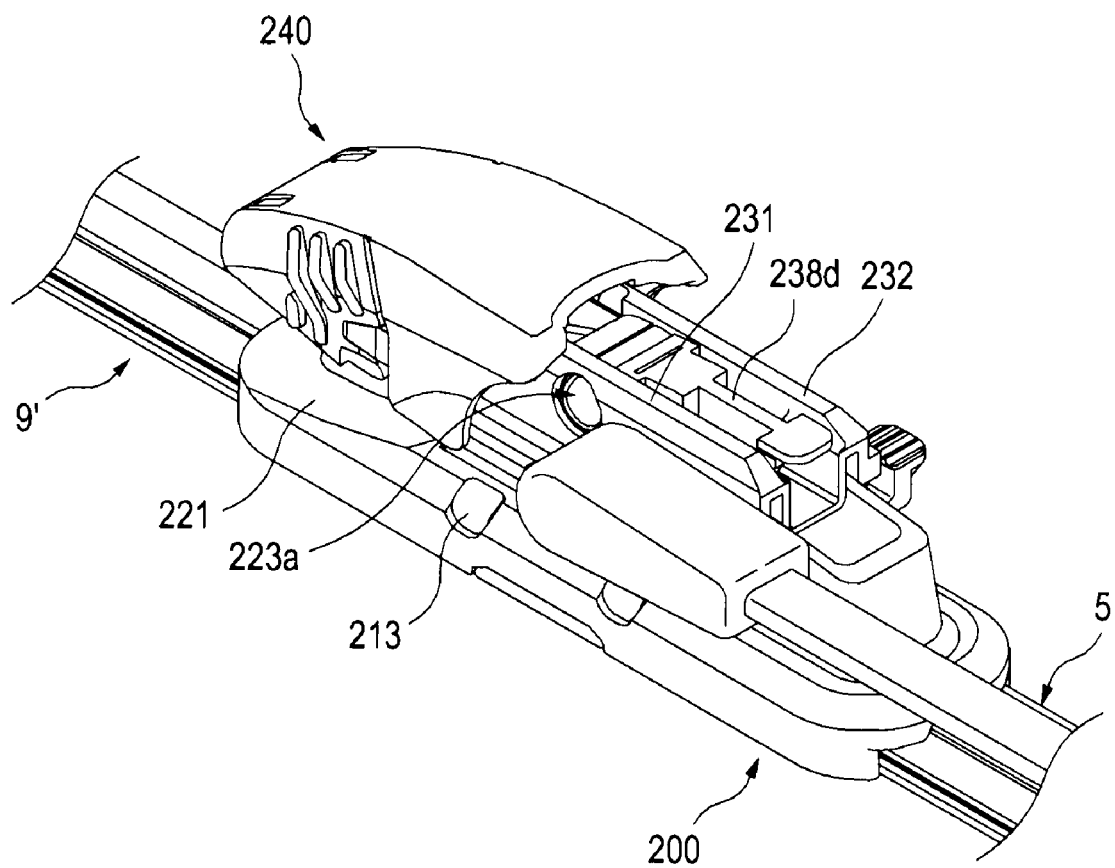
FIG. 58 is a perspective view illustrating that a flat wiper blade and a pin wiper arm are connected to each other using the connecting device according to the second embodiment.

FIG. 58 illustrates a locking operation between the connecting device 200 and the wiper arm 5 having the fifth coupling component 50 at its distal end.

The flat wiper blade 9' with the adaptor 230 mounted thereon is connected to the wiper arm 5 in such a manner that the pin 51 is inserted to the bearing apertures 238a, 238b one after the other. While the pin 51 is inserted, the latching bar 238d of the fifth locking device is elastically curved upwardly. If inserting the pin 51 is completed, then the latch portion 238c elastically engages the circumferential groove 52 by means of the latching bar 238d. Due to the coupling between the pin 51 and the bearing apertures 238a, 238b and the engagement between the circumferential groove 52 and the latch portion 238c, the connecting device 200 and the fifth coupling component are locked to each other in the insertion and snap-engagement manners.

Embodiments of the present disclosure may provide a device for connecting a flat wiper blade to the wiper arms. The connecting device 100, 200 may connect a single flat wiper blade to various wiper arms configured for use with a flat wiper blade. In exemplary embodiments, the connecting device 100, 200 may include: a joint 110, 210 fixed to a frame 9b, 9b' of a flat wiper blade 9, 9'; a bracket 120, 220 snap-mounted on the joint; and an adaptor 130, 230 mounted to the bracket. The bracket may have a pivot shaft 123, 223 extending perpendicular to a length direction of the frame and have a pivot bore 123a, 223a therethrough. The adaptor may be mounted to the bracket in the snap-engagement and fitting manners. The adaptor may be configured to be suitable for differently-configured coupling components 10, 10', 20, 30, 40, 50 of the wiper arms 1, 1', 2, 3, 4, 5. Accordingly, the connecting device can connect a single flat wiper blade to the various wiper arms.

In one embodiment, since the adaptor is locked to the first coupling component 10, 10' in such a manner that it is locked to the first coupling component by the cover 140, 240 or the first locking protrusions 235a, 235b at its forward end side and it is supported by the pivot protrusions 135a, 135b, 235c at its backward end side, the adaptor and the first coupling component can be connected by a simple and firm coupling. Further, since the adaptor can be connected to the wiper arm 1, 1' without any force acting along a driving direction of the wiper arm, the flat wiper blade 9, 9' is not allowed to be separated from the wiper arm during the operation of the wiper arm.

Further, in one embodiment, since the cover 140, 240 maintains the second locking device stationary after the adaptor is fixed to the second coupling component 20 by the second locking device, the adaptor is allowed to be firmly coupled to the wiper arm 2 with the second coupling component 20 at its distal end.

Further, in one embodiment, the adaptor may have a pair of side wall portions 131, 132, 231, 232. The fitting apertures 134a, 134b, 234a, 234b may be perforated in the side wall portions. The adaptor is mounted on the bracket in such a manner that both lateral ends of the pivot shaft are fitted into the fitting apertures, thereby providing a smooth pivotal movement and simple and rapid coupling between the bracket and the adaptor.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device (100, 200) for detachably connecting a flat wiper blade (9, 9') to a wiper arm (1, 1', 2, 3, 4) comprising one of the following: a first coupling component (10, 10') including a top plate (11, 11') and a pair of concave portions (14a, 14b, 14a', 14b'); a second coupling component (20) including a hooked portion (21); a third coupling component (30) including a top plate (31) and a pair of side plates (32a, 32b); and a fourth coupling component (40) including a side pin (41) and a clip arm (42), the device comprising:

a joint (110, 210) coupled to a frame (9b, 9b') of the flat wiper blade;

a bracket (120, 220) mounted on the joint, the bracket including: a pair of spaced-apart vertical wall portions (122a, 122b, 222a, 222b); and a pivot shaft (123, 223) disposed on a top of the vertical wall portions and having a pivot bore (123a, 223a) defined therethrough; and an adaptor (130, 230) including: a pair of side wall portions (131, 132, 231, 232) having fitting apertures (134a, 134b, 234a, 234b) defined therethrough, respectively; and a first cross-connecting portion (133a, 233a) connecting the side wall portions to each other and being located in front of the fitting apertures, the adaptor being pivotally mounted on the bracket as both ends of the pivot shaft are fitted into the fitting apertures, wherein the adaptor includes:

a first locking device (131d, 132d, 140, 142a, 142b, 231e, 232e, 240, 242a) for positioning the concave portion of the first coupling component to the side wall portions and securing the top plate of the first coupling component on the side wall portions;

a second locking device (131a, 132a, 136a, 136b, 231a, 232a, 236a, 236b) for locking the hooked portion of the second coupling component between the side wall portions against the first cross-connecting portion; and slide rails (137a, 137b, 237a, 237b) formed on outer surfaces of the side wall portions and being configured to be fitted between the side plates of the third coupling component; and wherein the side pin of the fourth coupling component is insertable into and pivotable about the pivot bore.

2. The device of claim 1, wherein the first locking device includes:

a cover (140, 240) pivotally joined to forward ends of the side wall portions;

a cover locking device (131d, 132d, 142a, 142b, 231e, 232e, 242a) for locking the cover to the adaptor; and a pivot protrusion (135c, 135d, 235c) formed on a backward end of at least one of the side wall portions and being fittable to the concave portion of the first coupling component.

3. The device of claim 2, wherein the cover locking device includes:

latch protrusions (142a, 142b) formed on opposed inner surfaces of the cover; and locking bars (131d, 132d) extending from the side wall portions and being configured to engage with the latch protrusions.

4. The device of claim 3, wherein each of the side wall portions has a cover retaining protrusion (131f, 132f) outwardly protruding from a lower edge of the side wall portion, and wherein a lower edge of the cover is fittable between the cover retaining protrusion and the side wall portion.

5. The device of claim 2, wherein the second locking device includes second locking protrusions (136a, 136b, 236a, 236b) formed on opposed inner surfaces of the side wall portions near the first cross-connecting portion.

6. The device of claim 5, wherein each of the side wall portions includes a clamping bar (131a, 132a, 231a, 232a) formed by slitting a top portion of the side wall portion, and wherein the second locking protrusions are formed on opposed sides of the clamping bars, whereby when an inner surface (21b) of the hooked portion of the second coupling component is placed in contact with the first cross-connecting portion, the second locking protrusions engage to an outer surface (21a) of the hooked portion by means of elastic deformation of the clamping bars.

7. The device of claim 6, wherein the cover has a component (144a, 144b, 244a, 244b) for restricting the clamping bars from outwardly curving at opposed inner surfaces thereof, the component being configured to be positioned near the clamping bar when the cover is locked to the adaptor.

8. The device of claim 2, wherein the first coupling component further includes a tongue (13, 13') extending from the top plate (11, 11'), and wherein the first locking device further includes first locking protrusions (235a, 235b) formed on opposed inner surfaces of the side wall portions in front of the fitting apertures, whereby when the pivot protrusion (235c) is fitted to the concave portion (14b, 14b') of the first coupling component and the adaptor is then pivoted to the first coupling component, the tongue is locked to the first locking protrusions.

9. The device of claim 1, wherein the third coupling component further includes an aperture (31a) at the top plate (30), and wherein the adaptor further includes:

a second cross-connecting portion (133b, 233b) connecting the side wall portions to each other and being located in the rear of the fitting apertures;

an elastic bar (137f) extending from the second cross-connecting portion; and a latch protrusion (137e) disposed on a free end of the elastic bar and being latch-engageable to the aperture.

10. The device of claim 1, wherein the joint (110) comprises a first half section (110a) and a second half section (110b) joined to each other with the frame interposed therebetween, and wherein one of the first and second half sections includes a securing component (112a, 113a) and the other of the first and second half sections includes an engaging component (112b, 113b) engageable to the securing component, whereby the first half section and the second half section are joined to each other by engagement of the securing component and the engaging component.

11. The device of claim 1, wherein the bracket further includes a ridge portion (121d, 221d) protruding to be insertable between the side wall portions, and wherein the adaptor further includes a fourth cross-connecting portion (133d, 233d) located at backward ends of the side wall portions and being configured to be insertable between the vertical wall portions of the bracket.

12. A device (200) for detachably connecting a flat wiper blade (9, 9') to a wiper arm (1, 1', 2, 3, 4, 5) comprising one of the following: a first coupling component (10, 10') including a tongue (13, 13') and a pair of concave portions (14a, 14b, 14a', 14b'); a second coupling component (20) including a hooked portion (21); a third coupling component (30) including a top plate (31) and a pair of side plates (32a, 32b); a fourth coupling component (40) including a side pin (41) and a clip arm (42); and a fifth coupling component (50) including a pin (51) and a circumferential groove (52) defined in the pin, the device comprising:

a joint (210) coupled to a frame (9b, 9b') of the flat wiper blade;

a bracket (220) mounted on the joint, the bracket including: a pair of spaced-apart vertical wall portions (222a, 222b); and a pivot shaft (223) disposed on a top of the vertical wall portions and having a pivot bore (223a) defined therethrough; and an adaptor (230) including: a pair of side wall portions (231, 232) having fitting apertures (234a, 234b) defined therethrough; a first cross-connecting portion (233a) connecting the side wall portions to each other and being located in front of the fitting apertures; and a second cross-connecting portion (233b) connecting the side wall portions to each other and being located in the rear of the fitting apertures, the adaptor being pivotally mounted on the bracket as both ends of the pivot shaft are fitted into the fitting apertures, wherein the adaptor includes:

a first locking device (235a, 235b, 235c) for positioning the concave portion of the first coupling component to the side wall portions and locking the tongue of the first coupling component to the side wall portions;

a second locking device (231a, 232a, 236a, 236b) for locking the hooked portion of the second coupling component between the side wall portions against the first cross-connecting portion;

slide rails (237*a*, 237*b*) formed on outer surfaces of the side wall portions and being configured to be fitted between the side plates of the third coupling component;

a latching lever (237*e*) extending from a backward end of one of the side wall portions and being configured to elastically engage to a backward end of one of the side plates of the third coupling component; and a fifth locking device (238*a*, 238*b*, 238*c*) for securing the pin of the fifth coupling component transversely to the side wall portions and locking the circumferential groove of the fifth coupling component to the side wall portions; and wherein the side pin of the fourth coupling component is insertable into and pivotable about the pivot bore.

13. The device of claim 12, wherein the first locking device includes:

first locking protrusions (235*a*, 235*b*) formed on opposed inner surfaces of the side wall portions; and a pivot protrusion (235*c*) formed on a backward end of one of the side wall portions, whereby when the pivot protrusion is fitted to the concave portion (14*b*, 14*b*') of the first coupling component and the adaptor is then pivoted to the first coupling component, the tongue is locked to the first locking protrusions.

14. The device of claim 13, wherein the second locking device includes second locking protrusions (236*a*, 236*b*) formed on opposed inner surfaces of the side wall portions near the first cross-connecting portion.

15. The device of claim 14, wherein each of the side wall portions includes a clamping bar (231*a*, 232*a*) formed by slitting a top portion of the side wall portion, and wherein the second locking protrusions are formed on opposed sides of the clamping bars, whereby when an inner surface (21*b*) of the hooked portion of the second coupling component is placed in contact with the first cross-connecting portion, the second locking protrusions engage to an outer surface (21*a*) of the hooked portion by elastic deformation of the clamping bars.

16. The device of claim 15, further comprising:

a cover (240) pivotally joined to forward ends of the side wall portions and being configured to partially cover the first coupling component and the second coupling component; and a cover locking device (231*e*, 232*e*, 242*a*) for locking the cover to the adaptor.

17. The device of claim 16, wherein the cover includes backing plates (244*a*, 244*b*) disposed on opposed inner surfaces thereof, the backing plates configured to be positioned near the clamping bars and portions of the side wall portions with the first locking protrusions when the cover is locked to the adaptor.

18. The device of claim 12, wherein the fifth locking device includes:

bearing apertures (238*a*, 238*b*) perforated in the side wall portions near the fitting apertures for bearing the pin of the fifth coupling component; and a latching component (238*c*, 238*d*) disposed between the side wall portions and being elastically engageable to the circumferential groove of the fifth coupling component.

19. The device of claim 18, wherein the latching component includes:

a latching bar (238*d*) extending from the second cross-connecting portion; and a latch portion (238*c*) disposed on the latching bar (238*d*) and being engageable to the circumferential groove.

20. The device of claim 12, wherein the joint includes a pair of frame holding legs (211*a*, 211*b*), and wherein the joint and the frame are fixed to each other in such a manner that the frame is fitted to and between the frame holding legs.

\* \* \* \* \*